United States Patent [19]

Flammer

[11] Patent Number: 5,079,768

[45] Date of Patent: Jan. 7, 1992

[54] METHOD FOR FREQUENCY SHARING IN FREQUENCY HOPPING COMMUNICATIONS NETWORK

[75] Inventor: George H. Flammer, Cupertino, Calif.

[73] Assignee: Metricom, Inc., Campbell, Calif.

[21] Appl. No.: 581,497

[22] Filed: Sep. 11, 1990

Related U.S. Application Data

[63] Continuation-in-part of Ser. No. 485,926, Mar. 23, 1990.

[51] Int. Cl.[5] .......................... H04J 3/24; H04B 15/00
[52] U.S. Cl. ..................... 370/94.1; 370/77; 375/1; 455/63; 340/825.03
[58] Field of Search .................. 370/103, 100.1, 94.1, 370/94.2, 50, 77; 375/1, 107; 455/51, 71, 166, 179, 62, 63; 340/825.03

[56] References Cited

U.S. PATENT DOCUMENTS

| | | | |
|---|---|---|---|
| 4,479,226 | 10/1984 | Prabhu et al. | 455/63 |
| 4,554,668 | 11/1985 | Deman et al. | 375/1 |
| 4,558,453 | 12/1985 | Mimken | 375/1 |
| 4,601,043 | 7/1986 | Hardt et al. | 375/1 |
| 4,677,717 | 6/1987 | O'Connor et al. | 370/100 |
| 4,752,939 | 6/1988 | Amoroso et al. | 375/1 |
| 4,807,248 | 2/1989 | Pyatt et al. | 375/1 |
| 4,837,823 | 6/1989 | Ham et al. | 380/34 |
| 4,850,036 | 7/1989 | Smith | 455/179 |
| 4,872,205 | 10/1989 | Smith | 455/58 |

Primary Examiner—Douglas W. Olms
Assistant Examiner—H. Kizou
Attorney, Agent, or Firm—Townsend and Townsend

[57] ABSTRACT

A frequency-hopping packet communication system without a master clock or master control unit is based on use of a receiver's frequency hopping timing and identification to control communication. A frequency-hopping band plan, involving the number of channels and the pseudo-random pattern of frequency change and nominal timing of changes, is universally known to each node in the network. Frequency-hopping is implemented by the division of communication slots and the accumulation of slots into epochs, wherein each epoch equals the total number of available slots (number of channels times the number of time frames per channel). A transmitting node tracks the preestablished frequency-hopping pattern for its target receiver based on previously-acquired information. The transmission node identifies a receiver node and a current frequency channel of such receiver node. The transmission node then checks the frequency channel to determine if available (e.g., not in use and within an acceptable noise margin). If unavailable, the transmission node delays transmission to the identified node to a later slot. During the delay, the transmission node identifies another receiver node and a corresponding current frequency channel. The steps of identifying a receiver node and checking the corresponding current frequency channel are repeated until a node having an available frequency channel is identified. The transmission node then sends a packet to the selected receiver node at a frequency and for a duration defined according to the current slot. Such transmission node tracks the changing frequency of the selected receiver node to maintain frequency synchronization.

5 Claims, 4 Drawing Sheets

METHOD FOR FREQUENCY SHARING IN FREQUENCY HOPPING COMMUNICATIONS NETWORK

This application is a continuation-in-part patent application of U.S. patent application Ser. No. 07/485,926 accorded a filing date of Mar. 23, 1990.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates generally to a method for transmitting data through a communication network at radio frequencies in the presence of interference, and more particularly to a method for utilizing a plurality of frequencies. Any or all of which might have co-channel occupants for an indeterminate amount of time.

Packet communications is a form of data communications whereby segments or packets of data are self contained as to target address, source address and information content. Conventionally, packets are routed with error checking and confirmation of receipt directly or relayed via relay stations, or intermediate nodes, between a source node or station and a destination node or station on a frequency which is known at all times to nodes within direct communication. Communication on certain frequencies may be restricted in duration in accordance with frequency allocation and bandwidth utilization rules and requirements. Such restrictions may be imposed by a licensing authority, such as the U.S. Federal Communications Commission (FCC). For example, in the 902-928 MHz frequency band, the FCC has proposed a rule that continuous transmission by a single transmitter of no more than 1 watt rf output power on any one channel be of no more than 400 ms duration each 30 seconds, and that at least some if not all other channels be selected prior to retransmission on the same frequency (FCC Rules, Part 15.247). Communication between any given pair of transceivers on a single frequency is thus restricted to packets of information which can be communicated in less than 400 ms, and means must be provided to accommodate communication on other frequencies.

In order to accommodate the transmission and reception of significant amounts of information in a reasonable period of time, frequency-agile transceivers have been proposed in which each transceiver changes frequency according to a pseudo-random pattern among a plurality of channels. Such systems are called frequency-hopping spread spectrum systems and are not to be confused with direct sequence spread spectrum systems wherein a pseudo-random code is used to modulate an information-bearing carrier over a broad band.

A packet-based frequency-agile system has a potential for robustness because of its frequency agility. If it attempts to communicate on one frequency but finds the frequency occupied, means need to be provided for adapting operation.

The following patents were uncovered in a search of the records of the U.S. Patent and Trademark Records:

Smith, U.S. Pat. No. 4,850,036, issued July 18, 1989, for RADIO COMMUNICATION SYSTEM USING SYNCHRONOUS FREQUENCY HOPPING discloses a frequency-hopping radio system in which a master station or control unit transmits a startup message to a plurality of slave stations on a preselected frequency. The startup message indicates to each slave station a frequency-hopping sequence. Therein, all transmissions must be synchronized to the control unit at all times to preclude interference among slaves. Such a system is impractical in a peer to peer network where there is no global master station or global timing.

Ham et al., U.S. Pat. No. 4,837,823, issued June 6, 1989, for COMMUNICATION SYSTEM describes a frequency-hopping communication system wherein synchronization information is transmitted over a spread of frequencies of a type which differs from the type used for data communication, and a counter at each receiver is used to keep track of sequence and synchronization. Such a scheme as therein described requires substantial acquisition time and overhead.

Pyatt et al., U.S. Pat. No. 4,807,248, issued Feb. 21, 1989, for AUTOMATIC RESYNCHRONIZATION TECHNIQUE describes a method for re-synchronizing frequency hopping communication systems. Resynchronization frames are transmitted interspersed with data frames following initial synchronization. This technique, which can be adapted to packet communication between two stations, requires additional signals to be sent as well as a master-slave relationship between stations.

O'Connor et al., U.S. Pat. No. 4,677,617, issued June 30, 1987, for RAPID FREQUENCY-HOPPING TIME SYNCHRONIZATION describes a frequency-hopping radio system in which a master station or control unit transmits a unique synchronization code for each time interval relative to a reference startup time. This system also proposes a master-slave relationship among stations.

Hardt et al., U.S. Pat. No. 4,601,043, issued July 15, 1986, for DIGITAL COMMUNICATIONS SOFTWARE CONTROL SYSTEM describes a frequency hopping system with a USART and a bit/sync tracking circuit.

Mimken, U.S. Pat. No. 4,558,453, issued Dec. 10, 1985, for SYNCHRONIZATION METHOD AND FREQUENCY HOPPING SYSTEM describes a frequency hopping system in which keying of a transmitter automatically initiates a multiple cycle sync acquisition signal and wherein a sync maintenance signal is periodically transmitted.

Other commercial or proposed commercial systems which have come to the attention of the applicant as a result of FCC consideration are as follows:

O'Neill communications "LAWN" system operates a packet communication system based on AX.25 link layer protocols. The system uses four channels at a data rate of 38.4 kbs in the 900 MHz band in a multipoint to multipoint scheme.

LifePoint System operates a multipoint to point event reporting system using unacknowledged packets. The system occupies 800 kHz centered at 908 MHz. The system is used for alarm systems.

Telesytems RadioNet SST is a system which operates at a frequency of 915 MHz at a variety of transmission rates and power levels. The system operates without a link layer protocol.

SUMMARY OF THE INVENTION

In accordance with the invention, a frequency-hopping packet communication system without a master clock or master control unit is based on use of a receiver's frequency hopping timing and identification to control communication. A transmitter acquires synchronization with a target node by use of information previously received from or about a target indicating timing of present idle frequency hop of the target receiver. Each receiving node establishes in each station or node a table of receiver frequency hopping sequence offsets (hop timing offsets) of each other node within its communication range, and each node announces by transmission of a packet its presence on each frequency in a packet which includes a hop timing offset indicator. The hop timing offset indicator is a key used to read a frequency-hopping table to allow nodes to set themselves in synchronization with one another. A location indicator built into the address of each packet is used to randomize an ordered frequency-hopping table at each node. As a consequence, synchronized frequency hopping of two nodes is controlled by information content of the packet. A local clock at each node is maintained to high accuracy by a temperature compensated oscillator.

A frequency-hopping band plan is implemented by the division of communication slots, corresponding to a fixed (or controllably variable) duration of time on one of n random frequencies, into partial slots, herein called ticks, and the accumulation of slots into epochs, wherein each epoch equals the total number of available slots (number of channels times the number of time frames per channel). Each pair of nodes can maintain between themselves a different frequency-hopping table based on information exchanged or heard at any time by a node receiver.

It is the responsibility of the transmitting node to follow the pre-established frequency-hopping pattern for an immediate target receiver based on information the node has previously acquired. It is also the responsibility of the transmitting node to "check" the current frequency for occupancy prior to initiating a transmission. If the transmitting node determines that the current frequency is not occupied, then the transmission to the target receiver follows at such unoccupied frequency. If the transmitting node determines that the current frequency is occupied or is otherwise too noisy to establish a handshake, the system, including the transmitting node and the receiving node switch to a different predetermined frequency to attempt to establish communication. The frequency switching (e.g., "hopping") is repeated until an unoccupied available frequency is found. The frequency-hopping band plan, involving the number of channels and the pseudo-random pattern of frequency change and nominal timing of changes, is universally known to each node in the network.

The details and operation of the invention will be better understood by reference to the following description of specific embodiments in connection with the accompanying drawings.

DESCRIPTION OF SPECIFIC EMBODIMENTS

Figure 1:
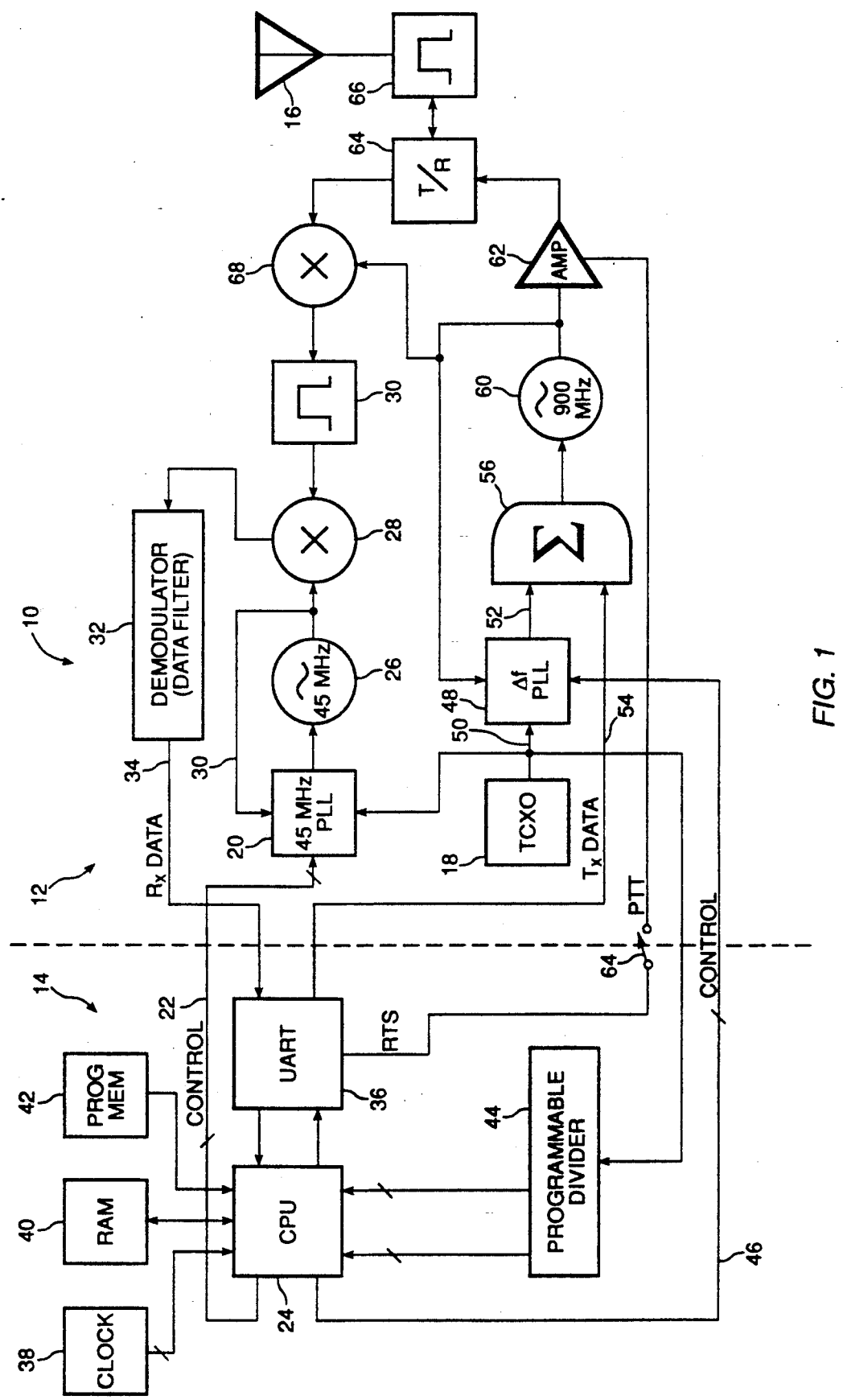
FIG. 1 is a block diagram of a transceiver in accordance with the invention.

FIG. 1 illustrates a packet node 10 in accordance with the invention. A large number of identical nodes having overlapping communications ranges and differing only by location and stored information comprise a communications system or network in accordance with the invention. Each node 10 includes a transceiver 12 and a terminal node controller (TNC) 14. The transceiver 12 has an antenna system 16 and means for changing frequency for receiving and transmitting as hereinafter explained.

The TNc 14 includes packet content and frequency control functions, including means for storing information received and means for analyzing information received through the transceiver 12. The TNC 14 operates in accordance with at least some portions of the multiple-layer protocols established for packet communications, such as X.25 adapted for radio communications (AX.25).

The transceiver 12 comprises a high stability local frequency reference such as a temperature controlled stable oscillator (TCXO) 18 coupled to a first, herein fixed frequency, phase locked loop (PLL) 20 under control of the TNC 14 (via control lines 22 from a CPU 24). The PLL 20 steers a first voltage controlled oscillator 26, which in turn provides a local reference to a mixer 28 and frequency feedback for error correction via line 30 to the first PLL 20. (Alternatively, a highly-stable crystal oscillator may be employed to provide a stable reference signal to the mixer 28.)

The mixer 28 also receives an IF signal from an IF filter 30 producing an output signal containing received data to a demodulator 32. The demodulator 32 acts as a data filter to extract the received data, which in turn is supplied on an Rx DATA line 34 to a conventional Universal Asynchronous Receiver Transmitter (UART) 36 of the TNC 14. The UART 36 supplies the received data in a form suited to the requirements of the CPU 24 for processing.

The CPU 24 of the TNC 14 has coupled to it local clocks 38 for local control, read/write memory (RAM) 40 for storing volatile information, nonvolatile program memory (ROM) 42 for storing the characteristics of the TNC 14 which control operation according to the invention, and a programmable divider means 44, which serves as the source of timing used for synchronization of operation within the communication network. In particular, the programmable divider means 44 provides control interrupts and the like for timing epochs and ticks as hereinafter explained.

The CPU 24 provides a control or steering signal via control lines 46 to a second, frequency-agile, phase-locked loop, and the TCXO 18 provides a timing signal via timing line 50. The control signal specifies the frequency of operation, the pattern of frequencies of operation and the duration of operation at each frequency of operation of the transmitted and of the received signals, or "slots" as hereinafter explained.

The output 52 of the frequency-agile PLL 48 is summed with the transmitted data signal on Tx DATA line 54 from the UART 36 at a summer 56. The summer 56 is the modulator which drives a 900 MHz range voltage controlled oscillator (VCO) 60. In the transmit mode of the UART 36, modulated, frequency-agile data signals are supplied to a radio frequency (rf) amplifier 62, which is enabled by a push-to-talk (PTT) control switch in response to a request to send (RTS) signal from the UART 36. The output of the amplifier 62 is supplied through to a transmit/receive (T/R) switch 64 which feeds the antenna 16 through an rf filter network 66.

In the absence of transmit data signals, the amplifier 62 is disabled and the 900 MHz VCO 60 provides an unmodulated signal to a second intermediate frequency (if) mixer 68 in the receive signal path. The receive-data if signal at the output of the mixer 68 is supplied to the bandpass filter 30 for filtering before subsequent demodulation of the data as explained hereinabove. Since the receiver section and the transmitter section share the same tuning circuitry, synchronization of the transmitted frequency and the received frequency is assured.

Figure 2:
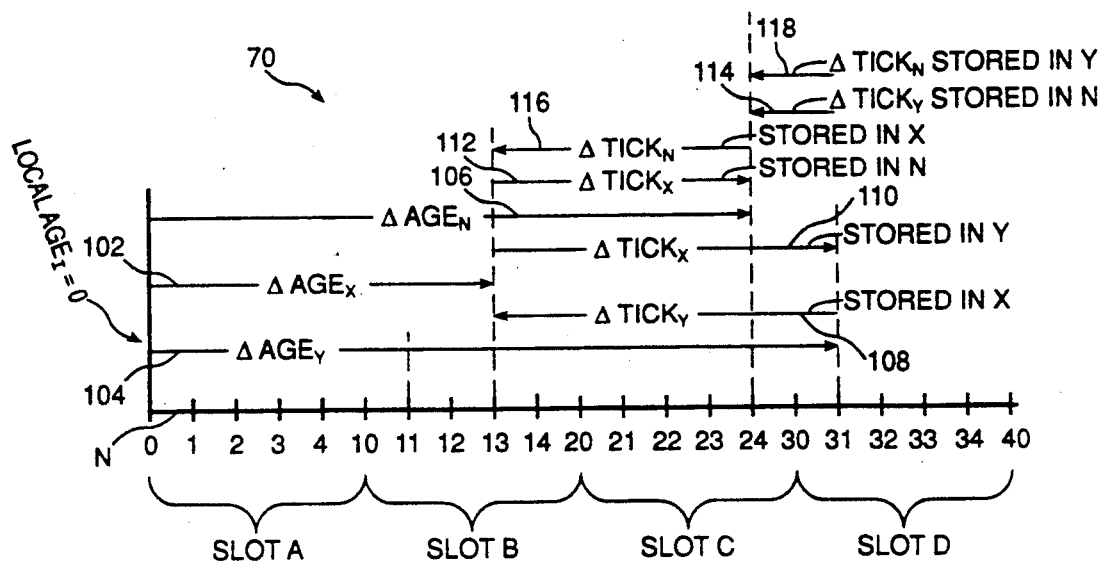
FIG. 2 is a timing diagram of a portion of an epoch according to the invention.
Figure 3:
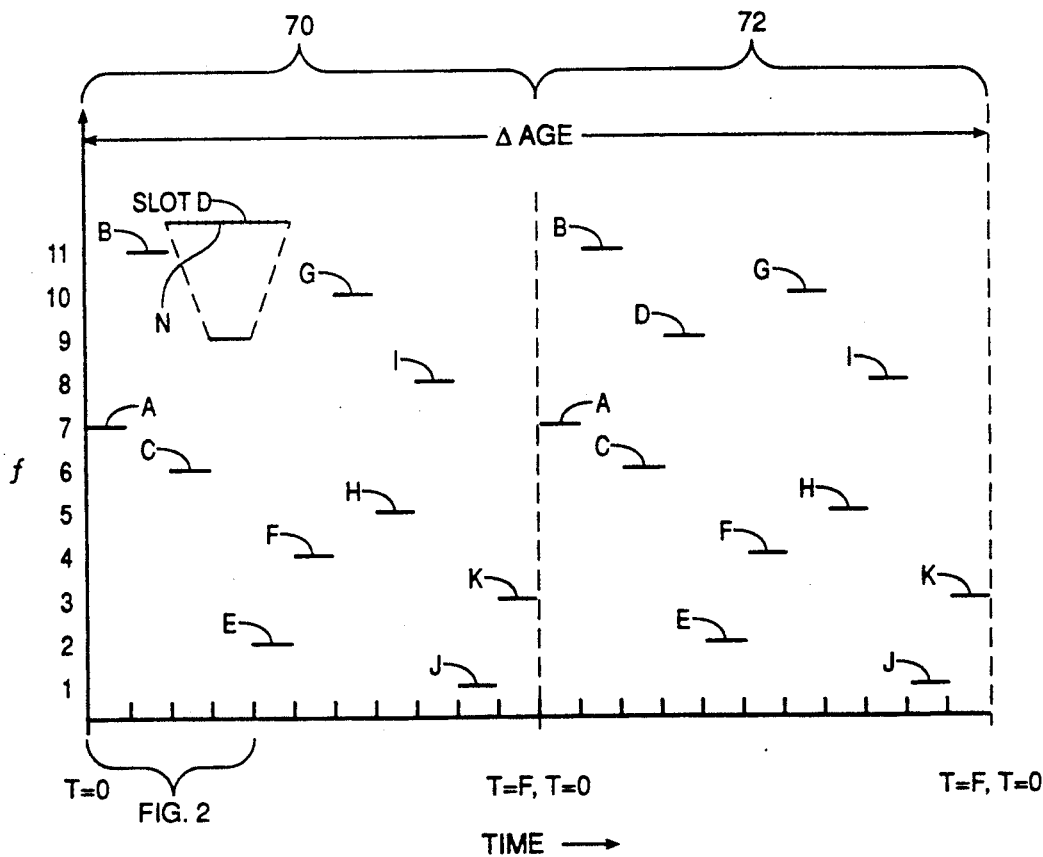
FIG. 3 is a representative frequency versus time graph of a frequency hopping pattern employed by all transceivers in a network according to the invention over a plurality of epochs.

Referring to FIG. 2 and FIG. 3, there is shown a timing diagram of a portion of an "epoch" 70 in accordance with the invention, and a frequency hopping pattern for a plurality of epochs 70, 72. First, however, in order to better understand the invention, it is helpful to understand certain terminology.

A network is a group of nodes capable of communication with one another on selected frequencies at selected times. A complete network is not illustrated. However, FIG. 1 is representative of one of an arbitrary number of nodes in a network. A node is a transceiving station 12 and its associated controlling means 14 within a network. Channels (numbered frequencies 1-11 in FIG. 3) refer to specific frequencies of operation. A channel has an adequate passband for the information rate of interest, and guard bands typically separate channels to minimize interchannel interference. Slots (A-K, FIG. 3) as herein used refer to the momentary frequencies of operation in terms of specific frequencies at specific times for specific durations. A slot (A-K) is allocated to each available channel (1-11) in a network. Ticks N (FIG. 2) are markers or subdivisions of time within slots (A-K). A frequency hopping pattern (Frequency sequence 7,11,6,9,2,4,10,5,8,1,3 of FIG. 3) is a known pseudo-random sequence of slots (A-J). An epoch 70 or 72 is one complete cycle of all slots A-J in a frequency-hopping pattern. FIG. 3 illustrates eleven slots of eleven channels for eleven frequencies over two epochs in which time is counted in ticks from T=0 to T=F. FIG. 2 illustrates four slots A,B,C,D of an epoch 70 without showing channel allocation, each slot A-D being five ticks N in duration. The significance of age of a node in terms of ticks will be apparent hereinafter.

Figure 4:
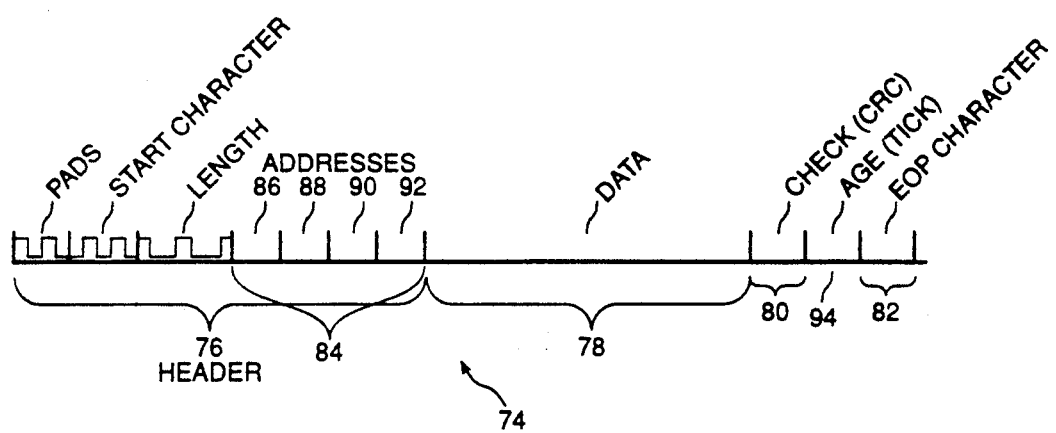
FIG. 4 is a diagram of a standard data packet for use in accordance with the invention.

Referring to FIG. 4, a packet 74 is a self-contained addressed burst of relatively short, verifiably correct data. It is typically serial binary data modulated and encoded in digital code, such as gray code according to the USASCII character set. It contains a header portion 76 with address and certain control information, a data 78 portion and typically also a data check portion 80. As needed, it has an end of packet character (EOP) 82. The header 76 may also or alternatively contain a length designator. An address portion 84 includes information in definable portions about the originating station 86, the final destination station 88, the sending station 90 and the target station 92. The originating station information 86 and the target station information 88 remain unchanged for the life of the packet. The sending station information 90 and the receiving station information 92 are changed with each relay of a packet 74.

The data check portion 80 is a calculated value, such as a Cyclic Redundancy Check (CRC) number, for each packet. It is calculated at the sending station and appended to the packet before transmission. The receiving station compares the transmitted data check portion 80 with a value calculated at the receiving station from the received data. Identity of the transmitted value and the calculated value indicates that the packet 74 has been correctly received. Error correction can be effected if the errors fall within defined parameters allowing correction by use of the check value.

In accordance with the invention, each packet 74 has associated with it and embedded in it an age value 94, which is a tick count beginning with the anniversary of the last epoch of the sending station, as hereinafter explained. The age value 94 is used to interpret and propagate timing information, independent of any global clock. The age value is produced from a local recirculating counter embedded in the function of each TNC 14 (FIG. 1) of each node 10 and driven by a stable oscillator 18. Each of the oscillators 18 of each node 10 operates at nominally exactly the same frequency. The differences in age values between the received tick and the tick at the receiving station allow the receiving station to resynchronize to the sending station with every tick. Note that the sending station and the receiving station switch with every exchange of packets, including any of the various types of packets employed in the system. The present invention employs a polling (SYNC) packet, an acknowledgement (ACK) packet, an ACK_acknowledgement (ACK_ACK) packet and an information (DATA) packet, and it may include specialized types of information packets.

The packet information is typically sent in the form of characters or bytes of 10 bits each. The packet sizes in a specific embodiment are as follows:
DATA packet—variable up to 256 bytes maximum
SYNC packet—21 bytes
ACK packet—21 bytes
ACK_ACK packet—21 bytes The header of a DATA packet may require 53 bytes, whereas the header of the ACK and ACK_ACK packets may require only 20 bytes. This is because the DATA packet must carry original source and ultimate destination information, in addition to personality information.

Routing within a packet netowrk is the process of using packet address information to select a path throughout the network. Addressing a packet is the placement of the header information in the packet to enable proper delivery and error recovery through the network. It is the purpose of this network to facilitate the transmission of data over a multiple-channel network in such a manner that use of any one channel of the network is limited to a duration of less than 1 second and wherein all channels are considered for utilization by a single transmitter before repeat use of a channel by the transmitter. The intended use is short distance point-to-point addressed transmissions or short distance point-to-multipoint addressed transmissions.

A key feature of the invention is that each packet contains information on the slot timing relative to the immediate originator of the packet (whether a SNYC packet, an ACK packet or a DATA packet) to allow the local receiver to transmit a next packet at the proper synchronization in reference to slot and ticks relative to the age of the originator. It is thus the role of the node attempting to transmit a data packet to track the frequency hopping pattern and internal synchronization of the node targeted to receive the data packet.

Figure 5:
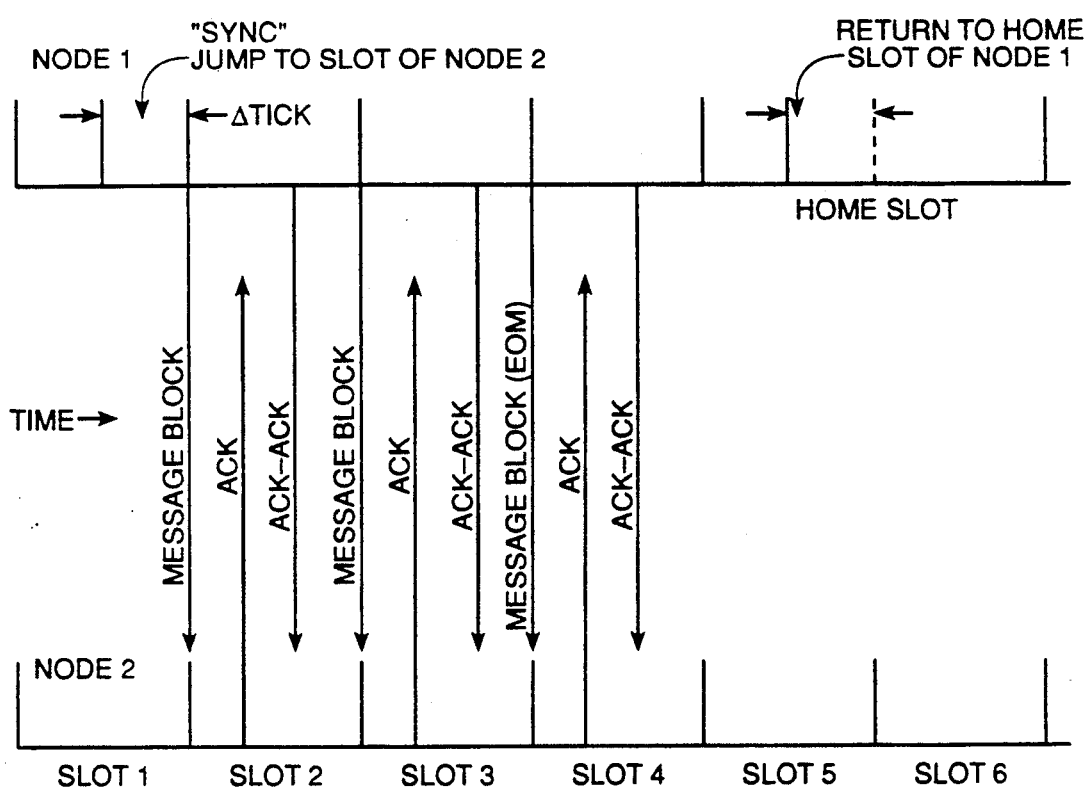
FIG. 5 is a flow chart of the decision process implemented for identifying a frequency channel at which to transmit a data packet in a network according to an embodiment of the invention.
Figure 6:
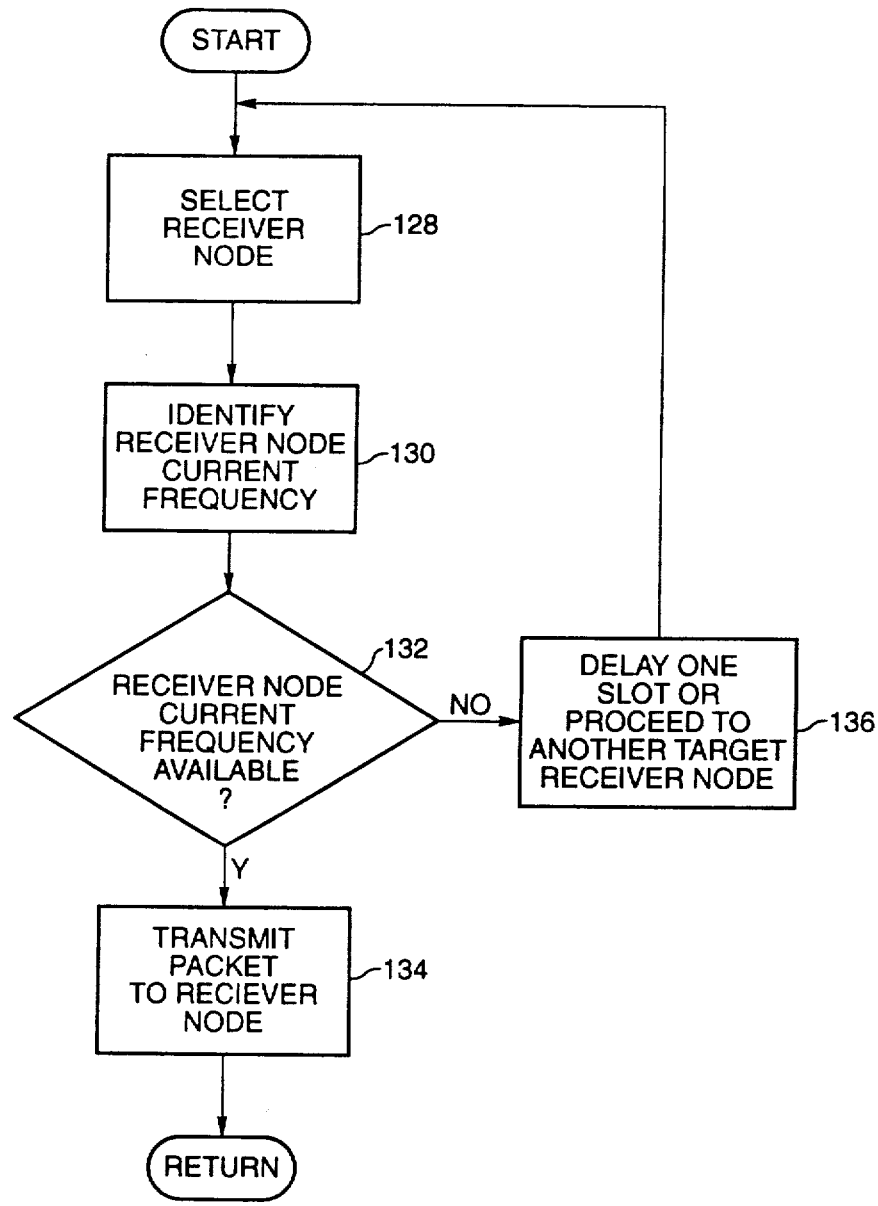

FIG. 5 is a flow chart depicting the frequency hopping to an available frequency as implemented at a transmitting node. At step 128, a target receiver node is identified. At step 130, the transmitting node selects a frequency according to a prescribed slot sequence as described above with reference to FIGS. 2 and 3. Such frequency is the frequency which the receiver node is assigned for the current slot. At step 132, the transmitting node tests the frequency to determine whether a signal is currently being transmitted (e.g., whether the frequency channel is occupied) or whether the frequency has so much noise as to prevent a successful transmission. If the frequency is unoccupied and satisfactorily clear (e.g., below an acceptable noise level), then the data packet is transmitted along such frequency channel to the receiver node at step 134. If the frequency is occupied or has too much noise, then at step 136 the transmission is delayed and another node, if available, is targeted for transmission. Transmission to the current receiver node is delayed until the next slot, at which time, the frequency channel is tested again by repeating the preceeding steps 128-136. During the delay, transmission may occur to another node. For a transmission to such another node, the other node is selected, and the preceeding steps 128-136 are repeated.

A specific example follows to explain the operation of the invention. Consider a network of nodes configured to use 205 channels of 25 kHz width spaced at 100 kHz within the 902-928 MHz frequency spectrum. Each slot is allocated 1 second, and there may be 100 ticks per slot. Thus, each tick is a timing mark of 10 ms such that an epoch has a duration of 20,500 ticks, 205,000 ms or 205 seconds. During any communication, there is the transmission of a DATA packet by a data originating station, an ACK packet by a data receiving station, and an ACK_ACK packet by the originating station. As the maximum duration of a DATA packet is 256 ms, an ACK packet is 22 ms and an ACK_ACK packet is 22 ms, the maximum total occupancy time of a slot for one exchange is no more than 300 ms or about 30 percent occupancy per slot for each data packet. There is adequate time for one, two or three exchanges of long packets during the same slot, as well as a greater number of shorter packets.

At power-up of any node in a network, a "home" slot is established. The home slot is the slot selected by a random offset from the first slot in terms of age of the current node (in ticks). The random offset "seed" may be a value derived from the node address. Any other random value can be chosen. The offset thus establishes a tick offset in terms of age. Age of each node is stored at the node as a modulo of the epoch length. Age is advanced by the local stable oscillator such that over the course of many epochs, the rate of change of age does not drift significantly as between nodes. (It should be understood that the use of a stable oscillator is merely convenient in order to minimize overly-frequent synchronization updating).

After startup, each node broadcasts an announcement of its presence in the network by sending a sync packet during each slot of the network, beginning with its home slot. The sync packet contains its age for reception by each other node in the network. Whenever a node hears another packet from another node in the network, it notes the source and the age in its storage means for future reference. In accordance with the invention the age of the heard node is stored as an age differential relative to the receiving node. Similarly, each other node, hearing the sync packet of the startup node notes its source and age and stores that age as an age differential. Moreover, each time any packet is heard, the age is examined and stored as needed so that, when the receiving station subsequently becomes a sending station, it can use the age differential to identify the slot in which it should next transmit to that other node. Thus, it is the responsibility of the ORIGINATING station to synchronize to the receiving station.

An example will illustrate. Referring to FIG. 2, there is shown ages of three nodes normalized to the age of the node as it measures itself. Thus, all nodes have an age beginning at the origin. Consider a node x having a first age from its startup of 13 ticks ($\Delta AGE_x$) time 102, as measured by the local clock at that node (Node X). Next, consider a node y having a second age from its startup of 31 ticks ($\Delta AGE_y$) time 104, as measured by the local clock at that node. Those two ages 102 and 104 are respectively loaded in the next packet transmitted by the two respective nodes as an age identifier of the transmitting node. The age of the packet received at the targeted receiving node is thus made known to the receiving node. Similarly, a node N is characterized by an age from startup as ($\Delta AGE_N$) 106. The age differential between a transmitting node and a receiving node is calculated at the receiving node and stored locally in a local node table (Table I) as a DELTA tick value relative to the other node. There will be a DELTA tick value for each other node heard from by a local node. The value $\Delta TICK_y$ 108 is stored in the node table of node x, and the value $\Delta TICK_x$ 110 is stored in the node table of node y. There is also a $\Delta TICK_x$ 112 stored in the node table of node N and a $\Delta TICK_y$ 114 stored in the node table of node N. Similarly, there is also a $\Delta TICK_N$ 116 stored in the node table of node x and a $\Delta TICK_N$ 118 stored in the node table of node y.

In each transmitting node, the last stored $\Delta TICK$ value for the addressed node is used by the transmitting node to determine the exact slot and tick within the slot for the current packet transmission. The transmitting node, which in conventional transmission is the node attempting to pass on a data packet, follows the receiving node as it hops through the spectrum of the network. Each receipt of a packet containing a $\Delta AGE$ value is used to update the $\Delta TICK$ value for the addressed node.

The $\Delta TICK$ values are absolute, signed values. Therefore, it is possible for one node to report the age of another node to a third node, thereby furnishing synchronization information indirectly and minimizing the need for each node to communicate frequently with all other nodes in its broadcast range.

Time bases, as established by local clocks can be expected to vary over time and thus the $\Delta TICK$ values between two nodes will tend to change over time. Since the rate and direction of change is substantially constant, it is also possible to predict timing misalignment. This further minimizes the requirement of frequent direct resynchronization. A requirement of frequent direct synchronization may also be used as a diagnostic index. An indication that a node requires frequent direct synchronization due to loss of synchronization indicates that the node is drifting in frequency and in need of maintenance.

During any interchange between two nodes, the node which is currently transmitting data synchronizes first to the receiving station. Since both stations follow the same slot/frequency hopping pattern, they remain in sync until the interchange is completed. Thereupon both stations become idle return to their "home" slot in an idle pattern. Any other node within its range knows which slot to use to reach a particular slot.

Each node collects information about all other nodes within its range in order to facilitate communication and make a local decision about which way to direct a packet being relayed through the network. Table I illustrates the contents of a typical node table.

TABLE I

| NODE NAME | Must be unique in a network |
|---|---|
| ΔTICK | (Hop Timing offset in ticks) Calculated each time a packet is received |
| LRA | ("Last Reported Age" in slots) Optional: Used to determine whether update information is needed |
| CUMULATIVE VALUES: | |
| TX# | Transmitted Number of Packets |
| RX# | Received Number of Packets |
| RETRY | Retries required Values used to determined level of activity between nodes and quality of the link |
| RSS | Received Signal Strength Signal Strength of received signal |
| RSD | Received Signal Discriminator (+ 0 −) Checks whether propagation is improving or degrading |
| RPSS | Reported Signal Strength as reported back by the receiving station |

FIG. 5 depicts the frequency hopping for a transmission as described above. Accordingly, the current frequency channel of the receiver node is tested to determine whether it is available (e.g., unoccupied and below acceptable noise level). When unavailable, the transmission is delayed. During the delay, a transmission may occur between the transmitting node and a different receiver node, if the other receiver node is available and targeted to receive a data packet.

Key software modules employed by the TNC 14 perform the acquisition, synchronization and analysis functions of the node.

Attached hereto as Appendixes A, B, C, D, E and F are detailed technical descriptions of aspects of the invention. Specifically there are source code listings of several software modules which are employed to configure and operate each TNC and a description of a database employed in connection with the invention. Appendix A discloses one embodiment of a node definition NODE.H, a database kept by each node. Appendix B is a source code listing describing one embodiment of the "heartbeat" tracking feature TICKER.C employed to keep track of the home slot ("home.slot") and the home tick ("home.tick"). The age of any node is reported by this moduel as:

age = (slot value) × 100 + (tick).

Appendix C is a source code list describing software routines for generating and processing various types of maintenance packets, such as the synchronization packets, called synch frames. The module is designated L2MAINT.C, for level 2 maintenance processing.

Appendix D is a source code listing describing the processing employed to calculate the ΔTICK value at each node. It is designated L2NODE.C for level 2 node processing. It generates the value ΔTICK which is used by TICKER.C above.

Appendix E is a source code listing of a module designated L2SCAN.C used to target a next node in a message relay process in order to select the best node through which to relay a packet. It incorporates a tickle routine which performs a frequency change to a target receiver frequency, waits for the targeted receiver to come onto the frequency and then reports that the receiver is on frequency.

Appendix F is a source code listing of a module designated L2WAN.C. This module is used indirectly to call the tickle procedure by invoking a scan for anode. It then picks the highest prioritynode to which the packets are to be sent. It then facilitates transmission of a string of packets to the selected receiver.

The invention has now been explained with reference to specific embodiments. Other embodiments will be apparent to those of ordinary skill in the art. It is therefore not intended that the invention be limited except as indicated by the appended claims.

Appendix A

Listing NODE H

®Copyright (unpublished work) Metricom, Inc.

All rights reserved.

```
/* N O D E   D E F I N I T I O N  ****************************************** */

NODE
(
    QUE         head ;

/* LAN or WAN address */
    LINK_ADDR   address ;

#define     NodeLinkAddressPtr(np)              (&((np)->address))

/* Timer value set when the link was Init'ed;
   used by RecvSync/RecvInfo to determine if this is a 'new' link */
    MCLOCK_TIMER    delta_age ;

#define     SECONDS_REQUIRED_TO_REBOOT          (20)
#define     NodeDeltaAge(np)                    ((np)->delta_age)
#define     NodeDeltaAgePtr(np)                 (&((np)->delta_age))
#define     SetNodeDeltaAge(np,val)             ((np)->delta_age = (val))

/* distance, bearing, and octant */
    DISTANCE    distance ;
    ANGLE       bearing ;

#define     NodeDistance(np)                    ((np)->distance)
#define     NodeDistancePtr(np)                 (&((np)->distance))

#define     NodeBearing(np)                     ((np)->bearing)
#define     NodeBearingPtr(np)                  (&((np)->bearing))
#define     NodeOctant(np)                      ((OCTANT)(((np)->bearing) >> (ANGLE_BIT
- OCTANT_BIT)))
```

```c
/* signal strength issues */
    BYTES       rssi_smoothed, rssi_max, rssi_min, rssi_last, discriminator ;
    UTINY       tx_power ;
    BYTES       last_reported_rssi, max_reported_rssi, min_reported_rssi,
smoothed_reported_rssi ;

#define NodeRssiSmoothed_M(np)              ((np)->rssi_smoothed)
#define SetNodeRssiSmoothed_M(np,val)       ((np)->rssi_smoothed = (val))
#define NodeRssiMax_M(np)                   ((np)->rssi_max)
#define SetNodeRssiMax_M(np,val)            ((np)->rssi_max = (val))
#define NodeRssiMin_M(np)                   ((np)->rssi_min)
#define SetNodeRssiMin_M(np,val)            ((np)->rssi_min = (val))
#define NodeRssiLast_M(np)                  ((np)->rssi_last)
#define SetNodeRssiLast_M(np,val)           ((np)->rssi_last = (val))
#define NodeDiscriminator_M(np)             ((np)->discriminator)
#define SetNodeDiscriminator_M(np,val)      ((np)->discriminator = (val))

#define NodeTxPower_M(np)                   ((np)->tx_power)
#define SetNodeTxPower_M(np,val)            ((np)->tx_power = (val))

#define NodeLastReportedRssi_M(np)          ((np)->last_reported_rssi)
#define SetNodeLastReportedRssi_M(np,val)   (NodeLastReportedRssi_M(np) = (val))
#define NodeMaxReportedRssi_M(np)           ((np)->max_reported_rssi)
#define SetNodeMaxReportedRssi_M(np,val)    (NodeMaxReportedRssi_M(np) = (val))
#define NodeMinReportedRssi_M(np)           ((np)->min_reported_rssi)
#define SetNodeMinReportedRssi_M(np,val)    (NodeMinReportedRssi_M(np) = (val))
#define NodeSmoothedReportedRssi_M(np)      ((np)->smoothed_reported_rssi)
#define SetNodeSmoothedReportedRssi_M(np,val) (NodeSmoothedReportedRssi_M(np) = (val))

/* Frame ID for link level packets -- valid values 0 - 255 */

..\include\node.h - Metricom Proprietary - 891212 - page:2
```

```
1.2 FID define     NodeFid(np)                      ((np)->fid)

union
{
    struct
    {
    /* Node status Bit Field(s) */
    unsigned    status          : 3 ;
    unsigned    ack_state       : 1 ;
    unsigned    to_state        : 1 ;
    unsigned    net             : 1 ;
    unsigned    last_data_good  : 1 ;
    unsigned    last_ack_good   : 1 ;
    unsigned    last_tickle_good: 1 ;

unsigned    dummy1          : 7 ;

} bf1 ;

BYTES status_bytes ;

} status_union ;

#define  NodeDoomed(np)           ((np)->status_union.bf1.status ==
DOOMED)
#define  SetNodeDoomed(np)        ((np)->status_union.bf1.status = DOOMED)

#define  NodeTwoWay(np)           ((np)->status_union.bf1.status ==
ACTIVE)
#define  SetNodeTwoWay(np)        ((np)->status_union.bf1.status = ACTIVE)
#define  ResetNodeTwoWay(np)      ((np)->status_union.bf1.status = NO_WAY)

#define  NodeLastDataGood_M(np)   ((np)-
>status_union.bf1.last_data_good)
```

..\include\node.h - Metricom Proprietary - 891212 - page:3

```
#define   SetNodeLastDataGood_M(np,val)  ((np)->status_union.bf1.last_data_good =
(val))
#define   NodeLastAckGood_M(np)              ((np)-
>status_union.bf1.last_ack_good)
#define   SetNodeLastAckGood_M(np,val)   ((np)->status_union.bf1.last_ack_good =
(val))

#define   NodeLastTickleGood_M(np)           ((np)-
>status_union.bf1.last_tickle_good)
#define   SetNodeLastTickleGood_M(np,val)    ((np)-
>status_union.bf1.last_tickle_good = (val))

#define   WaitingForAckAck(np)               ((np)->status_union.bf1.ack_state)
#define   StopWaitingForAckAck(np)   ((np)->status_union.bf1.ack_state = FALSE)
#define   WaitForAckAck(np)                  ((np)->status_union.bf1.ack_state =
TRUE)
#define   WaitingForAck(np)                  ((np)->status_union.bf1.to_state)
#define   StopWaitingForAck(np)              ((np)->status_union.bf1.to_state =
FALSE)
#define   WaitForAck(np)                     ((np)->status_union.bf1.to_state = TRUE)

#define   EMPTY       0         /* redundant #definition */
#define   NAPPING     1
#define   NO_WAY      2
#define   ACTIVE      3
#define   DOOMED      4
#define   NodeStatus(np)                     ((np)->status_union.bf1.status)
#define   SetNodeStatus(np, val)             ((np)->status_union.bf1.status = val)
#define   NodeNet(np)                        ((np)->status_union.bf1.net)
#define   SetNodeNet(np, val)                ((np)->status_union.bf1.net = val)

#define   NodeStatusBytes_M(np)              ((np)->status_union.status_bytes)

PLATFORM  *rx_dp ;

#define   NodeRcvdPacket(np)                 ((np)->rx_dp)
#define   SetNodeRcvdPacket(np,pp)           ((np)->rx_dp = pp)

..\include\node.h - Metricom Proprietary - 891212 - page:4
```

```
        UTINY           ack_tries ;

#define     NodeAckTries(np)                  ((np)->ack_tries)
#define     IncrementNodeAckTries(np)         ((np)->ack_tries++)
#define     ClearNodeAckTries(np)             ((np)->ack_tries = 0)

MCLOCK_TIMER    ack_timer ;       /* when to retry ACK */ define     NodeAckTimer_M(np)                ((np)->ack_timer)
define     NodeAckTimerPtr(np)               (&((np)->ack_timer))

PLATFORM    *to_dp ;

#define     NodeTxPacket(np)                  ((np)->to_dp)
#define     SetNodeTxPacket(np,pp)            ((np)->to_dp = pp)

UTINY           to_tries ;

#define     NodeToTries(np)                   ((np)->to_tries)
#define     IncrementNodeToTries(np)          ((np)->to_tries++)
#define     SetNodeToTries(np,val)            ((np)->to_tries = (val))
#define     ClearNodeToTries(np)              ((np)->to_tries = 0)

MCLOCK_TIMER    retry_timer ;     /* when to retry DATA */ define     NodeDataRetryTimer_M(np)          ((np)->retry_timer)
define     NodeDataRetryTimerPtr(np)         (&((np)->retry_timer))

/* the 'sequence num' sent */
        UCOUNT      sent_seq_num ;

#define     NodeSeqNum_M(np)                  ((np)->sent_seq_num)
#define     SetNodeSeqNum_M(np,val)           ((np)->sent_seq_num = (val))
```

```
        /* Tickers delta */
ARG     delta_tick ;    /* the major number for synchronization */ define    NodeDeltaTick_M(np)                    ((np)->delta_tick)
define    SetNodeDeltaTick_M(np,val)             ((np)->delta_tick = (val))

/* this is the scanner alarm to signal the 'rotating' of the
   'current_data_[re]tries' into 'last_data_[re]tries' bins */
MCLOCK_TIMER    scanner_alarm ;
#define    NodeScannerAlarm_M(np)                 ((np)->scanner_alarm)
#define    NodeScannerAlarmPtr_M(np)              (&(np)->scanner_alarm)

/* we keep two buckets... 'last' and 'current'. These are separated by
   "RamScannerInterval_M". Total == 'last' + 'current'. */
ULONG     last_data_sent, current_data_sent ;

#define    NodeLastDataSent_M(np)                 ((np)->last_data_sent)
#define    NodeCurrentDataSent_M(np)              ((np)->current_data_sent)
#define    ResetNodeCurrentDataSent_M(np)         ((np)->current_data_sent = 0)
#define    SetNodeLastDataSent_M(np,val)          ((np)->last_data_sent = (val))
#define    NodeTotalDataSent(np)                  ((np)->last_data_sent + (np)->current_data_sent)
#define    IncrementTotalDataSent(np)             ((np)->current_data_sent++)

/* we keep two buckets... 'last' and 'current'. These are separated by
   "RamScannerInterval_M". Total == 'last' + 'current'. */
ULONG     last_data_retries, current_data_retries ;

#define    NodeLastDataRetries_M(np)              ((np)->last_data_retries)
#define    NodeCurrentDataRetries_M(np)           ((np)->current_data_retries)
#define    ResetNodeCurrentDataRetries_M(np)      ((np)->current_data_retries = 0)
#define    SetNodeLastDataRetries_M(np,val)       ((np)->last_data_retries = (val))
#define    NodeTotalRetries(np)                   ((np)->last_data_retries + (np)->current_data_retries)
#define    IncrementTotalRetries(np)              ((np)->current_data_retries++)

..\include\node.h - Metricom Proprietary - 891212 - page:6
```

```
ULONG            data_rcvd ;                    /* DATA packets received */ define     NodeTotalDataRcvd(np)              ((np)->data_rcvd)
define     IncrementTotalDataRcvd(np)         ((np)->data_rcvd++)
#define     SetNodeTotalDataRcvd(np,val)       ((np)->data_rcvd = (val))

#define     TEN_MINUTES                        (600)
#define     ONE_HOUR                           (3600)
#define     MIN_INTERVAL                       ONE_HOUR
#define     MAX_INTEREXCHANGE_INTERVAL         (UINT_MAX)

#define     NODE_MAINT_INTERVAL_FUZZ  (15)
#define     MaintPeriodFuzz(x)                 (rand() & NODE_MAINT_INTERVAL_FUZZ)
#define     ContactPeriodFuzz(x)               (rand() & NODE_MAINT_INTERVAL_FUZZ)

#define     WAIT_BEFORE_LINKING                (10)
            /* for timestamps and linkinfo packets */
    MCLOCK_TIMER    maint_alarm ;       /* reminder for LinkInfo */
    MCLOCK_TIMER    last_exchange ;     /* last time ACK for us from NODE */
    MCLOCK_TIMER    last_contact ;      /* last time we heard them - alarm */
    MCLOCK_TIMER    last_heard ;        /* last time we heard them - time */ define     NodeMaintAlarm(np)                 ((np)->maint_alarm)
define     NodeMaintAlarmPtr(np)              (&(NodeMaintAlarm(np)))
#define     NodeLastExchange(np)               ((np)->last_exchange)
#define     NodeLastExchangeTimerPtr(np)       (&((np)->last_exchange))
#define     NodeContactAlarm(np)               ((np)->last_contact)
#define     NodeContactAlarmPtr(np)            (&((np)->last_contact))
#define     NodeLastHeardTimer_M(np)           ((np)->last_heard)
#define     NodeLastHeardTimerPtr_M(np)        (&((np)->last_heard))

#define     NODE_MAINT_STATUS_INIT             (0)    /* try link_info first */
#define     NODE_MAINT_STATUS_TIMESTAMP        (1)    /* then try timestamp */
#define     NODE_MAINT_STATUS_LINK_INFO        (2)    /* until link_info rcvd */
```

```c
union
    struct
    {
        /* link maintenance status of node (one of MAINT_STATUS) */
        unsigned    maint_status    : 2 ;
        unsigned    maintain        : 1 ;
        unsigned    on_fast_maint_list : 1 ;
        unsigned    on_slow_maint_list : 1 ;
        unsigned    maint_protocol  : L2_PROTOCOL_BIT ; /* six bits */
    } bf2 ;

BYTE maint_byte ;

) maint_union ;

#define     NodeMaintStatus(np)                         ((np)-
>maint_union.bf2.maint_status)
#define     SetNodeMaintStatus(np,st)                   ((np)->maint_union.bf2.maint_status
= (st))

#define     NodeMaintain_M(np)                          ((np)->maint_union.bf2.maintain)
#define     SetNodeMaintain_M(np,val)                   ((np)->maint_union.bf2.maintain =
(val))

#define     NodeOnFastList(np)                          ((np)-
>maint_union.bf2.on_fast_maint_list)
#define     SetNodeOnFastList(np,val)                   ((np)->maint_union.bf2.on_fast_maint_list = (val))
#define     NodeOnSlowList(np)                          ((np)-
>maint_union.bf2.on_slow_maint_list)
#define     SetNodeOnSlowList(np,val)                   ((np)->maint_union.bf2.on_slow_maint_list = (val))

#define     NodeMaintProtocol(np)                       ((L2_PROTOCOL)((np)-
>maint_union.bf2.maint_protocol))
#define     SetNodeMaintProtocol(np,val)                ((np)->maint_union.bf2.maint_protocol
= (val))

..\include\node.h - Metricom Proprietary - 891212 - page:8
```

```
#define         NodeMaintByte_M(np)                     ((np)->maint_union.maint_byte)

/* information sent by the other node */
struct
(
    ULONG       age ;
    UCOUNT      status ;
    UCOUNT      seq_num ;
    DEV_ADDR    dev_addr ;          /* if status is routable */

UTINY       octant[OCTANT_COUNT] ;

) info ;

#define         NodeInfoAge(np)                         ((np)->info.age)
#define         NodeInfoStatus(np)                      ((np)->info.status)
#define         NodeInfoSeqNum_M(np)                    ((np)->info.seq_num)
#define         NodeInfoDevAddrPtr_M(np)                (&((np)->info.dev_addr))

#define         NodeBatteryBacked_M(np)                 ((np)->info.status &
L2_LINK_INFO_STATUS_PERSISTENT)
#define         NodeRouteable_M(np)                     ((np)->info.status &
L2_LINK_INFO_STATUS_ROUTABLE)

#define         NodeInfoSeqNum_M(np)                    ((np)->info.seq_num)
#define         NodeInfoDevAddrPtr(np)                  (&((np)->info.dev_addr))

#define         NodeOctantCount(np,x)                   ((np)->info.octant[(x)])

/* how many naps */
    UTINY       naps ;

#define         MAX_NODE_NAPS                           (24)
#define         NodeNaps(np)                            ((np)->naps)
#define         IncrementNodeNaps(np)                   ((np)->naps++)
#define         ClearNodeNaps(np)                       ((np)->naps = 0)
```

```
/* maintenance linked list storage */
        NODE    *next_to_maintain ;
#define         NodeNextToMaintain_M(np)        ((np)->next_to_maintain)
#define         SetNodeNextToMaintain_M(np,val) ((np)->next_to_maintain = \
(val))

ULONG   test_packets ;

#define         NodeTestPackets_M(np)           ((np)->test_packets)
#define         SetNodeTestPackets_M(np, val)   ((np)->test_packets = (val))
#define         IncrementNodeTestPackets_M(np)  ((np)->test_packets++)

ULONG   tickle_tries, tickle_successes ;

#define         NodeTickleTries_M(np)               ((np)->tickle_tries)
#define         SetNodeTickleTries_M(np,val)        ((np)->tickle_tries = (val))
#define         IncrementNodeTickleTries_M(np)      ((np)->tickle_tries++)
#define         NodeTickleSuccesses_M(np)           ((np)->tickle_successes)
#define         SetNodeTickleSuccesses_M(np,val)    ((np)->tickle_successes = (val))
#define         IncrementNodeTickleSuccesses_M(np)  ((np)->tickle_successes++)

} ;

#define NUM_NODES       200
#define MIN_FREE_NODES  (OCTANT_COUNT + 4)

/* ***************** end of  N O D E   D E F I N I T I O N  ***************** */

IMPORT  VOID    FailNode( NODE *dead_np ) ;
IMPORT  VOID    DeleteDoomedNodes( MSUBNET net ) ;
IMPORT  NODE    *FindNodeGivenLinkPtr( LINK_ADDR *lp, MSUBNET net ) ;
IMPORT  NODE    *MakeNodeGivenLinkPtr( LINK_ADDR *lp, MSUBNET net ) ;
IMPORT  UCOUNT  smooth( ARG current, ARG new ) ;

..\include\node.h - Metricom Proprietary - 891212 - page:10
```

```
IMPORT    VOID UpdateNode( NODE *np, ARG delta tick, BYTES rssi, BYTES discriminator,
UTINY rx signal ) ;

IMPORT    VOID AddAllOctantInfo( UTINY octants[] ) ;
IMPORT    BOOL CloserThan( LINK_ADDR *link_ptr, WAN_ADDR *dest_wan, DISTANCE distance
) ;
IMPORT    UCOUNT    LinksPerSubnet( MSUBNET subnet ) ;
IMPORT    UCOUNT    SequenceNumber( NODE *input np ) ;

IMPORT    BOOL DeleteStalestIANnode(VOID) ;
IMPORT    VOID MakeNodeRoom( VOID ) ;

IMPORT    VOID NapNode( NODE *np ) ;
IMPORT    VOID SetNodeActiveState( NODE *np ) ;
```

..\include\node.h - Metricom Proprietary - 891212 - page:11

Appendix B
Listing TICKER C
©Copyright (unpublished work) Metricom, Inc.
All rights reserved.

```
#include <dos.h>
include <stdio.h>
include <stdlib.h> include "std.h"
include "kernel.h"
#include "net.h"

#include "mclock.h"
#include "mtime.h"
#include "addr.h"

#include "l0.h"
#include "l1.h"
#include "l2.h"
#include "l2lanwan.h"
#include "node.h"
#include "l3.h"
#include "l3lanwan.h"
#include "platform.h"
#include "config.h"

/************************************************************
 *
 *    ticker.c
 *
 *    VOID SetsingleFreq( BOOL yes_no )
 *    BOOL SingleFreq(VOID)
 *
 *    Set and test for 'single freq' (frequency == start_divisor) operation.
 *    When set, the PLL will be set to the 'start divisor' at the next
 *    'slot edge'.
``` ticker.c - Metricom Proprietary - 891212 - page:1

```
 *    UCOUNT target_tick( ARG delta_tick )
 *
 *    Calculates the 'epoch tick' that a remote radio is on given its
 *    'delta_tick'. The 'delta_tick' is calculated at receipt of packet time
 *    from the 'tick' that the sender puts into the packet and the
 *    Home.slot/Home.tick at time of receipt of StartFlag sequence.
 *
 *    VOID SetTraveling( ARG delta_tick )
 *
 *    Sets the 'Current.tick/Current.slot' to values which are time coincident
 *    with a remote radios HomeSlot/Home.tick. Current.slot/Current.tick are used
 *    to set our PLL, so when we are 'traveling', our PLL and slotting timing
 *    is synchronized with the remote node.
 *
 *    LOCAL VOID    send_octet( ARG octet )
 *    LOCAL BOOL    SetPll( UCOUNT sda_n, UCOUNT divisor, UCOUNT cb1, UCOUNT cb2 )
 *
 *    Set the PLL divisor, and control bytes. SetPll calls 'send_octet' to
 *    send a stream of bits out to the PLL using parallel port lines. Consult
 *    chip documentation for the meanings of the PLL control bytes. 'divisor'
 *    should be between MIN_PLL_DIVISOR and MAX_PLL_DIVISOR for operation
 *    within the ISM band. SetPll returns TRUE iff the PLL responded with
 *    an acknowledgement of the programming sequence.
 *
 *    [TASK]
 *    VOID Ticker(VOID)
 *
 *    Started up every 'tick', this task keeps track of the 'slots', 'ticks',
 *    'seconds', and performs 'traveling' arithmetic.
 *
 ***********************************************************************/

LOCAL    UCOUNT    clock_tick_counter ;
```

```
UCOUNT      NumChannels ;
UCOUNT      SingleFreqChannel = 100 ;

LOCAL       BOOL  traveling ;

TICKSLOT    Home, Current ;

LOCAL, BOOL,     set_pll = FALSE ;

LOCAL, BOOL,     single_freq = FALSE ;
BOOL        singleFreq(VOID) ( return single_freq ; )
VOID        setSingleFreq( BOOL yes_no ) ( single_freq = yes_no ; )

UCOUNT           Countdown1 = 0 ;
VOID        setCountdown1( UCOUNT val )
(
    Countdown1 = val ;
)

/*  we got 'delta_tick' by subtracting remote epoch from our epoch

DeltaTick = RemoteTick - OurTick ;

to get back, we add OurTick to DeltaTick

Remote_Tick = DeltaTick + OurTick ;
*/
UCOUNT target_tick( ARG delta_tick )
(
    FAST LONG remote_tick ;

remote_tick = (LONG)delta_tick + (LONG)(Home.tick + (Home.slot *
TICKS_PER_SLOT)) ;

if( remote_tick < 0 )
    (
```

```
            remote_tick += (NUM_SLOTS * TICKS_PER_SLOT) ;
    else if( remote_tick >= (NUM_SLOTS * TICKS_PER_SLOT) )
    {
            remote_tick -= (NUM_SLOTS * TICKS_PER_SLOT) ;
    }
    return( (UCOUNT)remote_tick ) ;
}

/*
VOID test_target_tick(VOID)
{
    ARG   i, j ;

for( i = -20500; i < 20500; i++ )
    {
        if( abs( (j = target_tick(i))) > 20500U )
        {
            printf( "target_tick returns %d\n", j ) ;
        }
    }
}
*/

VOID SetTraveling( ARG delta_tick )
{
    FAST UCOUNT   t_tick ;

/* make sure we are not interrupted */
    disable() ;

if( delta_tick )
    {
            /* calculate the remote slot and tick to assume */
            t_tick        = target_tick( delta_tick ) ;
            Current.slot  = t_tick / TICKS_PER_SLOT ;
```

```
        Current.tick    = t_tick % TICKS_PER_SLOT ;
        traveling       = TRUE ;
        }
    else
        {
        traveling       = FALSE ;
        }
    /* since this routine is used to 'return' from a remote slot,
       we ask that the PLL be set in all cases */
    set_pll             = TRUE ;
    enable() ;

if( Current.slot > NUM_CHANNELS )
    {
    printf( "SetTraveling-> Current.slot to:%d, t_tick:%u delta_tick:%d\n",
            Current.slot, t_tick, delta_tick ) ;
    }
printf( "Home.tick:%u Home.slot:%u\n", Home.tick, Home.slot ) ;

/* allow the VCO to settle */
sys_pend(0,FIRST_ACTIVITY_TICK) ;
}

ULONG       start = 1L ;

/* From "Seminumerical Algorithms, Vol 2, Knuth". Pages 1 through 177 with
   special interest in pages 11 through 17 */
UCOUNT mrand( VOID )
{
    return( (UCOUNT)((start = start * 214013UL + 2531011UL) >> 16) & 0x7fff ) ;
}

UCOUNT      channel[NUM_CHANNELS] ;
``` ticker.c - Metricom Proprietary - 891212 - page:5

```c
LOCAL VOID init_channel_table(VOID)
{
    ARG      i, slot ;

/* convert slots to channels */
    for( slot = 0; slot < NUM_SLOTS; )
    {
        UCOUNT     try ;

try = ((mrand() % NUM_SLOTS) + START_CHANNEL) ;

/* see if we are already using this channel */
        for( i = 0; i < slot; i++ )
        {
            if( channel[i] == try ) { break ; }
        } if( i >= slot )    { channel[slot] = try ; slot++ ; }
    } ifdef DEBUG
    /* detect if there are any dups */
    for( i = 0; i < NUM_SLOTS; i++ )
    {
        ARG j ;

for( j = i + 1; j < NUM_SLOTS; j++ )
        {
            if( channel[i] == channel[j] )
            {
                printf( "channel[%d] and channel[%d] match:%d\n",
                        i, j, channel[i] ) ;
            }
        }
    }

/* detect possible omissions */
    for( i = START_CHANNEL; i < (NUM_SLOTS + START_CHANNEL); i++ )
```

```
        ARG   j ;

for( j = 0; j < NUM_SLOTS; j++ )
        {
            if( channel[j] == i )    ( break ; )
        } if( j >= NUM_SLOTS )    ( printf( "didn't find a %u\n", i ) ; )

/* print the winners */
        for( i = 0; i < NUM_SLOTS; i++ )
        {
            if( !(i % 5) ) printf( "\n" ) ;
            printf( "s[%-3u]:%-3u ", i, channel[i] ) ;
        }
#endif
    )

BOOL GoToSlot( BOOL receive )
(
    UCOUNT    ch ;
    ARG       tries ;

if( single_freq )    ( ch = SingleFreqChannel ; )
    else                 ( ch = channel[Current.slot] ; )

for( tries = NUM_PLL_PROGS_PER_TICK; tries; tries-- )
    {
        if( sys_wan_freq(ch, receive) == TRUE )
        {
            ARG    locked_tries = 2 ;

while( locked_tries-- )
            (
``` ticker.c - Metricom Proprietary - 891212 - page:7

```
                    /* wait for a bit in any case (sigh) */
                    sys_pend(0,1) ;

if( sys_locked_pll() == TRUE )
                    (
                            /* everything is OK */
                            return TRUE ;
                    )
            )
            else
            (
                    /* PLL didn't respond to the programming sequence
                       OR 'freq' was NOT ok */
                    if(Gabby() == 0 ) printf("GoToSlot %u, Current.slot:%u -- loses\n",
                       ch, Current.slot ) ;

return FALSE ;
            )
    )

/* [TASK] */
VOID Ticker(VOID)
(
    Home.slot                  = rand() % NUM_SLOTS ;
    Home.tick                  = (rand() % TICKS_PER_SLOT) ;
    Home.ticks_per_slot        = TICKS_PER_SLOT ;
    Current.ticks_per_slot     = TICKS_PER_SLOT ;

#ifdef TICKER_VISIBILITY
    printf( "Home.slot:%u Home.tick:%u Home.ticks_per_slot:%u\n",
       Home.slot, Home.tick, Home.ticks_per_slot ) ;

printf( "Timebase error:%u ppm\n", TIMEBASE_ERROR ) ;
    printf( "TicksPerSlot:%u TicksPerEpoch:%u msPerTick:%u usPerTick:%u\n",
``` ticker.c - Metricom Proprietary - 891212 -- page:8

```
                TICKS_PER_SLOT, (NUM_SLOTS * TICKS_PER_SLOT), MS_PER_TICK,
MICROSEC_PER_TICK ) ;

printf( "TicksPerSec:%u usPerSlot:%lu\n",
                TICKS_PER_SEC, MICROSEC_PER_SLOT ) ;

printf( "NumPllProgsPerTick:%u  VCOSettlingTime:%u\n",
                NUM_PLL_PROGS_PER_TICK, VCO_SETTLING_TICK ) ;

printf( "PiggybackDataTick:%u FirstDataTick:%u RefractoryPeriod:%u\n",
TickDataDuration:%u\n",
                PIGGYBACK_DATA_TICK, FIRST_DATA_TICK, REFRACTORY_PERIOD, TICK_DATA_DURATION
) ;

printf( "FirstAckTick:%u SecondAckTick:%u\n",
                FIRST_ACK_TICK, SECOND_ACK_TICK ) ;

endif traveling           = FALSE ;
        clock_tick_counter  = 0 ;

/* perform slot to channel conversion ONCE */
        init_channel_table() ;

/* enable the WAN receiver */
        sys_wan_clear() ;

/* inform tasks that the Nodelists are ready */
        sys_post( WAN_NODELIST_FREE_EVENT ) ;
        sys_post( LAN_NODELIST_FREE_EVENT ) ;
        sys_post( LAN_MAINT_LIST_EVENT ) ;
        sys_post( WAN_MAINT_LIST_EVENT ) ;

while(TRUE)
        {
                /* await next sys tick */
                sys_wait() ;
```

```c
/* count down the Countdown counter(s) */
if( Countdown1 )   ( Countdown1-- ; )

/* perform the "Real Time" functions */
if( ++clock_tick_counter >= TICKS_PER_SEC )
(
    TickMclock(1,TIMEBASE_ERROR) ;
    clock tick counter = 0 ;
)

/* If at a 'Slot Edge' */
if( ++Home.tick >= TICKS_PER_SLOT )
(
    Home.tick = 0 ;
    if( ++Home.slot >= NUM_SLOTS )      Home.slot = 0 ;

/* traveling == TRUE iff we are NOT on our home slot...
      i.e., we are 'traveling' to the home slot of another
      radio in order to transmit data */
if( traveling )
(
    if( ++Current.tick >= TICKS_PER_SLOT )    /* end of slot */
    (
        Current.tick = 0 ;
        if( ++Current.slot >= NUM_SLOTS )
        (
            Current.slot = 0 ;
        )
    )
)
else
(
    Current.slot = Home.slot ;
    Current.tick = Home.tick ;
)

/* set PLL on the Slot Edge */
if( Current.tick == 0 )  ( set_pll = TRUE ; )
```

```c
        if( (set_pll == TRUE) && (!single_freq) )
        {
            if( sys_wan_freq(channel[Current.slot], RECEIVE) == TRUE )
            {
                set_pll = !sys_locked_pll() ;
            }
        }
    }

/* routines used in l2wan for calculating delays between packets */
UCOUNT  CalcEndSlot( ARG start_slot, ARG slots )
{
    UCOUNT   end_slot ;

end_slot = start_slot + slots ;

if( end_slot >= NUM_SLOTS )
    {
        end_slot -= NUM_SLOTS ;
    } return end_slot ;
}

/* use Home.slot/tick because we are NOT traveling */
UCOUNT  TicksTillNextAck( ARG quit_slot, ARG listen_slot )
{
    FAST UCOUNT   now_slot, now_tick ;
    UCOUNT        ticks_till ;

now_slot = Home.slot ;
    now_tick = Home.tick ;
```

```
if( now_slot == quit_slot )
{
    /* if already at the 'quiting slot'... wait no longer */
    ticks_till = MINIMUM_PEND_TIME ;
}
else if( now_slot == listen_slot )
{
    /* if in the 'listen_slot' wait till the 'quitting slot' */
    ticks_till = (TICKS_PER_SLOT - now_tick) ;
}
/* too fast
else if( now_tick < FIRST_ACK_TICK )
{
    ticks_till = (FIRST_ACK_TICK - now_tick) ;
}
end of too fast */
else if( now_tick < SECOND_ACK_TICK )
{
    ticks_till = (SECOND_ACK_TICK - now_tick) ;
}
else
{
    ticks_till = (TICKS_PER_SLOT - now_tick + FIRST_ACK_TICK) ;
}
if( ticks_till == 0 )
{
    return MINIMUM_PEND_TIME ;
}
else
{
    return ticks_till ;
}
```

```c
/* routine used in LAN/WAN schedule_and_sweep() */
UCOUNT   TicksToAlarm( MCLOCK_TIMER *timer, MCLOCK_TIMER *expire )
{
    UCOUNT   return_val ;

if( IsExpiredMclockTimer(timer, expire) )
    {
        return_val = 0 ;
    }
    else
    {
        ULONG    ticks_till_expiration ;

ticks_till_expiration = DeltaMclockTimer(expire, timer) * TICKS_PER_SEC ;

if( ticks_till_expiration > UCOUNT_MAX )
        {
            return_val = UCOUNT_MAX ;
        }
        else
        {
            return_val = (UCOUNT)ticks_till_expiration ;
        }
    } if( return_val == 0 )    ( return MINIMUM_PEND_TIME ; )
    else                     ( return return_val ; )
}

UCOUNT   TicksTillSlot( UCOUNT slot )
{
    UCOUNT   now_slot, now_tick, return_val ;

now_slot = Current.slot ;
    now_tick = Current.tick ;
``` ticker.c - Metricom Proprietary - 891212 - page:13

```c
    if( now_slot == slot )
    {
        /* return Minimum we can pend */
        return_val = 0 ;
    }
    else if( now_slot < slot )
    {
        return_val = (((slot - 1) - now_slot) * TICKS_PER_SLOT) + (TICKS_PER_SLOT - now_tick) ;
    }
    else
    {
        return_val = (TICKS_PER_SLOT - now_tick) + ((NUM_SLOTS - 1 - now_slot) *
             TICKS_PER_SLOT) + (slot * TICKS_PER_SLOT) ;
    } if( return_val == 0 )
    {
        return MINIMUM_PEND_TIME ;
    }
    else
    {
        return return_val ;
    }
}

VOID WaitTillRightTick( UCOUNT tick )
{
    UCOUNT   current, pend_ticks ;

/* integer assignments are atomic */
    current = Current.tick ;

pend_ticks = current <= tick
        ? tick - current
        : TICKS_PER_SLOT - current + tick ;

if( pend_ticks == 0 )
```

```
        {
            sys_pend( 0, MINIMUM_PEND_TIME ) ;
        }
        else
        {
            sys_pend( 0, pend_ticks ) ;
        }
``` ticker.c - Metricom Proprietary - 891212 - page:15

Appendix C
Listing L2MAINT C
©Copyright (unpublished work) Metricom, Inc.
All rights reserved.

```c
#include <dos.h>
include <stdio.h> include "std.h"
include "kernel.h"
#include "net.h"

#include "mtime.h"
#include "mclock.h"
#include "addr.h"
#include "angle.h"

#include "l0.h"
#include "l1.h"
#include "l2.h"
#include "l2lanwan.h"
#include "node.h"
#include "l3.h"
#include "l3lanwan.h"
#include "scan.h"
#include "platform.h"
#include "config.h"

#include "netutil.h"

/*****************************************************************
 *
 *    l2maint.c
 *
 *    This source file contains routines to process and generate
 *    maintenance frames -- NULL, TEST, SYNC, TIMESTAMP, TIMESTAMP_INQUIRY,
 *    LINK_INFO, and LINK_INFO_INQUIRY.
 *
 *
 *    NODE *LANStartOfFastMaintList
 *    NODE *LANStartOfSlowMaintList
 *    NODE *WANStartOfFastMaintList
``` l2maint.c - Metricom Proprietary - 891212 - page:1

```
*    NODE  *WANStartOfSlowMaintList
*
*    These NODE pointers contain the first (next to be maintained) NODE in
*    the node maintenance linked list. If set to NULLNP, there are no nodes
*    in the list to be maintained.
*
*
*    MCLOCK_TIMER    LAN_maintenance timer
*    MCLOCK_TIMER    WAN_maintenance timer
*
*    ARG       NumInMaintList( MSUBNET net )
*
*    Returns the number of NODEs in the maintenance list for MSUBNET 'net'.
*
*
*    NODE *GetMaint( MSUBNET net )
*
*    Deletes the next NODE to be maintained on MSUBNET 'net' from the
*    appropriate Maintainence linked list and returns it. If the maintenance
*    is aborted for some reason, the 'np' returned may be put back on the
*    maintenance list.
*
*
*    VOID del_maint( NODE *np )
*    VOID DelEvenIfNotOnMaintList( NODE *np )
*
*    Deletes the NODE 'np' from the appropriate maintenance list if it is
*    on the list. There is no return value.
*
*    DelEvenIfNotOnMaintList(np) is the Exported version.
*
*
*    VOID AddMaint( NODE *np, BOOL fast, L2_PROTOCOL protocol )
*
*    Adds the NODE 'np' to the appropriate maintenance list. 'Fast' maintenance
*    is for acquisition related maintenance, while 'slow' maintenance is for
*    timer expirations. The Maintenance packet is sent out with every effort
*
*                         l2maint.c - Metricom Proprietary - 891212 - page:2
```

```
 *   to set L2_PROTOCOL to protocol.
 *
 *   This provides the import/export routines for the L2_LINK_INFO
 *   object.  This provides the following functions:
 *
 *       unsigned char   *ExportL2LinkInfo(buf,link_info,msubnet)
 *       unsigned char   *buf ;
 *       L2_LINK_INFO    *link_info ;
 *       MSUBNET         msubnet ;
 *
 *   Export the L2_LINK_INFO object into *buf, returning a pointer
 *   into buf[] just past the exported L2_LINK_INFO object.  Msubnet
 *   is the subnet code.
 *
 *       unsigned char   *ImportL2LinkInfo(link_info,buf,msubnet)
 *       L2_LINK_INFO    *link_info ;
 *       unsigned char   *buf ;
 *       MSUBNET         msubnet ;
 *
 *   Import a L2_LINK_INFO object from *buf, returning a pointer
 *   into buf[] just past the imported L2_LINK_INFO object.  Msubnet
 *   is the subnet code.
 *
 *       BOOLEAN     SendMaint( np, link_src_ptr, protocol, ftype )
 *       NODE        *np ;
 *       LINK_ADDR   *link_src_ptr ;
 *       L2_PROTOCOL  protocol ;
 *       L2_FTYPE    ftype ;
 *
 *   Called to send a maintenance frame to the node *np from the source
 *   LINK_ADDR *link_src_ptr.  It sends a maintenance frame of the given
 *   protocol and the given frame type (DATA_ACK or DATA_NOACK).
 *
 *   This returns TRUE iff the maintenance frame was scheduled.
 *
``` l2maint.c - Metricom Proprietary - 891212 - page:3

```
 *
 *      VOID      UpdateMaint( pp )
 *      PLATFORM  *pp ;
 *
 *      Called to update the value (at the "last moment") before sending a
 *      maintenance frame.
 *
 *      VOID      RecvMaint( pp )
 *      PLATFORM  *pp ;
 *
 *      Processes a received maintenance frame.  This always frees the
 *      platform pp.
 *
 ************************************************************************/

/* accelerate the Acquisition Phase for the WAN */
#define     ACQUISITION_MAINT_GATE          (15)

/* the 'anchors' for the maintenance linked lists - start of search */
NODE  *LANStartOfFastMaintList = NULLNP ;
NODE  *LANStartOfSlowMaintList = NULLNP ;
NODE  *WANStartOfFastMaintList = NULLNP ;
NODE  *WANStartOfSlowMaintList = NULLNP ;

LOCAL VOID      pend_for_maint_list( MSUBNET net )
{
     /* acquire the Maint List for ourselves */
     if( net == MSUBNET_LAN ) ( sys_pend( LAN_MAINT_LIST_EVENT, 0 ) ; )
     else                     ( sys_pend( WAN_MAINT_LIST_EVENT, 0 ) ; )
}

LOCAL VOID      release_maint_list_ownership( MSUBNET net )
{
``` l2maint.c - Metricom Proprietary - 891212 - page:4

```c
    /* free the Maint list for others */
    if( net == MSUBNET_LAN ) { sys_post( LAN_MAINT_LIST_EVENT ) ; }
    else                     { sys_post( WAN_MAINT_LIST_EVENT ) ; }
}

MCLOCK_TIMER   LAN_maintenance_timer = 0 ;
MCLOCK_TIMER   WAN_maintenance_timer = 0 ;

ARG    NumInMaintList( MSUBNET net )
ARG
{
    ARG     count ;
    NODE *start ;

/* get the list for ourselves */
    pend_for_maint_list(net) ;

if( net == MSUBNET_LAN ) { start = LANStartOfFastMaintList ; }
    else                     { start = WANStartOfFastMaintList ; }

/* initialize the count */
    for( count = 0; start != NULLNP; count++ )
    {
        start = start->next_to_maintain ;
    } if( net == MSUBNET_LAN ) { start = LANStartOfSlowMaintList ; }
    else                     { start = WANStartOfSlowMaintList ; } for( /* save the count */ ; start != NULLNP; count++ )
    {
        start = start->next_to_maintain ;
    } release_maint_list_ownership(net) ;
    return count ;
```

```c
NODE *GetMaint( MSUBNET net )
{
    NODE **start_ptr, *found ;
    BOOL fast = TRUE ;

pend_for_maint_list(net) ;

if( net == MSUBNET_LAN )
    {
        if( *(start_ptr = &LANStartOfFastMaintList) == NULLNP )
        {
            start_ptr = &LANStartOfSlowMaintList ;
            fast = FALSE ;
        }
    }
    else /* MSUBNET == WAN */
    {
        if( *(start_ptr = &WANStartOfFastMaintList) == NULLNP )
        {
            start_ptr = &WANStartOfSlowMaintList ;
            fast = FALSE ;
        }
    }

/* get the first Node on the list */
    if( *start_ptr != NULLNP )
    {
        /* save the first one that we found */
        found = *start_ptr ;

/* move the pointers 'around' the NODE we're returning */
        *start_ptr = (*start_ptr)->next_to_maintain ;

/* reset 'list state' bits in 'found' NODE */
        if( fast )   ( SetNodeOnFastList(found,FALSE) ; )
        else         ( SetNodeOnSlowList(found,FALSE) ; )

SetNodeNextToMaintain_M(found,NULLNP) ;
    }
}
```

```c
            else
                {
                found = NULLNP ;
                }
        }
    if( Gabby() == GABBY_MAINT) printf( "GetMaint exit... *start_ptr:%p found:%p fast:%u\n", *start_ptr, found, fast ) ;

release maint list ownership( net ) ;
    return found ;
    }

/* NOTE... this routine is NOT protected... it MUST be protected otherwise */
LOCAL VOID    del_maint( NODE *np )
    {
    NODE **start_ptr ;

if( Gabby() == GABBY_MAINT) printf( "del_maint( %p )entry\n", np ) ;

if( np == NULLNP )  { return ; } if( NodeOnFastList(np) )
        {
        if( NodeNet(np) == MSUBNET_LAN )    ( start_ptr = &LANStartOfFastMaintList ;
        else
                                            ( start_ptr = &WANStartOfFastMaintList ; )
        }
    else if( NodeOnSlowList(np) )
        {
        if( NodeNet(np) == MSUBNET_LAN )    ( start_ptr = &LANStartOfSlowMaintList ;
        else
                                            ( start_ptr = &WANStartOfSlowMaintList ; )
        }
    else
        {
        if(Gabby() == GABBY_MAINT) sys_puts( "del_maint... np not on any list\n" ) ;
        return ;
``` l2maint.c - Metricom Proprietary - 891212 - page:7

```c
        /* look till we find the target NODE */
        while( *start_ptr != np )
        {
            start_ptr = &((*start_ptr)->next_to_maintain) ;
        }

/* commit suicide in this undefined state */
        if( *start_ptr == NULLNP )  ( Die(MAINT_START_POINTER_INVALID) ; )

/* now, delete the NP */
        if( NodeOnFastList(np) )  ( SetNodeOnFastList(np,FALSE) ; )
        else                      ( SetNodeOnSlowList(np,FALSE) ; )

/* move the pointers 'around' the deleted NODE... */
        *start_ptr = np->next_to_maintain ;
        SetNodeNextToMaintain_M(np, NULLNP) ;
    }

VOID DelEvenIfNotOnMaintList( NODE *np )
{
    pend_for_maint_list(NodeNet(np)) ;
    del_maint(np) ;
    release_maint_list_ownership( NodeNet(np) ) ;
}

VOID AddMaint( NODE *np, BOOL fast, L2_PROTOCOL protocol )
{
    NODE  **start_ptr, *current ;

if( Gabby() == GABBY_MAINT) printf( "AddMaint( %p %u )entry\n", np, fast ) ;

/* acquire the Maint List for ourselves */
    pend_for_maint_list( NodeNet(np) ) ;

/* If already on the fastest maintenance list... */
    if( NodeOnFastList(np) )
```

```c
        release_maint_list_ownership( NodeNet(np) ) ;
        return ;
    }
    /* ...else, already on the slow. */
    if( NodeOnSlowList(np) )
    {
        if( fast )      ( del_maint(np) ; )
        else
        {
            release_maint_list_ownership( NodeNet(np) ) ;
            return ;
        }
    } if( NodeNet(np) == MSUBNET_LAN )
    {
        if( fast )      ( start_ptr = &LANStartOfFastMaintList ; )
        else            ( start_ptr = &LANStartOfSlowMaintList ; )
    }
    else
    {
        if( fast )      ( start_ptr = &WANStartOfFastMaintList ; )
        else            ( start_ptr = &WANStartOfSlowMaintList ; )
    } if( (current = *start_ptr) == NULLNP ) ( *start_ptr = np ; )
    else
    {
        /* look for the LAST maintained node */
        while( current->next_to_maintain != NULLNP )
        {
            current = current->next_to_maintain ;
        }
        /* now at end of list */
        current->next_to_maintain = np ;
```

```
           /* set 'list state' bits in NODE */
           if( fast )    ( SetNodeOnFastList(np,TRUE) ; )
           else          ( SetNodeOnSlowList(np,TRUE) ; )

SetNodeMaintProtocol( np, protocol ) ;
           SetNodeNextToMaintain_M( np, NULLNP ) ;

/* free the Maint List for others */
           release_maint_list_ownership( NodeNet(np) ) ;

if( Gabby() == GABBY_MAINT) printf( "AddMaint: *start_ptr:%p current:%p, np:%p\n",
*start_ptr, current, np ) ;
}

/* end of linked list code */

/* start of 'netman' maintenance code */

/*     Export a L2_LINK_INFO struct     */

UTEXT    *ExportL2LinkInfo( UTEXT buf[], L2_LINK_INFO *link_info )
{
    FAST UCOUNT   i ;

buf   = ExportMtime(buf,(&(link_info->time))) ;
    buf   = ExportMtimeError(buf,(&(link_info->time_error))) ;

buf   = ExportMulong(buf,link_info->age) ;
    buf   = ExportMushort(buf,link_info->status) ;
    buf   = ExportMushort(buf,link_info->seq_num) ;

buf   = ExportDevAddr(buf,(&(link_info->dev_addr))) ;
``` l2maint.c - Metricom Proprietary - 891212 - page:10

```
    buf = ExportMushort(buf,link_info->wan_links) ;
    buf = ExportMushort(buf,link_info->lan_links) ;

for(i = 0; i != OCTANT_COUNT; i++)
    {
        *buf++ = link_info->octant[i] ;
    } return(buf) ;
}

/*   Import a L2_LINK_INFO struct   */

UTEXT   *ImportL2LinkInfo( L2_LINK_INFO *link_info, UTEXT buf[] )
{
    FAST UCOUNT   i ;

buf = ImportMtime(&(link_info->time),buf) ;
    buf = ImportMtimeError(&(link_info->time_error),buf) ;

buf = ImportMulong((&(link_info->age)),buf) ;
    buf = ImportMushort((&(link_info->status)),buf) ;
    buf = ImportMushort((&(link_info->seq_num)),buf) ;

buf = ImportDevAddr(&(link_info->dev_addr),buf) ;

buf = ImportMushort((&(link_info->wan_links)),buf) ;
    buf = ImportMushort((&(link_info->lan_links)),buf) ;

for(i = 0; i != OCTANT_COUNT; i++)
    {
        link_info->octant[i] = *buf++ ;
    } return(buf) ;
}
```

```
/*      Manifest constants
*/ undef      VOLATILE_AGE    /* define to treat age as a volatile field */ ifdef      VOLATILE_AGE
define     VOLATILE_AGE_SLOP   (16)
#endif

/*
    Make and send a maintenance frame.
*/ ifdef  PROTOTYPE
BOOLEAN     SendMaint(
NODE        *np,
LINK_ADDR   *link_src_ptr,
L2_PROTOCOL protocol,
L2_FTYPE    ftype)
#else
BOOLEAN     SendMaint( np, link_src_ptr, protocol, ftype )
NODE        *np ;
LINK_ADDR   *link_src_ptr ;
L2_PROTOCOL protocol ;
L2_FTYPE    ftype ;
#endif
{
    FAST    PLATFORM    *pp ;
    FAST    UTEXT       *bp ;

union
    {
        L2_SYNC         sync ;
        L2_TIMESTAMP    timestamp ;
        L2_LINK_INFO    link_info ;
``` l2maint.c - Metricom Proprietary - 891212 - page:12

```c
            ) frame ;
    UCOUNT           frame_len ;
    ARG              j ;
    LAN_ADDR  lan ;
    WAN_ADDR  wan ;

if(Gabby() == GABBY_MAINT)
    printf( "SendMaint( %p, %p %u %u ) entry\n",
            np, link_src_ptr, protocol, ftype ) ;

/* if no platform to put frame into, don't go any further */
if( FreePlatform_Q->audit < (sys_task_id() + MINIMUM_PLATFORMS)
    || ((pp = (PLATFORM *)sys_get_queue(FreePlatform_Q)) == NULLPP) )
    {
        return FALSE ;
    }

/* send the remembered protocol */
protocol = NodeMaintProtocol(np) ;

/* ... else, can we not send LINK_INFO's to this node? */
if(NodeMaintStatus(np) == NODE_MAINT_STATUS_TIMESTAMP)
    {
    if(protocol == L2_PROTOCOL_LINK_INFO_INQUIRY)
        {
        protocol = L2_PROTOCOL_TIMESTAMP_INQUIRY ;
        }
    else if(protocol == L2_PROTOCOL_LINK_INFO)
        {
        protocol = L2_PROTOCOL_TIMESTAMP ;
        }
    }

/* do we not send TIMESTAMP_INQUIRY's to this node? --
    because it is an incompatible Meter.... */
if( (protocol == L2_PROTOCOL_TIMESTAMP_INQUIRY)
    && (!RamAcceptLANTime_M || !RamTruthfulLANTime_M) )
    {
```

```c
        protocol = L2_PROTOCOL_TIMESTAMP ;
    }

/* fill appropriate frame structure */
    switch(protocol)
    { case(L2_PROTOCOL_NULL):

/* NULL frame has no data */
        frame_len = 0 ;
        break ;

case(L2_PROTOCOL_TEST):

/* we pad TEST frame to full length */
        frame_len = (MAX_PACKET_LEN - L1_HEADER_LEN - L2_HEADER_LEN) ;
        break ;

case(L2_PROTOCOL_SYNC):

GetMclockTimer(&frame.sync.age) ;
        frame_len = LengthL2Sync(&frame.sync,NodeNet(np)) ;
        break ;

case(L2_PROTOCOL_TIMESTAMP):
    case(L2_PROTOCOL_TIMESTAMP_INQUIRY):

/* get our current clock */
        GetMclockWithError(
            &frame.timestamp.time,
            &frame.timestamp.time_error ) ;

/* fixup LAN time iff required */
        if( (NodeNet(np) == MSUBNET_LAN) && !RamTruthfulLANTime_M )
        {
            CopyMtimeError( &frame.timestamp.time_error, ZeroMtimeError() ) ;
        }

/*
```

```
printf( "sendMaint:net:%u truth:%u time:%lu error:%lu\n",
        (UCOUNT)NodeNet(np), (UCOUNT)RamTruthfulIANTime M,
        frame.timestamp.time,
        frame.timestamp.time_error ) ;
break ;
*/ frame_len = LengthL2Timestamp(&frame.timestamp,NodeNet(np)) ;
        break ;

case(L2_PROTOCOL_LINK_INFO):
    case(L2_PROTOCOL_LINK_INFO_INQUIRY):

/* get our current clock */
        GetMclockWithError(
                &frame.link_info.time,
                &frame.link_info.time_error ) ;

/* get current timer (to compute age) */
        GetMclockTimer(&frame.link_info.age) ;

/* assign Status for Interseted Nodes */
        frame.link_info.status = RamBatteryBacked_M ?
L2_LINK_INFO_STATUS_PERSISTENT : L2_LINK_INFO_STATUS_NULL ;
        frame.link_info.status |= RamUseForRouting_M ? L2_LINK_INFO_STATUS_ROUTABLE
: L2_LINK_INFO_STATUS_NULL ;

/* what is the sequence number of this link? */
        j = SequenceNumber(np) ;

/* assign the other node a sequence number */
        if( NodeSeqNum_M(np) == 0 )
        {
            SetNodeSeqNum_M(np, SequenceNumber(np) ) ;
        }
        else
        {
            SetNodeSeqNum_M( np, MIN( NodeSeqNum_M(np), j ) ) ;
        }
``` l2maint.c - Metricom Proprietary - 891212 - page:15

```
        frame.link_info.seq_num = NodeSeqNum_M(np) ;

/* infer our device address */
        if( NodeNet(np) == MSUBNET_LAN )
        {
            LinkToLan( &lan, link_src_ptr ) ;
            BuildDevAddr( &frame.link_info.dev_addr, &OurGlobalWanAddr, &lan) ;
        }
        else
        {
            CopyDevAddr( &frame.link_info.dev_addr, RamDevSrcPtr_M ) ;
        } frame.link_info.wan_links = LinksPerSubnet( MSUBNET_WAN ) ;
        frame.link_info.lan_links = LinksPerSubnet( MSUBNET_LAN ) ;

/* get the WAN connectivity */
        AddAlloctantInfo( frame.link_info.octant ) ;

/* we pad LINK_INFO frame to full length */
        frame_len = (MAX_PACKET_LEN - L1_HEADER_LEN - L2_HEADER_LEN) ;

break.;

default:
    FreePlatform(pp) ;
    return FALSE ;
}

/* At this point the Frame is full and the length is Known */

/* make frame header */
bp = MkL2Pkt( pp,
              frame_len,
              protocol,
              ftype,
              GetNewFid(np),
              NodeLinkAddressPtr(np),
```

```
        link_src_ptr,
        NodeNet(np) ) ;

/* error making frame header? */
if(bp == NULLUCHAR) ( FreePlatform( pp ) ;    return FALSE ; )

/* Export theFrame structure into the data field */
switch(protocol)
( case(L2_PROTOCOL_NULL):

/* no data in a NULL frame */
        break ;

case(L2_PROTOCOL_TEST):

/* we pad a TEST frame to full length */
        MemSet( bp, 0x55, (MAX_PACKET_LEN - L1_HEADER_LEN - L2_HEADER_LEN ) ) ;
        break ;

case(L2_PROTOCOL_SYNC):

/* fill data field with SYNC */
        (VOID) ExportL2Sync( bp, &frame.sync, NodeNet(np) ) ;
        break ;

case(L2_PROTOCOL_TIMESTAMP):
case(L2_PROTOCOL_TIMESTAMP_INQUIRY):

/* fill data field with TIMESTAMP */
        (VOID) ExportL2Timestamp( bp, &frame.timestamp, NodeNet(np) ) ;

break ;

case(L2_PROTOCOL_LINK_INFO):
case(L2_PROTOCOL_LINK_INFO_INQUIRY):

#if (MAX_PACKET_LEN - L1_HEADER_LEN - L2_HEADER_LEN) < L2_LINK_INFO_LEN
``` l2maint.c - Metricom Proprietary - 891212 - page:17

```
#error      /* sorry, but link_info won't fit */
#endif
            /* stuff the LINK_INFO into the PLATFORM */
            frame_len = (ExportL2LinkInfo(bp,&frame.link_info) - bp ) ;

/* pad rest of LINK_INFO with 0x55 */
            MemSet( ( bp + frame_len ), 0x55,
                 (MAX_PACKET_LEN - L1_HEADER_LEN - L2_HEADER_LEN -
                  frame_len) ) ;

break ;

/* the packet is ready to go */
        if( NodeNet(np) == MSUBNET_LAN )
        (
            SetOutputNode(pp,np) ;
            AddToTxQueue(pp) ;
        )
        else
        (
            L2_PROTOCOL   protocol ;

/* save the protocol...
                a Failed WANLinkMaint packet deletes the platform */
            protocol = L2Protocol(pp) ;

/* if the WANLinkMaint didn't work, re-queue */
        if( WANLinkMaintenanceSend( np, pp ) != TRUE )
            (
                /* add to SLOW maint list if the Node is failing... */
                AddMaint( np, FALSE, protocol ) ;
            )
        )

/* perform final accounting */
        switch(protocol)
        (
``` l2maint.c - Metricom Proprietary - 891212 - page:18

```
case(L2_PROTOCOL_LINK_INFO_INQUIRY):

/* if LAN, should we move from INIT status? */
    if( (NodeNet(np) == MSUBNET_LAN)
        && (NodeMaintStatus(np) == NODE_MAINT_STATUS_INIT) )
    {
        /* move to TIMESTAMP maintenance status */
        SetNodeMaintStatus( np, NODE_MAINT_STATUS_TIMESTAMP) ;
    }

/*FALLTHROUGH*/ case(L2_PROTOCOL_LINK_INFO):
case(L2_PROTOCOL_TIMESTAMP_INQUIRY):
case(L2_PROTOCOL_TIMESTAMP):

/* advance the maintenance timer */
    GetSynchExpiredMclockTimer(
        NodeMaintAlarmPtr(np),
        ((NodeNet(np) == MSUBNET_LAN) ? RamLANMaintInterval_M :
RamWANMaintInterval_M)
        + MaintPeriodFuzz(NodeNet(np)) ) ;

break ;
}

/* maintenance frame successfully scheduled */
return TRUE ;
}

/*
    Updates the volatiles fields in a maintenance packet
*/
ifdef   PROTOTYPE
VOID     UpdateMaint(
PLATFORM *pp)
```

```
#else
VOID        UpdateMaint( pp )
PLATFORM    *pp ;
#endif
{
    MTIME           clock ;
    MTIME_ERROR     clock_error ;
    MCLOCK_TIMER    timer ;

switch( L2Protocol(pp) )
    { case(L2_PROTOCOL_SYNC):

GetMclockTimer(&timer) ;

/* Radio ALWAYS diddles... make sure that AGE is current */
        DiddleExportedL2SyncAge( L2DataPtr(pp), timer ) ;

break ;

case(L2_PROTOCOL_TIMESTAMP):
    case(L2_PROTOCOL_TIMESTAMP_INQUIRY):

/* get current clock and clock error */
        GetMclockWithError(&clock,&clock_error) ;

/* fixup WAN error time iff required */
        if( (Subnet(pp) == MSUBNET_WAN) || RamTruthfullANTime_M )
        {
            /* and add a gratuitous 1 second of error on top of that */
            AddOffsetMtimeError(&clock_error,&clock_error,CLOCK_GRANULARITY) ;
        }
        else
        {
            CopyMtimeError( &clock_error, ZeroMtimeError() ) ;
        }
```

```
                    /* update the time and time error */
                    DiddleExportedL2TimestampTime( L2DataPtr(pp),
                        &clock, &clock_error) ;

break ;

case(L2_PROTOCOL_LINK_INFO):
            case(L2_PROTOCOL_LINK_INFO_INQUIRY):

/* get current clock and clock error */
                    GetMclockWithError(&clock,&clock_error) ;

/* and add a gratuitous 1 second of error on top of that */
                    AddOffsetMtimeError(&clock_error,&clock_error,CLOCK_GRANULARITY) ;

#ifdef   VOLATILE_AGE
                    /* get timer to compute current age */
                    GetMclockTimer(&timer) ;

/* update the time, time error, and age */
                    DiddleExportedL2LinkInfoTimeAge( L2DataPtr(pp),
                        &clock, &clock_error,timer ) ;
#else
                    /* update the time and time error */
                    DiddleExportedL2LinkInfoTime( L2DataPtr(pp),
                        &clock, &clock_error ) ;
endif break ;

}

/*      Local function to process received age.  This returns TRUE iff
        the caller might want to schedule a new link maintenance frame back
        to him.
```

```
*/
#ifdef      PROTOTYPE
LOCAL       BOOLEAN     ProcessRecvAge(
PLATFORM    *pp,
MULONG      age)
#else
LOCAL       BOOLEAN     ProcessRecvAge(pp,age)
PLATFORM    *pp ;
MULONG      age ;
#endif
{
    MCLOCK_TIMER    now, new_delta ;
    NODE            *np ;
    BOOLEAN         reborn ;

/* get current timer */
    GetMclockTimer(&now) ;

/* use platform arrival timer delta to correct age */
    age += DeltaMclockTimer( &now, PPTimerPtr(pp) ) ;

np = InputNode(pp) ;

/* if the node says it has recently re-booted... */
    new_delta = now - age ;                      /* determine the delta */ reborn = (labs(new_delta - NodeDeltaAge(np))) >= SECONDS_REQUIRED_TO_REBOOT ;
    if( reborn && !WaitingForAck(np) )
    {
        /* discovery of a new reborn NODE */
        ClearNodeToTries(np) ;
        ClearNodeAckTries(np) ;
        SetNodeMaintStatus(np,NODE_MAINT_STATUS_INIT) ;
    }

/* in any case, start again with this guy */
    SetNodeDeltaAge(np,new_delta) ;
```

```
            np->info.age = age ;

/* trace new info? */
            if(Gabby() == GABBY_MAINT)
            {
                UTEXT      buf[DEV_STR_LEN] ;

printf("%s received from ",
                    protype_str( buf, L2Protocol(pp), L2FType(pp)) ) ;

printf("%s %s--",
                    link_str(buf, LinkSrcPtr(pp), Subnet(pp)),
                    (ISTRUE(reborn) ? "(node reset)" : "")) ;
            } return reborn ;
        }

/*
            Local function to process received time.  This returns TRUE iff
            we might want to consider responding with time of our own

*/ ifdef   PROTOTYPE
        LOCAL    BOOLEAN    ProcessRecvTime(
        PLATFORM *pp,
        MTIME    *time,
        MTIME    *time_error)
        #else
        LOCAL    BOOLEAN    ProcessRecvTime(pp,time,time_error)
        PLATFORM *pp ;
        MTIME    *time ;
        MTIME    *time_error ;
        #endif
        {
            /* correct received time? */
            if(ISFALSE(IsSpecialMtime(time)))
            {
```

```c
    MCLOCK_TIMER    us ;

/* get current timer */
    GetMclockTimer(&us) ;

/* use platform arrival timer delta to correct time */
    AddOffsetMtime( time, time,
                DeltaMclockTimer(&us, PPTimerPtr(pp)) ) ;
    }

/* can we receive timestamps? */
if( (RamAcceptLANTime_M) || (Subnet(pp) == MSUBNET_WAN) )
{
    if( Gabby() == GABBY_MAINT )
    {
        UTEXT   buf[DEV_STR_LEN] ;

printf( "%s received from ",
                protype_str(buf,L2Protocol(pp),L2FType(pp)) ) ;
        printf( "%s -- ", link_str(buf, LinkSrcPtr(pp), Subnet(pp)) ) ;
    }

/* try to set clock -- is their time not good? */
    if(ISFALSE(SetMclockWithError(time,time_error)))
    {
        if( Gabby() == GABBY_MAINT )
        {
            printf("clock not set\n") ;
        }
        return TRUE ;
    }

/* our clock was set! */
    else
    {
        if( Gabby() == GABBY_MAINT )
        {
```

```c
            printf("%s %s\n",
                PrintMtime(time), PrintMtimeError(time_error)
                ) ;

return FALSE ;
        }
    }

/* can we not receive timestamps but should still respond? */
    else
    {
        MTIME       clock ;
        MTIME_ERROR clock_error ;

/* get the local time */
        GetMclockWithError( &clock, &clock_error ) ;

/* is our time better? */
        if(ISFALSE(IsSpecialMtime(&clock)) &&
           ISTRUE(IsWorseMtimeError(time_error,&clock_error)))
        {
            return TRUE ;
        }
        else
        {
            return FALSE ;
        }
    }
}

/*
    Process a received maintenance frame.
*/
ifdef   PROTOTYPE
VOID     RecvMaint(
PLATFORM *pp)
```

```
#else
VOID    RecvMaint( pp )
PLATFORM *pp ;
#endif
{
    NODE *np ;

union
    {
        L2_SYNC         sync ;
        L2_TIMESTAMP    timestamp ;
        L2_LINK_INFO    link_info ;

} frame ;

if( (np = InputNode(pp)) == NULLNP )
    {
        sys_puts( "Received Maint from NULLNP!\n" ) ;
        return ;
    } if(Gabby() == GABBY_MAINT)
        printf( "RecvMaint protocol:%u\n", L2Protocol(pp) ) ;

switch(L2Protocol(pp))
    {
        /* NULL frames convey no information */
        case(L2_PROTOCOL_NULL):
            break ;

/* just count the TEST packets */
        case(L2_PROTOCOL_TEST):
            IncrementRxTestPackets_M() ;
            IncrementNodeTestPackets_M(np) ;
            break ;

case(L2_PROTOCOL_SYNC):
```

```c
#if !CONSTLengthL2Sync()
#error
#endif
        /* SYNC all here? */
        if(L2DataLen(pp) >= L2_SYNC_LEN)
        {
            /* import SYNC */
            (VOID) ImportL2Sync( &frame.sync, L2DataPtr(pp), NodeNet(np) ) ;

/* process SYNC */
            if( ProcessRecvAge(pp, frame.sync.age) == TRUE )
            {
                /* if node is reborn, maintain him as fast as possible... */
                AddMaint( np, TRUE, L2_PROTOCOL_LINK_INFO_INQUIRY ) ;

GetSynchExpiredMclockTimer(
                    NodeMaintAlarmPtr(np),
                    MaintPeriodFuzz(NodeNet(np))
                    ) ;
            }
        }
        break ;

case(L2_PROTOCOL_TIMESTAMP) :
    case(L2_PROTOCOL_TIMESTAMP_INQUIRY):

#if !CONSTLengthL2Timestamp()
#error       /* sorry, but we can't do this otherwise */
#endif
        /* TIMESTAMP all here? */
        if( L2DataLen(pp) >= L2_TIMESTAMP_LEN)
        {
            /* import timestamp */
            (VOID) ImportL2Timestamp(
                &frame.timestamp,
                L2DataPtr(pp),
```

```
                NodeNet(np) ) ;

/* process received time -- should we send time back? */
            if(ISTRUE(ProcessRecvTime(
                pp,
                &frame.timestamp.time,
                &frame.timestamp.time_error)) &&
                (L2Protocol(pp) ==
                    L2_PROTOCOL_TIMESTAMP_INQUIRY))
            (
                /* try to send time back */
                AddMaint( np, TRUE, L2_PROTOCOL_TIMESTAMP ) ;
            )
            break ;

case(L2_PROTOCOL_LINK_INFO):
        case(L2_PROTOCOL_LINK_INFO_INQUIRY):
#if !CONSTLengthL2LinkInfo()
#error           /* sorry, but we can't do this otherwise */
endif /* LINK_INFO all here? */
            if( L2DataLen(pp) >= L2_LINK_INFO_LEN)
            {
                /* import LINK_INFO */
                (VOID) ImportL2LinkInfo( &frame.link_info, L2DataPtr(pp) ) ;

/* remember that node can handle LINK_INFO's */
                SetNodeMaintStatus( np, NODE_MAINT_STATUS_LINK_INFO ) ;

/* remember select LINK_INFO fields */
                np->info.status = frame.link_info.status ;
                CopyDevAddr(
                    &(np->info.dev_addr),
                    &frame.link_info.dev_addr) ;
```

```
            /* process received age */
            (VOID) ProcessRecvAge( pp, frame.link_info.age ) ;

/* process received time */
            (VOID) ProcessRecvTime(
                        pp,
                        &frame.link_info.time,
                        &frame.link_info.time_error) ;

/* schedule a LINK INFO response? */
            if(L2Protocol(pp) == L2_PROTOCOL_LINK_INFO_INQUIRY)
            {
                    /* try to send LINK INFO back */
                    AddMaint(np,TRUE, L2_PROTOCOL_LINK_INFO ) ;
            }
            break ;
        }

/* and free the platform */
        FreePlatform(pp) ;
}

/* end of 'netman' maintenance code */ define      MAX_LOOP_TIME        (15)          /* Guessed time of max latency */

LOCAL VOID   fill_maint_list( MSUBNET net )
{
    NODE         *np ;
    QUE          *head ;
    MCLOCK_TIMER now ;

if( net == MSUBNET_LAN )
    {
        head = LAN_ActiveNodes_Q ;
``` l2maint.c - Metricom Proprietary - 891212 - page:29

```
        lockLAN() ;
   }
   else
   {
        head = WAN_ActiveNodes_Q ;
        LockWAN() ;
   }

/* initialize 'np' for the search */
   np = (NODE *)head ;
   while( (np = (NODE *)sys_next_queue((QUE *)np, head)) != NULLNP )
   {
        /* what timer is it now */
        GetMclockTimer(&now) ;

/* if we have not heard from the Node for a Great While */
        if( (NodeNet(np) == MSUBNET_WAN)
            && ((now + MAX_LOOP_TIME) - NodeLastHeardTimer_M(np)) >
RamWANFailoutInterval_M )
        {
            FailNode(np) ;
            continue ;
        } else if( NodeDoomed(np) ) { continue ; }

/* Service the scanner alarm. */
        if( IsExpiredMclockTimer(&now, NodeScannerAlarmPtr_M(np)) )
        {
            SetNodeLastDataSent_M(np, NodeCurrentDataSent_M(np)) ;
            ResetNodeCurrentDataSent_M(np) ;

SetNodeLastDataRetries_M(np, NodeCurrentDataRetries_M(np)) ;
            ResetNodeCurrentDataRetries_M(np) ;

GetExpiredMclockTimer( NodeScannerAlarmPtr_M(np),
RamWANScannerInterval_M ) ;
        }
```

```c
        /* if we are Maintaining OR Maintaining this Node
           AND if node is not napping */
        if( (RamMaintainLANLinks_M || NodeMaintain_M(np))
            && IsExpiredMclockTimer( &now, NodeDataRetryTimerPtr(np)) )
        {
            /* if Not waiting for ACK and one of the Timers has Expired... */
            if( !WaitingForAck(np)
                && (IsExpiredMclockTimer(&now, NodeMaintAlarmPtr(np))
                    || IsExpiredMclockTimer(&now, NodeContactAlarmPtr(np))))
            {
                AddMaint( np, FALSE, L2_PROTOCOL_LINK_INFO_INQUIRY ) ;
            }
        }
    )
    /* pause for Watchdog */
    sys_pend(0,MINIMUM_PEND_TIME) ;

if( net == MSUBNET_LAN )    ( UnlockLAN() ; )
    else                        ( UnlockWAN() ; )
}

/* returns BOOL TRUE/FALSE if the MSUBNETs maintenance timer has expired */
BOOL TimeToMaintain( MSUBNET net )
{
    MCLOCK_TIMER    now ;

GetMclockTimer( &now ) ;
    if( net == MSUBNET_LAN )
    {
        return( IsExpiredMclockTimer(&now, &LAN_maintenance_timer) ) ;
    }
    else
    {
        return( IsExpiredMclockTimer(&now, &WAN_maintenance_timer) ) ;
    }
}
```

```
UCOUNT  TicksTillNextMaintenance( MSUBNET net )
{
    MCLOCK_TIMER   now ;

GetMclockTimer(&now) ;
    if( net == MSUBNET_LAN )
    {
        return( TicksToAlarm(&now, &LAN_maintenance_timer) ) ;
    }
    else
    {
        return( TicksToAlarm(&now, &WAN_maintenance_timer) ) ;
    }
}

UCOUNT  PerformMaintenance( MSUBNET net )
{
    NODE           *np ;
    MCLOCK_TIMER   now ;
    BOOL           sent_something ;

GetMclockTimer( &now ) ;

if( net == MSUBNET_LAN )
    {
        /* reset the LAN MaintAlarm */
        GetExpiredMclockTimer(&LAN_maintenance_timer,
            RamLANMaintGateInterval_M + MaintPeriodFuzz(net) ) ;

/* fill the maint list */
        fill_maint_list(MSUBNET_LAN) ;

/* if we have found one... send the Maint Packet */
        if( (np = GetMaint(MSUBNET_LAN)) != NULLNP )
        {
            SendMaint( np, GetPrimeSourceLinkAddr(MSUBNET_LAN),
```

```
            SendMaint( np, GetPrimeSourceLinkAddr(MSUBNET_WAN),
                L2_PROTOCOL_LINK_INFO_INQUIRY, L2_FTYPE_DATA_ACK ) ;

sent_something = TRUE ;
        }
        else
        {
            sent_something = FALSE ;
        }
    } return sent_something ;
}

LOCAL PLATFORM *make_sync( MSUBNET net, LINK_ADDR *link_dest, BOOL ack_noack )
{
    PLATFORM *pp ;

if( (pp = (PLATFORM *)sys_get_queue(FreePlatform_Q)) != NULLPP )
    {
        if( MkL2Pkt( pp, sizeof(L2_SYNC), L2_PROTOCOL_SYNC,
            ack_noack ? L2_FTYPE_DATA_ACK : L2_FTYPE_DATA_NOACK,
            (L2_FID)0, link_dest, GetPrimeSourceLinkAddr(net), net)
            == NULLUCHAR )
        {
            FreePlatform(pp);
            pp = NULLPP ;
        }
        else
        {
            SetOutputNode(pp,NULLNP);
        }
    }
``` l2maint.c - Metricom Proprietary - 891212 - page:34

```
                  L2_PROTOCOL_LINK_INFO_INQUIRY, L2_TYPE_DATA_ACK ) ;
        }
        else
        {
                if( RamSolicitLANlinks_M )      ( SendLANBroadcastSync() ;   )
        }

/* always return TRUE iff LAN... */
        sent_something = TRUE ;
}
else
{
        /* if the WAN Maint Timer has expired */
        if( IsExpiredMclockTimer(&now, &WAN_maintenance_timer) )
        {
                /* reset the WAN MaintAlarm... accelerate Acquisition Phase */
                if( now <= (NUM_SLOTS * ACQUISITION_ACCELERATION) )
                {
                        GetExpiredMclockTimer( &WAN_maintenance_timer,
                                (ACQUISITION_MAINT_GATE + MaintPeriodFuzz(net)) ) ;
                }
                else
                {
                        GetExpiredMclockTimer(&WAN_maintenance_timer,
                                RamWANMaintGateInterval_M + MaintPeriodFuzz(net)) ;
                }

/* update the IdlePeriod machinery */
                UpdateIdle(0,0) ;

/* perform our Synch Packet sending */
                MaybeSendSync(now) ;

/* fill the maint list */
                fill_maint_list(MSUBNET_WAN) ;

/* if we have found one... send the Maint Packet */
                if( (np = GetMaint(MSUBNET_WAN)) != NULLNP )
                {
``` l2maint.c - Metricom Proprietary - 891212 - page:33

```
        return pp ;
}

PLATFORM *MakeAcquisitionSync( MSUBNET net )
{
        BOOL        ack_noack ;
        LINK_ADDR   link_dest ;
        PLATFORM    *pp ;
        L2_SYNC     syncinfo ;

/* build the link destination field for the SYNC */
        if( net == MSUBNET_WAN )
        {
                DISTANCE      dist = DISTANCE_INFINITY ;
                OCTANT_MASK   om   = OCTANT_MASK_ALL ;
                WAN_ADDR      wan ;

BuildBroadcastWanAddr( &wan, dist, om, WAN_ADDR_COLOR_MIN, DEFAULT_WANNET )

WanToLink( &link_dest, &wan ) ;
                ack_noack = FALSE ;
        }
        else
        {
                LAN_ADDR   lan ;

CopyLanAddr( &lan, BroadcastLanAddr() ) ;
                LanToLink( &link_dest, &lan ) ;
                ack_noack = TRUE ;
        }

GetMclockTimer( &syncinfo.age ) ;

if( (pp = make_sync( net, &link_dest, ack_noack )) != NULLPP )
        {
                ExportMulong( L2DataPtr(pp), syncinfo.age ) ;
        }
```

```c
    return pp ;
} define SLOT_TICK_INCREMENT (TICKS_PER_SLOT / 2)
LOCAL UCOUNT SyncTick(VOID)
{
    LOCAL    UCOUNT    last_tick = 0 ;

if( (last_tick += SLOT_TICK_INCREMENT) >= (NUM_SLOTS * TICKS_PER_SLOT) )
    {
        last_tick = 0 ;
    }
    return last_tick ;
}

LOCAL VOID    SendAcquisitionSyncs( UCOUNT num_syncs, UTINY power_level, PLATFORM
*pp )
{
    sys_suspend( WAN_RX_TASK ) ;
    sys_wan_gain( power_level, power_level ) ;    /* adjust power for these syncs */
    while( num_syncs-- )
    {
        SetTraveling( SyncTick() ) ;
        UpdateMaint(pp) ;
        if(Gabby() == GABBY_WAN) sys_puts("S") ;

/* don't get our Transmit aborted by the Ticker */
        while( (TICKS_PER_SLOT - Current.tick) < (SYNC_DURATION +
REFRACTORY_PERIOD) ) ;
        WAN_Output(pp,0) ;
    }
    SetTraveling(0) ;
    sys_wan_gain( PowerLevel, PowerLevel ) ;        /* return to previous power */
    sys_resume(WAN_RX_TASK ) ;
}
```

```c
LOCAL UCOUNT    next_syncs = 0 ;
VOID SetNextSyncs( UCOUNT num )         ( next_syncs = num ; )

VOID MaybeSendSync( MCLOCK_TIMER now )
{
    UCOUNT      num_syncs ;
    PLATFORM    *pp ;
    UTINY       power_level = 0xff ;

if( now == 0 ) /* first time */
    {
        num_syncs = (NUM_CHANNELS * 2) ;      /* cover every slot */
        power_level = 0 ;
    }
    else if( now < (NUM_CHANNELS * ACQUISITION_ACCELERATION) )
    {
        num_syncs   = 20 ;
        power_level = 0x15 ;                  /* -10 dB according to Mike W. */
    }
    else
    {
        /* scale along with the number of neighbors extant */
        if( (next_syncs == 0) && (rand() % WAN_ActiveNodes_Q->audit) != 0 ) {
            return ; }

/* else, get the number of syncs we are syupposed to send
           and the power level that we are supposed to send it out at */
        num_syncs = next_syncs + 1 ;
        next_syncs = 0 ;
        power_level = PowerLevel ;
    }

/* this is a SYNC packet */
    if( (pp = MakeAcquisitionSync( MSUBNET_WAN )) != NULLPP )
    {
        SendAcquisitionSyncs( num_syncs, power_level, pp ) ;
        FreePlatform(pp) ;
    }
}
```

```
VOID SendLANBroadcastTimestamp(VOID)
{
    MTIME          now ;
    MTIME_ERROR    err ;

GetMclockWithError( &now, &err ) ;
    if( !IsSpecialMtime(&now) )
    {
        PLATFORM  *pp ;

if( (pp = (PLATFORM *)sys_get_queue(FreePlatform_Q)) != NULLPP )
        {
            LINK_ADDR link ;

LanToLink( &link, BroadcastLanAddr() ) ;

MkL2Pkt(pp, LengthMtime(&now) + LengthMtimeError(&our_err),
                    L2_PROTOCOL_TIMESTAMP, L2_FTYPE_DATA_ACK, 1 /* FID */,
                    &link, GetPrimeSourceLinkAddr(MSUBNET_LAN),
                    MSUBNET_LAN ) ;

/* send this packet on its way */
            SetOutputNode(pp,NULLNP) ;
            LAN_Output(pp) ;
        }
    }
}

/* used for 'probing' the LAN for any devices */
VOID SendLANBroadcastSync(VOID)
{
    PLATFORM  *pp ;

if( (pp = MakeAcquisitionSync( MSUBNET_LAN )) != NULLPP )
    {
        SetOutputNode(pp,NULLNP) ;
```

```
        LAN_Output(pp) ;
/* if(Gabby() == GABBY_LAN) sys_puts("Sending LANBroadcastSync\n") ; */
        }
    }
/* end of file */
```

Appendix D

Listing L2NODE C

©Copyright (unpublished work) Metricom, Inc.

All rights reserved.

```c
include <stdarg.h> include "std.h"
include "kernel.h"
#include "net.h"

#include "mtime.h"
#include "mclock.h"
#include "addr.h"
#include "angle.h"

#include "l0.h"
#include "l1.h"
#include "l2.h"
#include "l2lanwan.h"
#include "node.h"
#include "l3.h"
#include "l3lanwan.h"
#include "platform.h"
#include "config.h"
#include "rad_data.h"

#include "scan.h"

#include <stdio.h>
/*
#define DEBUG_SCANNER
*/

/#l2scan.c***********************************************************
*
*
****************************************************************l2scan.c*/

LOCAL BOOL  poll_list_insert(
            POLL_LIST       table[],
            NODE            *np,
            ULONG           progress,
            ARG             index,
            ARG             length_of_table,
``` l2NODE.C - Metricom Proprietary - 891212 - page: 1

```c
            ARG                 * num_entries)
            ARG            i;
{
            /*zero referenced; don't write beyond table */
            if( (index >= length_of_table) || (num_entries > length_of_table))
#ifdef DEBUG_SCANNER
    printf( "poll_list_insert ERROR:   index:%d length:%d num_entries:%d\n",
            index, length_of_table, num_entries);
#endif
                return FALSE;

/* when we're full, spill the 'last' entry */
            if( num_entries == length_of_table)   (num_entries--;)

/* move everyone 'down' one index */
            for( i = num_entries; i> index; i--)
            {
                table[i].np          = table[i-1].np;
                table[i].progress    =table[i-1].progress
            }
            table[index].np        =np;
            table[index].progress  =progress;

#ifdef DEBUG_SCANNER
    if(Gabby() == GABBY_SCANNER)
    {
ARGj;
    printf("poll_list_insert entries:%d index:%d np:%p progress:%lu\n",
            num_entries, index, np, progress);
    for(j = 0; j < num_entries + 1; j++)
    {
            printf("table(%d).np = %p progress:%lu\n",
                    j,table[j].np,table[j].progress);
    }
    }
#endif
```

```
        return TRUE;
}

ULONG ProbableProgress(ULONG tries, ULONG retries, ULONG parameter)
{
        ULONG progress;

#ifdef DEBUG_SCANNER
if(Gabby()==GABBY_SCANNER) printf("Probable Progress(%lu%lu%lu) returning:",
        tries,retries,aprameter);
#endif/*DEBUG_SCANNER*/

/* scale 'tries' and 'retries' if needed */
        if(tries. (ULONG_MAX >>4)) || (retries > (ULONG_MAX >>4)) )
        {
                tries     >>=4;
                retries   >>=4;
        }

/* scale 'parameter' if needed; protect division */
        if( parameter > (ULONG_MAX>>8) )            {paramter >>=8;}
        else if(paramter ==0)                       {paramter++;} if( (tries+retries) > 0)
        {
                progress = ((tries<<4)/(tries+retries)) *paramter;
        }
        else
        {
                progress = 1;
        } ifdef DEBUG_SCANNER
if( Gabby() == GABBY_SCANNER) printf("%\n",progress);
endif return progress;
}

LOCAL BOOL       insert_in_poll_list(
        POLL_LIST       table[],
```

12NODE.C - Metricom Proprietary - 891212 - page: 3

```
          NODE      *np,
          ULONG     qualification,
          ARG       length_of_table,
          ARG       num_entries)
  {
          ARG  i;
          ULONG  progress;

progress = ProbableProgress(
                                      NodeTotalDataSent(np),
                                      NodeTotalRetries(np),
                                      qualification);

for( i = 0; i < length_of_table &&i <=num_entries;i++)
          {
                  if( progress >table[i].progress)
                  (
#ifdef DEBUG_SCANNER
if(Gabby()==GABBY_SCANNER) printf( "Inserting %p.%lu from [%lu] into poll_table at %u\n",
                        np,progress,qualification,i);
#endif
                          return( poll_list_insert( table,np,progress,i, length_of_table,num_entries)
);
                  }
          }
          return FALSE;
  }

LOCAL BOOL   carrier_detect( VOID)
  (
          ARG       i=4;

while(i--)if(sys_read_dac(DAC_RF_RSSI)<=RamDSquelch_M) (return FALSE;)
          return TRUE;
  }
  /*
          returns  NOTOK    if the node doesn't respond
          returns  OK       if the Node "NACKs" us
          returns  <val>    if the node responds with a positive 'num_platforms'
  */
  ARG              Ticket(NODE *np,L3_PRIORITY priority)
  (
```

12NODE.C - Metricom Proprietary - 891212 - page: 4

```c
PLATFORM     #DATA;
ARG                          return_code=NOTOK;

/*First test the freq for possible loud signal
    (which would prevent reception of possible resopnses)*/
SetTraveling( NodeDeltaTick_M(np));
if( priority!=L2_PRIORITY_MAX&& carrier_detect() ) (SetTraveling(0);)

else if ( (data = GetPlatform())!= NULLPP)
{
    L2_FID   fid;

if(Gabby()==GABBY_WAN)
    printf("\nTicle(%p&u)",np,priority);

/*one byte of DATA, zero platform delta_tick */
                    MkL2Pkt( data, 1, L2_PROTOCOL_TICKLE, L2_FTYPE_DTA_ACK, GetNewFid(np),
                            NodeLinkAddressPtr(np), GetPrimeSourceLinkAddr(MSUBNET_WAN),
                                                    MSUBNET_WAN);

*L2DataPtr(data) = (UTEXT)priority;
    IncrementNodeTickleTries_M(np);

/* wait for tickle tick */
    WaitTillRightTick( TickleTick);

sys_wan_gain(
                  (MaxWanGain - RamTicklePowerRedux_M),
                  (dBm - RamTicklePowerRedux_M);
                  WAN_Output(data,NodeRssiLast_M(np) );

RecordEvent(1, "Tickle Transmission");

sys_wan_gain(MaxWanGain, dBm);

fid = Fid(dta);
    FreePlatform(data);

/* wait for one packet only - the rest of the tickle window...*/
    if(sys_pend(WAN_MGR_ACK_EVENT,HALF_TICKLE_WINDOW))
    {
        PLATFORM       *rx;
```

```c
            /*get packet */
    rx = (PLATFORM*)sys_get_queue(WAN_ACK_Q);

if(Fid(rx)==fid)
                    && (L2FType(rx)==L2_FTYPE_ACK)/*NOT NECESSARY...ONLY ACKS go onto this QUEUE!!!*/
                    && (L2Protocol(rx)==L2_PROTOCOL_TICKLE))
    {
    RecordEvent(4, "Receipt of Tickle ACK");
                    if(L2DataLen(rx)!=0)
                    {
                            return_code=(ARG)(*L2DataPtr(rx));
                    }
                    else
                    {
                            return_code = (ARG)(UCHAR_MAX);
                            IncrementNodeTickleSuccesses_M(np);
                    }
    if(Gabby()==GABBY_WAN) Printf("(got tickle Ack(%d, %d@%u)",
                    Fid(rx), return_code, Current.tick);

/* free the platform received */
                    FreePlatform(rx);

if( return_code<=0)
                    {
                            /* timed out or NACKed...return to Homeslot */
                            SetTraveling(0);
                    } if(return_code <=0)
    {
            SetNodeLastTickleGood_M(np,FALSE);
            NapNode(np);
    }
    else
    {
            SetNodeLastTickleGood_M(np,TRUE);
    }

12NODE.C - Metricom Proprietary - 891212 - page: 6
```

```c
            return return_code;
}

LOCAL ARG       tickle_poll_list(POLL_LIST table[],ARG table_entries,L3_PRIORITY priority, NODE
*np, MCLOCK_TIMER *pp_nap_ptr)
{
        FAST NODE                       #fnp;
        ARG                             i;
        MCLOCK_TIMER now;               failure_count = 0;
        ARG
        MCLOCK_TIMER first_nap_alarm = MCLOCK_TIMER_INFINITY;

#ifdef DEBUG_SCANNER
if(Gabby()==GABBY_SCANNER)printf("tickle_poll_list:entries:%u\n",table_entries);
endif GetMclockTimer(&now);
        for(i = 0; i<table_entries; i++)
        {
                /* get FAST NODE**/
                fnp = table[i].np;

/*nip 'ping_pong' in the bud */
                if (table_entries . 1)&&(np==fnp))       (continue;)

else    /*tickle the Node*/
                {
                        ARG     val;

if( (val=Tickle(fnp,priority))>0)
                        {
if(Gabby()==GABBY_SCANNER) printf("Got(%d)/n",i);
                                UpdateIdle( 1,failure_count);
                                return i;
                        }
                        else if( val<0)           /*only if we did not get anything */
                        {
                                failure_count++;
                        }
                }
        }
ifdef DEBUG_SCANNER
if(Gabby() == GABBY_SCANNER)
```

12NODE.C - Metricom Proprietary - 891212 - page: 7

```c
        printf("tickle_poll_list:fnp data retry alarm:%lu\n",
            NodeDataRetryTimer_M(fnp));
endif /*latch the Minimum Napping alarm of the Node in the Table */
        if(Node DataRetryTimer_M(fnp)<first_nap_alarm)
        {
            first_nap_alarm=NodeDataRetryTimer_M(fnp);

#ifdef DEBUG SCANNER
if(Gabby()==GABBY_SCANNER)Printf("tickle_poll_list setting 'first_nap_alarm' to:%lu\n",
            first_nap_alarm);
#endif
        }
    )
    /*if we failed and there has been a Node that got Napped*/
    if(first_nap_alarm!=MCLOCK_TIMER_INFINITY)
    {
        *pp_nap_ptr = first_nap_alarm;

#ifdef DEBUG SCANNER
if(Gabby()==GABBY_SCANNER)
{
        printf("tickle_poll_list setting pp_nap_alarm to %lu\n",
                *pp_nap_ptr);
#endif
    }

UpdateIdle(O,failure_count);

return NOTOK;
}

/*Passed the destination DEV_ADDR and a pointer to a BOOL.
  and a priority (for Tickle)

Returns the NODE* of a link that has been successfully 'tickled' or
  NULLNP if none.
*/
```

```
LOCAL ARG     fill_scan_table(
              WAN_ADDR       *dest_wan,
              POLL_LIST      table[],
              L3_MOOD         mood)
{
     ARG                 i, table_entries;
     ANGLE               our_bearing;
     DISTANCE            our_distance;
     LAN_ADDR            dest-lan;
     MCLOCK_TIMER now;
     NODE                *np=NULLNP;
     BOOL                possibly_cds = TRUE;

if(Gabby()==GABBY_SCANNER) sys_puts("scan...");

/*we need an unchaning WAN Active Node Queue*/
     LockWAN();

If(IsMobileWanAddr(&OurGlobalWanAddr)
     {
          our-distance = 20000;
     }
if(Gabby() == GABBY_SCANNER) sys_puts("we are mobile WAN address\n");
     }
     else
     {
          /*get *our* bearing and distance from the destination Node*/
          DeltaStationWanAddr(&our_bearing,&our_distance,dest_wan,&OurGlobalWanAddr);
     } ifdef DEBUG SCANNER
if(Gabby()==GABBY_SCANNER) print ("SFL:  OB:%lu OD:%lu\n", our_bearing, our_distance);
endif /*initialize table/variables*/
table entries = 0;
for(i=0;i<POLL_LIST_LEN;i++)          {table[i].progress =0;}

GetMclockTimer(&now);
while(np=(NODE*)sys_next_queue(QUE*)np, WAN_ActiveNodes_Q))!=NULLNP)
{
     BOOL    put_in_scan_table;

12NODE.C - Metricom Proprietary - 891212 - page: 9
```

```
WAN-ADDR    their_wan;
ANGLE       their_bearing;
DISTANCE    their_distance;
ULONG       progress = 0;
/* if the NODE is TWO_WAY AND it is not NAPPING OR there
    is not a lot of "Naps" (==retries)...out in the list */
if(NodeTwoWay(np)
  &&((IsExpiredMclockTimer(&now,NodeDataRetryTimerPtr(np))
      ||(NodeNaps(np)<=RamTriesBeforeCDS_M)))

/*get their WAN ADDR for distance calculations */
  LinkToWant(&their_wan,NodeLinkAddressPtr(np));

/*if Packet is PERSISTANT (i.e. battery backed) and node isn't,
       OR if the Node doesn't want to be routed to,
         ONLY inlcude it in the Scan Table if it is the destination */
  if( (((mood & L3_MOOD_PERSISTENT) && !NodeBatteryBacked_M(np))
                   ||(!NodeRouteable_M(np)))
              &&!CmpEqualWanAddr(&their_wan, dest_wan))

continue;
  }
  /*get the distance from the Node to the destination */
  DeltaStationWanAddr( &their_bearing, &their_distance, dest_wan, &their_wan);

/*put in scan table if we are NOT closer than they are */
  put_in_scan_table =!(CmpLessThanDistance(our_distance, their_distance));

/*when we discover a 'forward scan entry' */
  if( possibly_cds && put_in_scan_table)
  {
      /*if a 'hop' is found that is closer to the DEST than we are
             this is NOT a CDS packet */
      possibly_cds = FALSE;
      table_entres = 0;
      for( i=0; i< POLL_LIST_LEN; i++) (table[i].progress = 0;)

}
  if( put_in_scan_table)
  {
#ifdef DEBUG_SCANNER
if( Gabby()== GABBY_SCANNER) printf( "SFL(pist): TD:%lu forward_progress:%lu entries:&u\n",
```

12NODE.C - Metricom Proprietary - 891212 - page: 10

```
                their_distance, (ULONG)(our_distance - their_distance), table_entries);
#endif
                    /*if this is THE dest */
                    if( CmpEqualWanAddr(&their_wan,dest_wan))
#ifdef DEBUG_SCANNER
if( Gabby()== GABBY_SCANNER) sys_puts("can hit destination\n");
#endif
                            progress=DISTANCE_INFINITY;
                        )
                    else
                        (
                        progress=(ULONG)(our_distance - their_distance)+1;
                        )
                    else if(possibly_cds)            /*put delta bearing into POLL_LIST table*/
                        (
#ifdef DEBUG_SCANNER
if( Gabby() ==GABBY_SCANNER) print ("SFL(pict):  TB:%lu delta_bearing:%lu entries:%u\n",
                     their_bearing, (ULONG)labs(LONG)(their_bearing - our_bearing),
                     table_entries);
#endif
                        progress = (ULONG)labs(LONG)(their_bearing - our_bearing));
                        )
                    if( (progress !=0) &&
                    insert_in_poll_list(table,np,progress,POLL_LIST_LEN,table_entries))
                        (
                            /*latch at size of table*/
                            if(table_entries,<POLL_LIST_LEN) (table_entries++;)
                        )
                    )
                )    /*end of while ActiveNodes*/
            )
            /*we are done with the NodeList*/
            UnlockWAN();
            if(possibly_cds)
                (
                IncrementCulDeSacs_M();
                )
            return table_entries;
        )

12NODE.C - Metricom Proprietary - 891212 - page: 11
```

```c
/*This routine creates a 'scan list' for a given dev_dest and proceeds to
    Tickle it looking for a non-NACK response.  When it gets it, it returns
        a pointer to the Node successfully Tickled.*/
NODE *ScanForLink(DEV_ADDR *dev_dest_ptr,L3,PRIORITY priority,NODE*np,MCLOCK_TIMER
*pp_nap_ptr,L3_MOOD mood)
(
    ARG         scan, entries;
    LAN_ADDR    lan;
    WAN_ADDR    dest_wan;
    POLL_LIST   table[POLL_LIST_LEN];

/*Get destination WAN addr and fill the scan list with nodes for it.*/
    DevToWanLan(&dest_wan,&lan,dev_dest_ptr);
    if(entries = fill_scan_table(&dest_wan,table,mood))!=NOTOK)
    {
        /*Scan list with Tickles; if any Tickle was successful,
          return pointer to Node successfully Tickled. */
        if( (scan = tickle_poll_list(
                     table,              /*storage for the SCAN Table */
                     entries,            /*the number of active entries in SCAN table*/
                     priority,           /*L2_PRIORITY that Tickles are sent out at */
                                         /*the Node that sent us the Packet..so we
don't choose it */
                     np,
                     pp_nap_ptr)/*'earliest ALARM in *failed* SCAN table */
                  )!=NOTOK)       /*NOTOK is *failed SCAN* return code*/ return table[scan].np;
    }
    return NULLNP;
}

ARG     ScanForShow(DEV_ADDR*dev_dest_ptr,POLL_LIST table[],L3_MOOD mood)
{
    LAN_ADDR    lan;
    WAN_ADDR    dest_wan;
    ARG         num=0;

DevToWanLan( &dest_wan, &lan,dev_dest_ptr);
    if( IsStationWanAddr(&dest_wan))
    {
```

12NODE.C - Metricom Proprietary - 891212 - page: 12

```c
        num = fill_scan_table(&dest_wan,table,mood);

return num;
}

/* *****************************IdleInterval***************************** */ define         NUM_IDLE_BUCKETS                        (8)

struct
{
        UCOUNT                          successes,failures;
} idle_history[NUM_IDLE_BUCKETS];

LOCAL UCOUNT            past_successes,past_failures;
LOCAL UCOUNT            current_index;
LOCAL MCLOCK_TIMER      idle_interval_timer;

VOID    InitIdle(VOID)
{
    ARG i;

past_successes      = 0;
    past_failures       = 0;
    current_index       = 0;
    idle_interval_timer = 0;

for( i=0; i < NUM_IDLE_BUCKETS; i++)
    {
        idle_history[i].successes = 0;
        idle_history[i].failures  = 0;
    }
}

VOID    UpdateIdle( UCOUNT successes, UCOUNT failures)
{
    MCLOCK_TIMER now;

GetMclockTimer( &now);

if( IsExpiredMclockTimer(&now,&idle_interval_timer))
```

12NODE.C - Metricom Proprietary - 891212 - page: 13

```
        ARG     i;

GetExpiredMclockTimer( &idle_interval_timer,RamWANIdleInterval_M);

if( ++current_index == NUM_IDEL_BUCKETS) ( current_index = 0;)

idle_history[current_index].successes = 0;
        idle_history[current_index].failures = 0;

for( past_successes = past_failures = i = 0; i < NUM_IDLE_BUCKETS; i++)
        {
                past_successes          + = idle_history[i].successes;
                past_failures           + = idle_history[i].failures;
        } idle_history[current_index].successes   + = successes;
        idle_history[current_index].failures    + = failures;
)

UTEXT   "ExportIdleData( UTEXT *bp)
(
        ARG
        MCLOCK_TIMER now;

bp = ExportMuint( bp, current_index);

for( i = 0; i < NUM_IDLE_BUCKETS; i++)
        {
                bp              = ExportMuint( bp,idle_history[i].successes );
                bp              = ExportMuint( bp,idle_history[i].failures );
        } bp              = ExportMuint( bp,past_successes );
        bp              = ExportMuint( bp,past_failures );

bp = ExportMulong( bp,idle_interval_timer);
        GetMclockTimer( &now );
        bp = ExportMulong( bp,now );

/* report the 'answer' too!*/
```

12NODE.C - Metricom Proprietary - 891212 - page: 14

```
        bp     = ExportMuint( bp, IdlePeriod() );
        bp     = ExportMuint( bp,       NumInMaintList(MSUBNET_LAN) );
        bp     = ExportMuint( bp,       NumInMaintList(MSUBNET_WAN) );

return bp;
}

/*
in a nutshell.......
                    (TotalFailures + TotalSuccesses + IdleBias)
   TotalFailures + MaxIdle Period + --------------------------------------
                                              2
   -----------------------------------------------------------------------
                    TotalFailures + TotalSuccesses + IdleBias Returns the number of 'transmit opportunities'(e.g., slots) to wait before
       transmitting again.
*/
UCOUNT          IdlePeriod(VOID)
{
       UCOUNT      val,total_successes,total_failures,fbs;

total_failures     = past_failures + idle_history[current_index].failures;
       total_successes    = past_successes + idle_history[current_index].successes;

/* try to follow this... */
       val      = total_failures *RamWANIdlePeriod_M;
       fbs      = total_failures + RamWANIdleBias_M + total_successes;
       val     += (fbs / 2);
       val     /= fbs ;

if( Gabby() == GABBY_CONGESTION) ( printf( "IdlePeriod returning:%u\n",val);)

return val;
}
/* end of file */

12NODE.C - Metricom Proprietary - 891212 - page: 15
```

Appendix E
Listing L2SCAN C
©Copyright (unpublished work) Metricom, Inc.
All rights reserved.

```
#include    <stdio.h>
include    <stdarg.h> include    "std.h"
include    "kernel.h"
#include    "net.h"

#include    "mtime.h"
#include    "mclock.h"
#include    "addr.h"
#include    "angle.h"

#include    "l0.h"
#include    "l1.h"
#include    "l2.h"
#include    "l2lanwan.h"
#include    "node.h"
#include    "l3.h"
#include    "l3lanwan.h"
#include    "platform.h"
#include    "config.h"
#include    "scan.h"

/* l2scan.c *********************************************************
*
*
********************************************************** l2scan.c */

LOCAL BOOL  poll_list_insert(
    POLL_LIST   table[],
    NODE        *np;
    ULONG       progress,
    ARG         index,
    ARG         length_of_table,
    ARG         num_entries )
``` l2scan.c - Metricom Proprietary - 891212 - page:1

```c
    ARG     i ;

/* zero referenced; don't write beyond table */
    if( (index >= length_of_table) || (num_entries > length_of_table) )
    {
#define DEBUG
#ifdef DEBUG
    printf( "poll_list_insert ERROR: index:%d length:%d num_entries:%d\n",
            index, length_of_table, num_entries ) ;
#endif
undef DEBUG return FALSE ;
    }

/* when we're full, spill the 'last' entry */
    if( num_entries == length_of_table )       ( num_entries-- ;   )

/* move everyone 'down' one index */
    for( i = num_entries; i > index; i-- )
    {
        table[i].np        = table[i - 1].np ;
        table[i].progress  = table[i - 1].progress ;
    } table[index].np       = np ;
    table[index].progress = progress ;

#ifdef DEBUG
    if(Gabby() == GABBY_SCANNER)
    {
    ARG j ;
    printf( "poll_list_insert entries:%d index:%d np:%p progress:%lu\n",
            num_entries, index, np, progress ) ;
    for( j = 0; j < num_entries + 1; j++ )
    {
        printf( "table[%d].np = %p progress:%lu\n",
                j, table[j].np, table[j].progress ) ;
```

```
        }
#endif
        return TRUE ;
}

ULONG   ProbableProgress( ULONG tries, ULONG retries, ULONG parameter )
{
        ULONG    progress ;

/*
if( Gabby() == 7) printf( "probableProgress( %lu %lu %lu ) returning: ",
        tries, retries, parameter ) ;
*/
        /* scale 'tries' and 'retries' if needed */
        if( (tries > (ULONG_MAX >> 4)) || (retries > (ULONG_MAX >> 4)) )
        {
                tries   >>= 4 ;
                retries >>= 4 ;
        }

/* scale 'parameter' if needed; protect division */
        if( parameter > (ULONG_MAX >> 8) ) ( parameter >>= 8 ; )
        else if( parameter == 0 )          ( parameter++ ; )

if( (tries + retries) > 0 )
        {
                progress = ((tries << 4) / (tries + retries)) * parameter ;
        }
        else
        {
                progress = 1 ;
        }

/* if( Gabby() == 7) printf( "%lu\n", progress ) ; */
        return progress ;
```

```
LOCAL BOOL   insert_in_poll_list(
     POLL_LIST table[],
     NODE      *np,
     ULONG     qualification,
     ARG       length_of_table,
     ARG       num_entries )
{
     ARG   i ;
     ULONG progress ;

progress = ProbableProgress(
                     NodeTotalDataSent(np),
                     NodeTotalRetries(np),
                     qualification ) ;

for( i = 0; i < length_of_table && i <= num_entries; i++ )
     {
          if( progress > table[i].progress )
          {
if(Gabby() == GABBY_SCANNER) printf( "Inserting %p.%lu from [%lu] into poll_table at %u\n",
np, progress, qualification, i ) ;
               return( poll_list_insert( table, np, progress, i, length_of_table,
num_entries) ) ;
          }
     }
     return FALSE ;
}

/*
     returns   NOTOK     if the node doesn't respond
     returns   OK        if the Node "NACKs" us
     returns   <val>     if the node responds with a positive 'num_platforms'
``` l2scan.c - Metricom Proprietary - 891212 - page:4

```c
 */
ARG    Tickle( NODE *np, L3_PRIORITY priority )
(
    PLATFORM   *data ;
    ARG         return_code = NOTOK ;

if( (data = (PLATFORM *)sys_get_queue(FreePlatform_Q)) != NULLPP )
    (
        L2_FID     fid ;

if(Gabby() == GABBY_WAN)
    printf( "\nTickle( %p %u )", np, priority ) ;

/* one byte of DATA, zero platform delta_tick */
        MkL2Pkt( data, 1, L2_PROTOCOL_TICKLE, L2_FTYPE_DATA_ACK, GetNewFid(np),
                 NodeLinkAddressPtr(np), GetPrimeSourceLinkAddr(MSUBNET_WAN),
                 MSUBNET_WAN ) ;

*L2DataPtr(data) = (UTEXT)priority ;
        SetTraveling( NodeDeltaTick_M(np) ) ;
        IncrementNodeTickleTries_M(np) ;

/* wait for tickle tick */
        WaitTillRightTick( TICKLE_TICK ) ;

WAN_Output( data, NodeRssiLast_M(np) ) ;
        fid = Fid(data) ;
        FreePlatform(data) ;

/* wait for one packet only */
        if( sys_pend(WAN_MGR_RX_EVENT, TICKLE_WAIT) )
        (
            PLATFORM *rx ;

/* get packet */
            rx = (PLATFORM *)sys_get_queue(WAN_Mgr_Rx_Q) ;

if( (Fid(rx) == fid)
                && (L2FType(rx) == L2_FTYPE_ACK)
```

```
                && (L2Protocol(rx) == L2_PROTOCOL_TICKLE) )
            if( L2DataLen(rx) != 0 )
            (
                return_code = (ARG)(*L2DataPtr(rx)) ;
            )
            else
            (
                return_code = (ARG)(UCHAR_MAX) ;
            )
            IncrementNodeTickleSuccesses_M(np) ;
        }
        if(Gabby() == GABBY_WAN) printf("(got tickle Ack(%d,%d) @ %u) ",
            Fid(rx), return_code, Current.tick ) ;

/* free the platform received */
        FreePlatform(rx) ;
    } if( return_code <= 0 )
    (
        /* timed out or NACKed... return to HomeSlot */
        SetTraveling(0) ;
    )

if( return_code <= 0 )
    (
        SetNodeLastTickleGood_M(np,FALSE) ;
        NapNode(np) ;
    )
    else
    (
        SetNodeLastTickleGood_M(np, TRUE ) ;
    )

return return_code ;
```

```c
LOCAL ARG tickle_poll_list( POLL_LIST table[], ARG table_entries, L3_PRIORITY
priority, NODE *np, MCLOCK_TIMER *pp_nap_ptr )
{
    FAST NODE       *fnp ;
    ARG             i ;
    MCLOCK_TIMER    now ;            failure_count = 0 ;
    ARG
    MCLOCK_TIMER    first_nap_alarm = MCLOCK_TIMER_INFINITY ;

if( Gabby() == GABBY_SCANNER) printf( "tickle_poll_list: entries:%u\n", table_entries
) ;

GetMclockTimer(&now) ;
    for( i = 0; i < table_entries; i++ )
    {
        /* get FAST NODE * */
        fnp = table[i].np ;

/* nip 'ping_pong' in the bud */
        if( (table_entries > 1) && (np == fnp) )       ( continue ; )

else /* tickle the Node */
        {
            ARG         val ;

if( (val = Tickle(fnp,priority)) > 0 )
            {
                if( GABBY_SCANNER) printf("Got(%d)\n", i ) ;
                UpdateIdle( 1, failure_count ) ;
                return i ;
            }
            else if( val < 0 )              /* only if we did not get anything */
            {
                failure_count++ ;
            }
```

```
    if(Gabby() == GABBY_SCANNER)
    printf( "tickle_poll_list: fnp data retry alarm:%lu\n",
        NodeDataRetryTimer_M(fnp) ) ;

/* latch the Minimum Napping alarm of the Node in the Table */
        if( NodeDataRetryTimer_M(fnp) < first_nap_alarm )
        {
                first_nap_alarm = NodeDataRetryTimer_M(fnp) ;
    if(Gabby() == GABBY_SCANNER) printf( "tickle_poll_list setting 'first_nap_alarm' to:
%lu\n",
                first_nap_alarm ) ;
        }

/* if we failed and there has been a Node that got Napped */
        if( first_nap_alarm != MCLOCK_TIMER_INFINITY )
        {
                *pp_nap_ptr = first_nap_alarm ;
    if( Gabby() == GABBY_SCANNER )
        printf( "tickle_poll_list setting pp_nap_alarm to %lu\n",
                *pp_nap_ptr ) ;
        }

UpdateIdle( 0, failure_count ) ;

return NOTOK ;

}

/* Passed the destination DEV_ADDR and a pointer to a BOOL.
    and a priority  (for Tickle)

Upon entry, the BOOL contains the backtrack status of the packet
    BEFORE this scan has tried to *route* this packet.
```

```
       Upon exit, this BOOL contains the backtrack status of the packet
       AFTER this scan has tried to *route* this packet.

The BOOL is used to indicate to the calling routine(s) if that the
       NODE * returned this time is the FIRST backtrack -- even if the NODE *
       returned is NULLNP (see below).

If this BOOL has changed during this scan the calling routine is
       obliged to update the 'backtracking bit' of the L3Header and re-export
       it into the Exported version of the packet.

Returns the NODE * of a link that has been successfully 'tickled' or
       NULLNP if none.
*/

LOCAL ARG fill_scan_table(
       WAN_ADDR        *dest_wan,
       BOOL            *backtrack,
       POLL_LIST       table[],
       L3_MOOD         mood )

ARG                     i, table_entries ;
       ANGLE                   our_bearing ;
       DISTANCE                our_distance ;
       NODE                    *np ;
       LAN_ADDR                dest_lan ;
       MCLOCK_TIMER            now ;
       BOOL                    possibly_cds = TRUE ;

if(Gabby() == GABBY_SCANNER ) sys_puts( "scan..." ) ;

/* we need an unchanging WAN Active Node Queue */
LockWAN() ;

if( IsMobileWanAddr(&OurGlobalWanAddr) )
{
       our_distance = 20000 ;
if(Gabby() == GABBY_SCANNER ) sys_puts( "we are mobile WAN address\n" ) ;
```

```c
        }
        else
        {
            /* get *our* bearing and distance from the destination Node */
            DeltaStationWanAddr( &our_bearing, &our_distance, dest_wan,
&OurGlobalWanAddr ) ;
        } if( Gabby() == GABBY_SCANNER) printf( "SFL: OB:%lu OD:%lu\n", our_bearing,
our_distance ) ;

/* initialize table/variables */
        table_entries = 0 ;
        for( i = 0; i < POLL_LIST_LEN; i++ )       ( table[i].progress = 0 ; )

GetMclockTimer(&now) ;
        np = (NODE *)WAN_ActiveNodes_Q ;
        while( (np = (NODE *)sys_next_queue((QUE *)np, WAN_ActiveNodes_Q)) != NULLNP )
        {
            BOOL       put_in_scan_table ;
            WAN_ADDR   their_wan ;
            ANGLE              their_bearing ;
            DISTANCE   their_distance ;
            ULONG              progress = 0 ;

/* if the NODE is TWO WAY AND it is not NAPPING OR there
                is not a lot of "Naps" (== retries) ... out in the list */
            if( NodeTwoWay(np)
                && ((IsExpiredMclockTimer(&now,NodeDataRetryTimerPtr(np))
                    || (NodeNaps(np) <= RamTriesBeforeCDS_M)))
            )

/* check for Battery Backed (PERSISTENT) node requests */
            if( (mood & L3_MOOD_PERSISTENT) && !NodeBatteryBacked_M(np) )
            (
                continue ;
            )

/* get their WAN_ADDR for distance calculations */
```

```c
                        LinkToWan( &their_wan, NodeLinkAddressPtr(np) ) ;

/* if the Node doesn't want to be routed to,
                           ONLY include it in the Scan Table if it is the destination */
                        if( !NodeRouteable_M(np) && !CmpEqualWanAddr(&their_wan, dest_wan) )
                        {
                                continue ;
                        }

DeltaStationWanAddr( &their_bearing, &their_distance, dest_wan,
&their_wan ) ;

/* put in scan table if we are NOT closer than they are */
                        put_in_scan_table = !(CmpLessThanDistance(our_distance,
their_distance)) ;

/* when we discover a 'forward scan entry' */
                        if( possibly_cds && put_in_scan_table )
                        {
                                /* if a 'hop' is found that is closer to the DEST than we are
                                   this is NOT a CDS packet */
                                possibly_cds = FALSE ;
                                table_entries = 0 ;
                                for( i = 0; i < POLL_LIST_LEN; i++ ) { ( table[i].progress = 0 ; )
                        } if( put_in_scan_table )
                        {
if( Gabby() == GABBY_SCANNER) printf( "SFL(pist): TD:%lu forward_progress:%lu
entries:%u\n",
                                their_distance, (ULONG)(our_distance - their_distance), table_entries ) ;
                                /* if this is THE dest */
                                if( CmpEqualWanAddr(&their_wan, dest_wan) )
                                {
if( Gabby() == GABBY_SCANNER ) sys_puts( "can hit destination\n" ) ;
                                        progress = DISTANCE_INFINITY ;
                                }
                                else
```

```c
            {
            progress = (ULONG)(our_distance - their_distance) + 1 ;
            }
        else if( possibly_cds )  /* put delta bearing into POLL_LIST table */
            {
            if( Gabby() == GABBY_SCANNER) printf( "SFL(pict): TB:%lu delta_bearing:%lu entries:%u\n",
                their_bearing, (ULONG)labs( (LONG)(their_bearing - our_bearing) ),
                table_entries ) ;

progress = (ULONG)labs( (LONG)(their_bearing - our_bearing) ) ;
            } if( (progress != 0) && insert_in_poll_list( table, np, progress,
            POLL_LIST_LEN, table_entries) )
            {
            /* latch at size of table */
            if( table_entries < POLL_LIST_LEN )          ( table_entries++ ;
            }
        }

}   /* end of while ActiveNodes */

/* we are done with the NodeList */
UnlockWAN() ;

if( possibly_cds )
    {
    *backtrack = TRUE ;
    IncrementCulDeSacs_M() ;
    } return table_entries ;
}

NODE *ScanForLink( DEV_ADDR *dev_dest_ptr, BOOL *backtrack, L3_PRIORITY priority,
NODE *np, MCLOCK_TIMER *pp_nap_ptr, L3_MOOD mood )
```

```
        ARG          scan, entries ;
        LAN_ADDR     lan ;
        WAN_ADDR     dest_wan ;
        POLL_LIST    table[POLL_LIST_LEN] ;

/* hit directly iff Mobile WAN address */
        DevToWanLan( &dest_wan, &lan, dev_dest_ptr ) ;
        if( IsMobileWanAddr(&dest_wan) )
        {
            LINK_ADDR link ;
            NODE      *np ;

if(Gabby() == GABBY_SCANNER) printf( "Direct to a Mobile WAN address\n" ) ;
            WanToLink(&link, &dest_wan) ;
            if( (np = FindNodeGivenLinkPtr(&link, MSUBNET_WAN)) != NULLNP )
            {
                /* if the Tickle failed */
                if( Tickle(np, priority) <= 0 )
                {
                    /* return the Nap Time and NULLNP.. failure indication */
                    *pp_nap_ptr = NodeDataRetryTimer_M(np) ;
                }
            }
            return np ;
        }
        else if( (entries = fill_scan_table( &dest_wan, backtrack, table, mood )) != NOTOK )
        {
            if( (scan = tickle_poll_list(
                            table,
                            entries,
                            priority,
                            np,
                            pp_nap_ptr)) != NOTOK )
            {
                return table[scan].np ;
```

```
        return NULLNP ;
    }
}

VOID ScanForShow( DEV_ADDR *dev_dest_ptr, BOOL *backtrack, POLL_LIST table[], L3_MOOD
mood )
{
    LAN_ADDR    lan ;
    WAN_ADDR    dest_wan ;

DevToWanLan( &dest_wan, &lan, dev_dest_ptr ) ;
    if( !IsMobileWanAddr(&dest_wan) )
    {
        fill_scan_table( &dest_wan, backtrack, table, mood ) ;
    }
}

/* ****************** IdleInterval ****************************** */ define     NUM_IDLE_BUCKETS        (8)

struct
{
    UCOUNT      successes, failures ;
} idle_history[NUM_IDLE_BUCKETS] ;

LOCAL UCOUNT         past_successes, past_failures ;
LOCAL UCOUNT         current_index ;
LOCAL MCLOCK_TIMER   idle_interval_timer ;

VOID InitIdle(VOID)
{
    ARG i ;
```

```
        past_successes    = 0 ;
        past_failures     = 0 ;
        current_index     = 0 ;
        idle_interval_timer = 0 ;

for( i = 0; i < NUM_IDLE_BUCKETS; i++ )
        {
                idle_history[i].successes = 0 ;
                idle_history[i].failures  = 0 ;
        }
}

VOID UpdateIdle( UCOUNT successes, UCOUNT failures )
{
        MCLOCK_TIMER    now ;

GetMclockTimer( &now ) ;

if( IsExpiredMclockTimer(&now, &idle_interval_timer) )
        {
                ARG     i ;

GetExpiredMclockTimer( &idle_interval_timer, RamWANIdleInterval_M ) ;

if( ++current_index == NUM_IDLE_BUCKETS ) ( current_index = 0 ; )

idle_history[current_index].successes = 0 ;
                idle_history[current_index].failures  = 0 ;

for( past_successes = past_failures = i = 0; i < NUM_IDLE_BUCKETS; i++ )
                {
                        past_successes += idle_history[i].successes ;
                        past_failures  += idle_history[i].failures ;
                }
        } idle_history[current_index].successes  += successes ;
        idle_history[current_index].failures   += failures ;
``` l2scan.c - Metricom Proprietary - 891212 - page:15

```c
VOID pr_idle(VOID)
{
ARG
    MCLOCK_TIMER    now ;
                    i ;

printf( "Current:%u IdleBuckets->\n", current_index ) ;

for( i = 0; i < NUM_IDLE_BUCKETS; i++ )
    {
        printf( "%d:%u:%u ",
                i, idle_history[i].successes, idle_history[i].failures ) ;
    } printf( "\nPastSuccesses:%u PastFailures:%u\n",
            past_successes, past_failures ) ;

GetMclockTimer(&now) ;
    printf( "IdleIntervalTimer:%lu Now:%lu -- IdlePeriod:%u\n",
            idle_interval_timer, now, IdlePeriod() ) ;
}

UTEXT   *ExportIdleData( UTEXT *bp )
{
ARG
    MCLOCK_TIMER    now ;
                    i ;

bp = ExportMuint( bp, current_index ) ;

for( i = 0; i < NUM_IDLE_BUCKETS; i++ )
    {
        bp  = ExportMuint( bp, idle_history[i].successes ) ;
        bp  = ExportMuint( bp, idle_history[i].failures ) ;
    } bp  = ExportMuint( bp, past_successes ) ;
    bp  = ExportMuint( bp, past_failures ) ;
``` l2scan.c - Metricom Proprietary - 891212 - page:16

```
    bp = ExportMulong( bp, idle_interval_timer ) ;
    GetMclockTimer( &now ) ;
    bp = ExportMulong( bp, now ) ;

/* report the 'answer' too! */
    bp = ExportMuint( bp, IdlePeriod() ) ;
    bp = ExportMuint( bp, NumInMaintList(MSUBNET_LAN) ) ;
    bp = ExportMuint( bp, NumInMaintList(MSUBNET_WAN) ) ;

return bp ;
}

/*
 * in a nutshell........
 *
 *                                          (TotalFailures + TotalSuccesses + IdleBias)
 *    TotalFailures + MaxIdlePeriod + -------------------------------------------------
 *                                                            2
 *    ---------------------------------------------------------------------------------
 *                         TotalSuccesses + IdleBias
 *
 * Returns the number of 'transmit opportunities' (e.g., slots) to wait before
 * transmitting again.
 */
UCOUNT  IdlePeriod(VOID)
{
    UCOUNT    val, total_successes, total_failures, fbs ;

total_failures  = past_failures  + idle_history[current_index].failures ;
    total_successes = past_successes + idle_history[current_index].successes ;

/* try to follow this... */
    val = total_failures * RamWANIdlePeriod_M ;
    fbs = total_failures + RamWANIdleBias_M + total_successes ;
    val += (fbs / 2) ;
```

```
    val /= fbs ;
if( Gabby() == GABBY_CONGESTION )
{
    printf( "IdlePeriod returning:%u\n", val ) ;
}
return val ;
}
``` l2scan.c - Metricom Proprietary - 891212

Appendix F

Listing L2WAN C

©Copyright (unpublished work) Metricom, Inc.
All rights reserved.

```c
#include    <stdio.h>
include    <stdlib.h> include    "std.h"
include    "kernel.h"
#include    "net.h"

#include    "mtime.h"
#include    "mclock.h"
#include    "addr.h"

#include    "l0.h"
#include    "l1.h"
#include    "l2.h"
#include    "l2lanwan.h"
#include    "node.h"
#include    "l3.h"
#include    "l3lanwan.h"
#include    "scan.h"
#include    "platform.h"
#include    "config.h"

#include    "netutil.h"

/***************************************************************
*
*   l2wan.c
*
*   Routines necessary to complete exchanges over MSUBNET_WAN
*
*   VOID WAN_ack_ack_send( PLATFORM *data, PLATFORM *ack_ack )
*
*   Passed the ACK packet just received, this routine creates
*   the ACK_ACK (in the passed buffer, 'ack_ack), and calls
*   'sys_wan_send()'.
*/

VOID WAN_ack_send( PLATFORM *data, UTINY num_platforms )
``` l2wan.c - Metricom Proprietary - 891212 - page:1

```
*      Passed a DATA packet, this routine makes an ACK and send it out
*      using 'sys_wan_send()' and BLOCKS awaiting the ACK to be sent.
*
*      [TASK]
*      VOID WAN_rx(VOID)
*
***********************************************************************/

LOCAL  UCOUNT       data_send_quit_slot ;
LOCAL  BOOL                  data_cycling = FALSE ;

LOCAL  VOID    Tx_Q_to_WAN_data_to_go_Q( PLATFORM *pp )
{
    if( OutputNode(pp) == NULLNP )
    {
        FreePlatform(pp) ;
    }
    else
    {
        /* start with no naps in this Packet */
        GetExpiredMclockTimer( PacketNapAlarmPtr(pp), 0 ) ;
        sys_add_queue( (QUE *)pp, WAN_DataToGo_Q, FIFO ) ;
    }
}

VOID WAN_Output( PLATFORM *pp, UTINY rx_signal )
{
    if( GoToSlot( TRANSMIT ) == TRUE )
    {
        /* send the data out */
        if( !sys_wan_send(L1DataPtr(pp), L1DataLen(pp), rx_signal) )
        {
            if( Gabby() == GABBY_WAN ) sys_puts("^") ;
```

```c
        /* in any case, go back to the receive channel */
        GoToSlot( RECEIVE ) ;
}

LOCAL UTINY    pseudo_sig2noise( UTINY last_rx )
{
    if( last_rx > WanRssiMin_M )  { return( last_rx - WanRssiMin_M ) ; } return 0 ;
}

LOCAL VOID    WAN_ack_ack_send( PLATFORM *ack )
{
    PLATFORM *ack_ack ;

/* pre-allocate the 'spare' platform used for ACKs and ACK_ACKs */
    if( (ack_ack = (PLATFORM *)sys_get_queue(FreePlatform_Q)) != NULLPP )
    {
        MkL2Pkt(ack_ack, 0, L2Protocol(ack), L2_FTYPE_ACK_ACK,
                Fid(ack), LinkSrcPtr(ack), GetPrimeSourceLinkAddr(MSUBNET_WAN),
                MSUBNET_WAN ) ;

WAN_Output( ack_ack, pseudo_sig2noise(NodeRssiLast_M(InputNode(ack))) ) ;
        FreePlatform(ack_ack) ;
    } if(Gabby() == GABBY_WAN) printf( "TAA(%u) @ CT:%u\n", (UCOUNT)Fid(ack_ack),
Current.tick ) ;
}

LOCAL VOID    WAN_ack_send( PLATFORM *data, UTINY num_platforms )
{
    PLATFORM *ack ;
```

```c
        /* pre-allocate the 'spare' platform used for ACKs and ACK_ACKs */
        if( (ack = (PLATFORM *)sys_get_queue(FreePlatform_Q)) != NULLPP )
        {
            /* One byte of length and NO delta_tick */
            MkL2Pkt( ack, 1, L2Protocol(data), L2FTYPE_ACK, Fid(data),
                LinkSrcPtr(data), GetPrimeSourceLinkAddr(MSUBNET_WAN),
                    MSUBNET_WAN ) ;

/* if we can reasonably expect an ACK_ACK */
            if( num_platforms   SetNodeLastAckGood_M( InputNode(data), FALSE ) ;

*(L2DataPtr(ack)) = (UTEXT)num_platforms ;
            WAN_Output( ack, pseudo_sig2noise(NodeRssiLast_M(InputNode(data))) ) ;
            FreePlatform(ack) ;
        } if(Gabby() == GABBY_WAN) printf( "TA(%u,%u) @ HT:%u ",
    (UCOUNT)Fid(data), (UCOUNT)num_platforms, Home.tick ) ;
}

/* Lonely code ***************************************************/
/* Note: the algorithm as implemented will take two times
    LONELY_TIME (less 15 seconds) to commit suicide...
*/
#define         LONELY_TIME             1800            /* thirty minutes */
LOCAL MCLOCK_TIMER      lonely_alarm  = LONELY_TIME ;
LOCAL ARG               lonely_count  = 0 ;

LOCAL VOID      not_lonely( NODE *np )
{
    if( np != NULLNP )
    {
        /* this node is NO LONGER napping */
        ClearNodeNaps(np) ;
        GetMclockTimer( NodeDataRetryTimerPtr(np) ) ;
``` l2wan.c - Metricom Proprietary - 891212 - page:4

```c
        GetExpiredMclockTimer( &lonely_alarm, LONELY_TIME ) ;
        lonely_count = 0 ;
}
/* ***************************************************** lonely code */

VOID UpdateRadioData( WAN_RX_STRUCT *wrxp )
{
    SetWanRssiMax_M( max(WanRssiMax_M, wrxp->rssi) ) ;
    SetWanRssiMin_M( min(WanRssiMin_M, wrxp->rssi) ) ;

if( WanRssiSmoothed_M < WanRssiMin_M )
    {
        SetWanRssiSmoothed_M( wrxp->rssi ) ;
    }
    else
    {
        SetWanRssiSmoothed_M( (BYTES)smooth( (ARG)WanRssiSmoothed_M, (ARG)wrxp-
>rssi) ) ;
    }

SetDiscMax_M( max(DiscMax_M, wrxp->discriminator) ) ;
    SetDiscMin_M( min(DiscMin_M, wrxp->discriminator) ) ;

/* come up with a valid value fast */
    if( DiscSmoothed_M == 0 )
    {
        SetDiscSmoothed_M(wrxp->discriminator) ;
    }
    else
    {
        SetDiscSmoothed_M( (BYTES)smooth( (ARG)DiscSmoothed_M, (ARG)wrxp-
>discriminator) ) ;
    }
}
/* [TASK] */
``` l2wan.c - Metricom Proprietary - 891212 - page:5

```
VOID WAN_Receiver(VOID)
{
    PLATFORM *pp ;

while(TRUE)
    {
        if( (pp = (PLATFORM *)sys_get_queue(FreePlatform_Q)) != NULLPP )
        {
            NODE            *np ;
            WAN_RX_STRUCT   wrx ;
#if !(CONSTLengthL2Header())
            UCOUNT          l2_header_len ;
endif SetSubnet(pp,MSUBNET_WAN) ;
            SetPort(pp,RF) ;
            SetL1DataPtr(pp,Export(pp)) ;
            sys_wan_receive(L1DataPtr(pp), &wrx ) ;
            UpdateRadioData( &wrx ) ;

SetL1DataLen(pp,wrx.buffer_len) ;

/* remember when we got this packet */
            GetMclockTimer(PPTimerPtr(pp)) ;

/* import L2 Header */
            SetL2DataPtr( pp, ImportL2Header( L2HeaderPtr(pp), L1DataPtr(pp),
                            MSUBNET_WAN ) ) ;

#if  CONSTLengthL2Header()
#define   l2_header_len    L2_HEADER_LEN
#else
            l2_header_len = (L2DataPtr(pp) - L1DataPtr(pp) ) ;
#endif
            if( L1DataLen(pp) >= l2_header_len )
            {
                SetL2DataLen( pp, L1DataLen(pp) - l2_header_len ) ;
            }
            else
```

```c
            {
            FreePlatform(pp) ;
            continue ;
            }

SetL3DataPtr(pp, NULLCHAR) ;

if(Gabby() == GABBY_WAN) printf( "\nWAN_rx-> CS:%u CT:%u ", Current.slot, Current.tick ) ;
#ifdef DEBUG
        sys_puts( "WAN_rx received a packet\n" ) ;
        printf( "buffer_len:%u tx_tick:%u aosTick:%u RSSI:%u Disc:%u\n",
                wrx.buffer_len, wrx.tx_tick, wrx.aos_tick,
                wrx.rssi, wrx.discriminator ) ;
#endif
        /* count this as a received packet */
        IncrementWANRx() ;

/* if can't find it AND (it is invalid OR we cannot Make the Node) */
        if( ((np = FindNodeGivenLinkPtr(LinkSrcPtr(pp), MSUBNET_WAN)) == NULLNP)
            && (!ValidateSourceLinkAddr(LinkSrcPtr(pp),MSUBNET_WAN)
            ||  (np = MakeNodeGivenLinkPtr(LinkSrcPtr(pp), MSUBNET_WAN)) == NULLNP) )
            {
            FreePlatform(pp) ;
            }
        else if( NodeDoomed(np) ) { FreePlatform(pp) ; }
        else
            {
            WAN_ADDR wan ;

/* update the NODE with DeltaTick, RSSI, and DISCriminator */
            SetInputNode(pp,np) ;
            UpdateNode( np, wrx.tx_tick - wrx.aos_tick, wrx.rssi,
                        wrx.discriminator, wrx.rx_signal ) ;
``` l2wan.c - Metricom Proprietary - 891212 - page:7

```c
          MSUBNET_WAN) )
              {
              /* if this packet is not for us */
              if( !IsMySourceLinkAddr(LinkDestPtr(pp), LinkSrcPtr(pp), /* do we have enough space for saving these packets? */
                  if( FreePlatform_Q->audit > WAN_RECEIVER_TASK )
                      {
                      sys_add_queue( (QUE *)pp, WAN_DeferredRx_Q, FIFO ) ;
                      sys_post( WAN_MGR_EVENT ) ;
                      }
                  else
                      {
                      PLATFORM *wasted_pp ;

while( (wasted_pp = (PLATFORM
*)sys_get_queue(WAN_DeferredRx_Q)) != NULLPP )
                          {
                          FreePlatform(wasted_pp) ;
                          }
                      FreePlatform(pp) ;
                      }
              }
          else
              {
              if( L2FType(pp) == L2_FTYPE_ACK )
                  {
                  not_lonely(np) ;
                  sys_add_queue( (QUE *)pp, WAN_Mgr_Rx_Q, FIFO ) ;
                  sys_post( WAN_MGR_RX_EVENT ) ;
                  }
              else if( data_cycling )
                  {
                  FreePlatform(pp) ;
                  continue ;
                  }
              else if( FreePlatform_Q->audit > (sys_task_id() +
MINIMUM_PLATFORMS) )
                  {
``` l2wan.c - Metricom Proprietary - 891212 - page:8

```c
            not_lonely(NULLNP) ; )
                                    if( L2FType(pp) == L2 FTYPE_ACK_ACK )      ( sys_add_queue( (QUE *)pp, WAN_Rx_Q, FIFO ) ;
                                        sys_post( WAN_RX_EVENT ) ;
                                    }
                                    else
                                    (
                                        FreePlatform(pp) ;
                                        continue ;
                                    )
                                }
                                else
                                {
                                    sys_pend( FREE_PLATFORM_EVENT, 0 ) ;
                                }
                            }
                        }
                    }
                }

LOCAL PLATFORM *best_WAN_data_for_link( NODE *np )
{
    ARG              highest_priority ;
    PLATFORM         *next, *pp ;
    ANGLE            bearing ;
    DISTANCE         our_distance ;
    LAN_ADDR         dest_lan ;
    WAN_ADDR         wan_dest ;

/* get possible additions to the WAN_Tx_Q */
    while( (pp = (PLATFORM *)sys_get_queue(WAN_Tx_Q)) != NULLPP )
    {
        Tx_Q_to_WAN_data_to_go_Q(pp) ;
    } highest_priority   = -2 ;        /* legal MIN is 0 */
    pp                 = NULLPP ;
```

```
        next = (PLATFORM *)WAN_DataToGo_Q ;
        while( (next = (PLATFORM *)sys_next_queue((QUE *)next, WAN_DataToGo_Q)) !=
NULLPP )
            {
            /* highest priority 'moving closer' packet */
            if( (Priority(next) > highest_priority) )
                {
                DevToWanLan( &wan_dest, &dest_lan, DevDestPtr(next) ) ;
                DeltaStationWanAddr( &bearing, &our_distance, &wan_dest,
&OurGlobalWanAddr ) ;

/* if this link would move this packet closer to its dest */
                if( CloserThan( NodeLinkAddressPtr(np), &wan_dest, our_distance) )
                    {
                    highest_priority = Priority(next) ;
                    pp = next ;
                    }
                }
            }
        return pp ;
    }

LOCAL PLATFORM *highest_priority(VOID)
    {
    ARG                 highest_priority ;
    MCLOCK_TIMER        now ;
    PLATFORM            *next, *pp ;

highest_priority = -2 ;        /* legal MIN is '0' */
    pp               = NULLPP ;
    GetMclockTimer(&now);

next = (PLATFORM *)WAN_DataToGo_Q ;
    while( (next = (PLATFORM *)sys_next_queue((QUE *)next, WAN_DataToGo_Q)) !=
NULLPP )
        {
```

```c
        if( UpdateOrDead(next, TRUE) == FALSE )
        {
            /* generate RR if desired */
            if( (RRType(pp) & L3_RECEIPT_DATA_NRCV) )
            {
                MakeRR( pp, FALSE, L3_RECEIPT_NRCV_COMM_ROUTE ) ;

/* remove 'next' from the DataToGo_Q */
                sys_delete_queue((QUE *)next,WAN_DataToGo_Q) ;
                FreePlatform(next) ;
                next = (PLATFORM *)WAN_DataToGo_Q ;

/* count the 'packet death' */
                IncrementTO_M() ;

continue ;
            }

/* for each non-napping packet.... */
            if( (IsExpiredMclockTimer(&now,PacketNapAlarmPtr(next)))
                && (Priority(next) > highest_priority) )
            {
#ifdef DEBUG
if(Gabby() == GABBY_WAN) printf( "highest_priority found %d better than %d\n",
(ARG)Priority(next), highest_priority ) ;
#endif
                /* is current best choice */
                highest_priority = Priority(next) ;
                pp = next ;
            }
        } return pp ;
    }

LOCAL VOID    WAN_data_send( NODE *tx_link, PLATFORM *pp )
```

```
{
WaitTillRightTick( DATA_TICK ) ;
WAN_Output(pp, pseudo_sig2noise(NodeRssiLast_M(tx_link)) ) ;

/* count this as a 'sent' packet */
IncrementWANTx() ;
SetNodeLastDataGood_M(tx_link,FALSE) ;

/* wait for this slot plus enough to 'clear' possible ACKs */
data_send_quit_slot = CalcEndSlot( Current.slot, RamWANSlotWait_M + 1 ) ;

if(Gabby() == GABBY_WAN) printf( "%s(%u)-> @ CT:%u",
    NodeToTries(tx_link) ? "DR" : "D", (UCOUNT)Fid(pp), Current.tick ) ;

if( NodeToTries(tx_link) != 0 )
{
    /* count TOTAL retries for RadioData */
    IncrementWANDatRetries() ;
}

/* count the number of retries on THIS link */
IncrementTotalRetries(tx_link) ;

/* here is the 'exponential backoff' (+ randomization) algorithm */
IncrementNodeToTries(tx_link) ;
GetExpiredMclockTimer( &(tx_link)->retry_timer, (BETA << NodeToTries(tx_link)) +
(rand() & 0x7) ) ;
}

BOOL scan_for_link(VOID)
{
    FAST NODE *np ;
    BOOL      return_code = FALSE ;

LockWAN() ;
```

```
        np = (NODE *)WAN_ActiveNodes_Q ;
        while( (np = (NODE *)sys_next_queue((QUE *)np, WAN_ActiveNodes_Q)) != NULLNP )
            {
            if( Tickle(np,L2_PRIORITY_MIN) >= 0 )
                {
                return_code = TRUE ;
                SetTraveling(0) ;
                break ;
                }
            }

UnlockWAN() ;

return return_code ;
}

VOID WAN_scan_if_lonely(VOID)
{
    MCLOCK_TIMER    now ;

GetMclockTimer( &now ) ;

if( IsExpiredMclockTimer(&now, &lonely_alarm) )
    {
    if(Gabby() == GABBY_WAN )       sys_puts( "lonely scan\n" ) ;

if( !scan_for_link() )
        {
            ULONG   lonely_time ;

lonely_time = (LONELY_TIME / ++lonely_count) ;

if( lonely_time < 15 /* sec */ ) { Die( DEATH_FROM_LONLINESS ) ; }
            else
            {
                GetExpiredMclockTimer(&lonely_alarm, lonely_time) ;
            }
        }
    }
}
```

```c
#define     MAX_TICKLE_PRIORITY                     (L2_PRIORITY_MAX)

UTINY       NumReservedPlatforms( L2_PRIORITY priority, MSUBNET net )
    ARG     num, threshold, temp ;

/* calculate the number of PLATFORMs available at this L2_PRIORITY */
    if( net == MSUBNET_LAN )
    {
        threshold = RamLANPlatformThreshold_M ;
    }
    else
    {
        if( NackAllWANTickles )   return 0 ;

threshold = RamWANPlatformThreshold_M ;
    } temp = FreePlatform_Q->audit - MINIMUM_PLATFORMS ;
    num  = min( temp, threshold) ;

temp = MaxPlatformsAvailable - FreePlatform_Q->audit ;
    if( temp > 0 ) { num  -= temp ; } num  -= (MAX_TICKLE_PRIORITY - priority) * RamPriorityReservation_M ;

if( num < 0 )               ( num = 0 ; )
    else if( num > UCHAR_MAX )  ( num = UCHAR_MAX ; )

/*
    if( Gabby() == GABBY_WAN ) printf( "num_reserved_platforms returning:%u\n", num) ;
*/ return num ;
}
``` l2wan.c - Metricom Proprietary - 891212 - page:14

```
#define         WAN_RETURN_TO_SLOT_LATENCY              (2)

LOCAL VOID      ack_cycle(VOID)
{
    L2_PRIORITY     tickle_priority ;
    NODE            *data_np ;
    PLATFORM        *pp ;

if( (pp = (PLATFORM *)sys_get_queue(WAN_Rx_Q)) != NULLPP )
    {
        if( (L2Protocol(pp) == L2_PROTOCOL_TICKLE)
            && (L2FType(pp) == L2_FTYPE_DATA_ACK) )
        {
            UCOUNT      num_platforms ;

tickle_priority = (L2_PRIORITY)(*(L2DataPtr(pp))) ;
            if(Gabby() == GABBY_WAN) printf("tickled(%u)\n", (UCOUNT)tickle_priority ) ;
            num_platforms = NumReservedPlatforms( tickle_priority, MSUBNET_WAN ) ;

WAN_ack_send(pp, num_platforms ) ;

/* if we NACKed, FreePlatform and return */
            if( num_platforms == 0 )
            {
                FreePlatform(pp) ;
                sys_post(WAN_MGR_EVENT) ;
                return ;
            }

/* we are looking for more DATA from 'data_np' */
            data_np                    = InputNode(pp) ;

/* Free the tickle and wait for the DATA */
            FreePlatform(pp) ;
        }
        else
        {
``` l2wan.c - Metricom Proprietary - 891212 - page:15

```
        /* route the SYNC */
        if( L2Protocol(pp) == L2_PROTOCOL_SYNC )
        (
            AddToRouterQueue(pp) ;
        }
        else
        {
            /* bogus RX event -- all MUST start with a Tickle */
            FreePlatform(pp) ;
        }
        sys_post(WAN_MGR_EVENT) ;
        return ;
    }
    else
    {
        /* got RX_EVENT without receipt of a packet */
        sys_post(WAN_MGR_EVENT) ;
        return ;
    }
    /* wait here for the Data packet that should follow */
    if( sys_pend(WAN_RX_EVENT,
        ((TICKS_PER_SLOT - Current.tick) + FIRST_ACK_TICK))
    )
go:
    while( (pp = (PLATFORM *)sys_get_queue(WAN_Rx_Q)) != NULLPP )
    {
        /* if not from NODE that sent Tickle */
        if( InputNode(pp) != data_np )
        {
            /* NACK the guy */
            WAN_ack_send(pp,0) ;
            FreePlatform(pp) ;
            goto go ;
        }
        else if( L2FType(pp) == L2_FTYPE_DATA_NOACK )
```

```
slots...
        {
            /* assume that the other guy is waiting the SAME number of
                and allow time the THIS slot to expire */
            GetExpiredMclockTimer(
                NodeDataRetryTimerPtr(data_np),
                (RamWANSlotWait_M + WAN_RETURN_TO_SLOT_LATENCY)
            ) ;
            AddToRouterQueue(pp) ;      /* we're done */
        }
        else if( L2FType(pp) == L2_FTYPE_DATA_ACK )
        {
            BOOL actively_acking = TRUE ;
            UCOUNT   quit_slot, listen_slot, current ;
            UCOUNT   num_platforms ;

num_platforms = NumReservedPlatforms( tickle_priority,
                                                  MSUBNET_WAN ) ;
            WAN_ack_send(pp, num_platforms ) ;

/* if NACKed, PseudoARO packet,
                  update NODE machinery,
                  tell MGR and return */
            if( num_platforms == 0 )
            {
                AddToRouterQueue(pp) ;
                SetNodeActiveState( data_np ) ;
                sys_post(WAN_MGR_EVENT) ;
                return ;
            }
            current    = Home.slot ;
            quit_slot  = CalcEndSlot(current, (RamWANSlotWait_M + 1)) ;
            listen_slot = CalcEndSlot(current, (RamWANSlotWait_M) ) ;

if(Gabby() == GABBY_WAN)printf( "AC+DATA(%d) -- ", (UCOUNT)Fid(pp) ) ;

while( actively_acking )
            {
``` l2wan.c - Metricom Proprietary - 891212 - page:17

```
if( sys_pend(WAN_RX_EVENT, TicksTillNextAck( quit_slot,
              listen_slot)) )
{
    PLATFORM *rx ;

if( (rx = (PLATFORM *)sys_get_queue(WAN_Rx_Q)) !=
NULLPP )
    {
        NODE *np ;

np = InputNode(rx) ;

if( data_np != np )
        {
                        /* got DATA packet from a NODE we didn't
expect */
            NapNode(np) ;
            FreePlatform(rx) ;
        }
        else if( (L2FType(rx) == L2_FTYPE_ACK_ACK)
              && (Fid(rx) == Fid(pp))
              && L2Protocol(rx) == L2Protocol(pp) )
        {
            if(Gabby() == GABBY_WAN)sys_puts( "AC+ACK_ACK " ) ;
            actively_acking = FALSE ;
            FreePlatform(rx) ;
            AddToRouterQueue(pp) ;
            IncrementTotalDataRcvd(np) ;
            SetNodeLastAckGood_M(np,TRUE) ;
        }
        else if( (L2FType(rx) == L2_FTYPE_DATA_ACK)
              && (Fid(rx) != Fid(pp))
              && L2Protocol(rx) == L2Protocol(pp))
        {
            if(Gabby() == GABBY_WAN)sys_puts( "AC+piggy " ) ;
            /* received a piggyback packet */
            AddToRouterQueue(pp) ;
            IncrementTotalDataRcvd(np) ;
            SetNodeLastAckGood_M(np,TRUE) ;

l2wan.c - Metricom Proprietary - 891212 - page:18
```

```c
                    /* catch the PiggyBack on the next iteration */
                    sys_add_queue( (QUE *)rx, WAN_Rx_Q, LIFO ) ;
                    actively_acking = FALSE ;
                }
                else
                {
                    /* if not *the* packet, ignore */
                    FreePlatform(rx) ;
                }
            }
            else    /* where did the packet go? */
            {
            }
        }
        else /* timed out... should we send another ACK? */
        {
            if( Home.slot == quit_slot )
            {
                actively_acking = FALSE ;
                AddToRouterQueue(pp) ;
                IncrementPseudoARO() ;
            }
            else if( Home.slot != listen_slot )
            {
                /* ACK at the tickle priority level...
                   L3 Header is NOT imported *yet* */
                WAN_ack_send(pp,
                    NumReservedPlatforms(
                        tickle_priority,
                        MSUBNET_WAN)
                    ) ;
            }
        }
    }
    else
``` l2wan.c - Metricom Proprietary - 891212 - page:19

```
            )
                        /* error condx */
                        FreePlatform(pp) ;

} /* end of 'while(packets on WAN_rx_Q)' */ else
        {
                /* timed out... the DATA packet never followed */

/* again, assume that the other guy is waiting the SAME number of
    slots that we are and allow for THIS slot to expire */
GetExpiredMclockTimer(NodeDataRetryTimerPtr(data_np), RamWANSlotWait_M) ;

/* update NODE machinery */
SetNodeActiveState( data_np ) ;

sys_post(WAN_MGR_EVENT) ;

}

/* [TASK] */
VOID WAN_Rx(VOID)
{

/* initialize the 'Idle Upon Failure' machinery */
        InitIdle() ;

/* init the TXPower */
        sys_wan_gain( PowerLevel, PowerLevel ) ;

while( TRUE )
        {
                /* await a DATA packet to acknowledge */
                sys_pend( WAN_RX_EVENT, 0 ) ;

sys_suspend(WAN_MANAGER_TASK) ;
                ack_cycle() ;
```

```
        sys_resume(WAN_MANAGER_TASK) ;

) /* end of 'while(TRUE)' */

}

LOCAL VOID    remake_l2_header( NODE *np, PLATFORM *pp )
{
    /* remake the L2 part of the packet */
    MkL2Pkt( pp, L2DataLen(pp), L2Protocol(pp), L2FType(pp), GetNewFid(np),
             NodeLinkAddressPtr(np), LinkSrcPtr(pp),  /* ONLY HERE is this OK --
                                 I do it to save the table lookup
                                 of GetPrimeSourceLinkAddr(MSUBNET_WAN) */

MSUBNET_WAN ) ;
}

LOCAL BOOL    data_cycle( NODE *active_node, PLATFORM *tx )
{
    L2_PRIORITY   last_tx_priority ;
    PLATFORM  *new_pp ;
    ARG           data_chain_max ;
    BOOL          got_our_ack_for_first_data = FALSE ;

data_cycling = TRUE ;

/* used to limit the number of 'piggyback' packets we can send */
    data_chain_max = RamDataChainMax_M ;

SetNodeTxPacket(active_node,tx) ;
    WaitForAck(active_node) ;
    WAN_data_send(active_node,tx) ;

/* priority is MAX for Maintenance packets */
    if( L2Protocol(tx) == L2_PROTOCOL_DATA
     || L2Protocol(tx) == L2_PROTOCOL_TRACER )
```

```
        last_tx_priority = Priority(tx) ;
    }
    else
        last_tx_priority = L2_PRIORITY_MAX ;
}
while( Current.slot != data_send_quit_slot )
{
    if( sys_pend( WAN_MGR_RX_EVENT, TicksTillSlot(data_send_quit_slot)) )
    {
        PLATFORM *rx ;

if( (rx = (PLATFORM *)sys_get_queue(WAN_Mgr_Rx_Q)) != NULLPP )
        {
            /* if an ACK from the target link */
            if( active_node == InputNode(rx) )
            {
                /* Note: no check for L2Protocol is necessary here...
                         if the other guy follows the rules. */
                if( L2FType(rx) == L2_FTYPE_ACK )
                {
                    ClearNodeToTries(active_node) ;
                    SetNodeLastDataGood_M(active_node, TRUE) ;

/* unsolicited ACK */
                    if( !WaitingForAck(active_node) )   {

WAN_ack_ack_send(rx) ;  } else if( Fid(rx) == Fid(NodeTxPacket(active_node))
                             && L2Protocol(rx) ==
L2Protocol(NodeTxPacket(active_node)) )
                    {
                        UTINY          num_platforms ;
                        L2_PROTOCOL    protocol ;
                        PLATFORM       *successfully_sent_data ;
``` l2wan.c - Metricom Proprietary - 891212 - page:22

```
                                      /* latch this info for ALL successful DATA packets
                                       */
     got_our_ack_for_first_data = TRUE ;
     successfully_sent_data = NodeTxPacket(active_node) ;

/* delete from DataToGo_Q iff
        it came from the DataToGo_Q */
     protocol = L2Protocol(successfully_sent_data) ;
     if( (protocol == L2_PROTOCOL_DATA)
         || (protocol == L2_PROTOCOL_TRACER) )
     (
         sys_delete_queue( (QUE
*)successfully_sent_data, WAN_DataToGo_Q) ;
         FreePlatform(successfully_sent_data) ;
     )

IncrementTotalDataSent(active_node) ;

/* remember this success */
     GetMclockTimer(
NodeLastExchangeTimerPtr(active_node) ) ;

if( L2DataLen(rx) != 0 )
     (
         num_platforms = (UTINY)*(L2DataPtr(rx)) ;
     )
     else
     (
         num_platforms = (UTINY)(UCHAR_MAX) ;
     )

if(Gabby() == GABBY_WAN) printf( "DC+ACK(%u,%u) ", (UCOUNT)Fid(rx),
(UCOUNT)num_platforms ) ;

/* if there is MORE data to be sent */
     if( (num_platforms != 0)
         && (--data_chain_max > 0)
```

```
         best_WAN_data_for_link(active_node)) != NULLPP
                                              && (new_pp =
                                              && Priority(new_pp) >= last_tx_priority )
            (
              PLATFORM *doomed_pp ;

/* send the piggybacked Data out */
              SetNodeTxPacket(active_node,new_pp) ;

remake_l2_header( active_node, new_pp ) ;

WAN_data_send(active_node,new_pp) ;

/* delete packets received before latest Data
packet was sent */
              *)sys_get_queue(WAN_Mgr_Rx_Q)) != NULLPP )
              while( (doomed_pp = (PLATFORM
                (
                  FreePlatform( doomed_pp ) ;
                )
              }
            else /* no more to go */
              (
                StopWaitingForAck(active_node) ;
                WAN_ack_ack_send(rx) ;

/* the guy got the packet, but NACKed us */
                if( num_platforms == 0 ) {

PLATFORM *doomed_pp ;

/* retry previous piggybacked data */
                  WAN_data_send(active_node,NodeTxPacket(active_node
              }
            else /* is ACK for other than most recently
                     transmitted Data packet */
              ( NapNode(active_node) ; }

)) ;

l2wan.c - Metricom Proprietary - 891212 - page:24
```

```c
                                    /* clear all packets received before we
transmitted */
            while( (doomed_pp = (PLATFORM
*)sys_get_queue(WAN_Mgr_Rx_Q)) != NULLPP )
                {
                FreePlatform( doomed_pp ) ;
                }
            }
        else
            {
            /* received a NON-ACK packet from the 'active_node'! */
            }
        }
    else
        {
        /* heard packet from link other than the 'active_node' */
        }

/* in any case, free the packet we got */
    FreePlatform(rx) ;
    }

/* get back home */
SetTraveling(0) ;

/* Update node machinery */
SetNodeActiveState( active_node ) ;
StopWaitingForAck( active_node ) ;

/* update the IdlePeriod machinery */
UpdateIdle( (RamDataChainMax_M - data_chain_max), (got_our_ack_for_first_data ?
0 : 1) ) ;

data_cycling = FALSE ;
``` l2wan.c - Metricom Proprietary - 891212 - page:25

```
/* 'data_cycle()' didn't fail if just ONE packet got through */
    return got_our_ack_for_first_data ;

/*
    returns NOTOK if tickle succeeded and 'data_cycle()' failed
    returns   OK  if tickle failed - or reports a NACK
    returns  TRUE if success
*/
ARG     WANLinkMaintenanceSend( NODE *np, PLATFORM *pp )
ARG     return_code ;
( if(Gabby() == GABBY_WAN) sys_puts("WANMaint\n") ;

/* tickle at minimum priority */
    if( Tickle(np,L2_PRIORITY_MAX) > 0 )
    (
        UpdateMaint(pp) ;
        if( data_cycle(np, pp) )  ( return_code = TRUE ; )
        else                      ( return_code = NOTOK ; )
    )
    else
    (
        SetTraveling(0) ;
        return_code = OK ;
    )

/* we delete the platform here */
    FreePlatform(pp) ;

return return_code ;
)

LOCAL MCLOCK_TIMER  send_alarm = 0 ;

/* returns the transmit time for the next available packet */
LOCAL UCOUNT    next_tick_to_try_sending(VOID)
```

```
    PLATFORM        *next ;
    MCLOCK_TIMER    now ;
    MCLOCK_TIMER    seconds_till_next_alarm = UCOUNT_MAX ;

GetMclockTimer(&now) ;
    next = (PLATFORM *)WAN_DataToGo_Q ;
    while( (next = (PLATFORM *)sys_next_queue((QUE *)next, WAN_DataToGo_Q)) !=
NULLPP )
    {
        /* if this packet is still napping */
        if( !IsExpiredMclockTimer( &now, PacketNapAlarmPtr(next)) )
        {
            if( DeltaMclockTimer(PacketNapAlarmPtr(next), &now) <
                seconds_till_next_alarm )
            (
                seconds_till_next_alarm =
                    DeltaMclockTimer( PacketNapAlarmPtr(next), &now ) ;
            )
        }
        else
        (
            /* we found one that is Ready to go! */
            seconds_till_next_alarm = 0 ;
            break ;
        )
    }

/* figure in the IDLE period */
    if( seconds_till_next_alarm < IdlePeriod() )
    (
        seconds_till_next_alarm = IdlePeriod() ;
    )

/* set the alarm to expire at the right time */
    GetExpiredMclockTimer( &send_alarm, seconds_till_next_alarm ) ;

/* and return the number of ticks till then from NOW. */
    GetMclockTimer(&now) ;
```

```
/*
if(Gabby() == GABBY_WAN )printf( "next_tick_to_try-> seconds:%lu\n",
seconds_till_next_alarm ) ;
*/
    return( TicksToAlarm(&now, &send_alarm) ) ;
}

LOCAL VOID    nap_all_packets_destined_to( MCLOCK_TIMER nap_alarm, WAN_ADDR
*dest_wan  )
{
    UCOUNT      num_napped ;
    PLATFORM   *next ;

num_napped = 0 ;
    nap_alarm += 2 ;
    next = (PLATFORM *)WAN_DataToGo_Q ;
    while( (next = (PLATFORM *)sys_next_queue((QUE *)next, WAN_DataToGo_Q)) !=
NULLPP )
    {
        LAN_ADDR   lan ;
        WAN_ADDR   wan ;

/* get the WAN address of the Packet on the Queue */
        DevToWanLan( &wan, &lan, DevDestPtr(next) ) ;

/* for each packet headed to the same WAN.... */
        if( CmpEqualWanAddr(dest_wan, &wan) )
        {
            SetPacketNapAlarm_M(next,nap_alarm) ;
        }
    }
    if(Gabby() == GABBY_WAN && (num_napped != 0)) printf("napped %u DATA to %lu\n",
num_napped, nap_alarm ) ;
}
``` l2wan.c - Metricom Proprietary - 891212 - page:28

```
LOCAL VOID    put_data_at_end( PLATFORM *pp )
{
    /* move the poor packet to the end of the Data To Go Queue for fairness
       if we did not get our ACK for first DATA packet -- and the DATA packet
       was NOT a link Maint packet */
    sys_delete_queue( (QUE *)pp, WAN_DataToGo_Q) ;
    sys_add_queue( (QUE *)pp, WAN_DataToGo_Q, FIFO ) ;
}

LOCAL VOID    try_to_send_data(VOID)
{
    NODE        *active_node ;
    PLATFORM    *tx_pp ;

if( (tx_pp = highest_priority()) != NULLPP )
    {
        LAN_ADDR        lan ;
        WAN_ADDR        dest_wan ;
        BOOL            backtrack = FALSE ;
        MCLOCK_TIMER    first_nap_alarm = MCLOCK_TIMER_INFINITY ;

/* the the LAN_ADDR and the WAN_ADDR for later use */
        DevToWanLan( &dest_wan, &lan, DevDestPtr(tx_pp) ) ;

/* move the DATA packet we got to the END of the DATA TO GO queue...
           in preparation for failure (sigh) if the packet is successfully
           sent, it will be deleted from wherever it is on the Queue */
        put_data_at_end( tx_pp ) ;

if( (active_node = ScanLink(DevDestPtr(tx_pp), &backtrack,
Priority(tx_pp), InputNode(tx_pp), &first_nap_alarm, Mood(tx_pp))) != NULLNP )
        {
            remake_l2_header( active_node, tx_pp ) ;
            if( data_cycle(active_node, tx_pp) == FALSE )
            {
                nap_all_packets_destined_to( first_nap_alarm, &dest_wan ) ;
            }
        }
```

```c
    /* toss if not direct connect to Mobile WAN address */
    else if( IsMobileWanAddr(&dest_wan) )
    {
        LINK_ADDR link ;

WanToLink(&link, &dest_wan) ;
        if( FindNodeGivenLinkPtr(&link, MSUBNET_WAN) == NULLNP )
        {
            sys_delete_queue( (QUE *)tx_pp, WAN_DataToGo_Q ) ;
            FreePlatform(tx_pp) ;
        }
    }
    else if( first_nap_alarm != MCLOCK_TIMER_INFINITY )
    {
        nap_all_packets_destined_to( first_nap_alarm, &dest_wan ) ;
    }
    else /* try again in RamNapStartDelay_M seconds */
    {
        MCLOCK_TIMER    now ;

GetMclockTimer(&now) ;
        nap_all_packets_destined_to( (now + RamNapStartDelay_M), &dest_wan ) ;
    }
}

LOCAL ARG WAN_schedule_and_sweep(VOID)
{
    UCOUNT          send_tick, next_tick_to_maintain ;
    MCLOCK_TIMER    now ;
    UCOUNT          next_tick = UCOUNT_MAX ;

if( !(TimeToMaintain(MSUBNET_WAN) && PerformMaintenance(MSUBNET_WAN)) )
    {
        GetMclockTimer( &now ) ;
        if( IsExpiredMclockTimer(&now, &send_alarm) ) { try_to_send_data() ; }
``` l2wan.c - Metricom Proprietary - 891212 - page:30

```
        send_tick             = next_tick_to_try_sending() ;
        next_tick_to_maintain  = TicksTillNextMaintenance(MSUBNET_WAN) ;
        next_tick              = min( send_tick, next_tick_to_maintain ) ;
        } if(Gabby() == GABBY_WAN && next_tick > MINIMUM_PEND_TIME )
    ( printf( "WAN_S&S returning %u\n", next_tick ) ; )

/* scan if lonely and not busy */
    if( next_tick >= (TICKS_PER_SLOT * RamWANMaintGateInterval_M) )
        {
        WAN_scan_if_lonely() ;
        } return( (next_tick < MINIMUM_PEND_TIME) ? MINIMUM_PEND_TIME : next_tick ) ;
    }

LOCAL   VOID    process_wan_doomed_nodes(VOID)
    {
    if( Gabby() == GABBY_WAN ) sys_puts( "DOOMED WAN node\n" ) ;
    sys_pend( WAN_NODELIST_FREE_EVENT, 0 ) ;

while( WAN_NodelistLock != 0 ) { sys_pend( 0, 10 ) ; }

DeleteDoomedNodes( MSUBNET_WAN ) ;
    WAN_FailedNode = FALSE ;
    sys_post( WAN_NODELIST_FREE_EVENT ) ;
    }

LOCAL   VOID    process_wan_newborn_nodes(VOID)
    {
    NODE *baby_np ;

sys_pend( WAN_NODELIST_FREE_EVENT, 0 ) ;
    while( WAN_NodelistLock != 0 ) { sys_pend( 0, 10 ) ; } while( (baby_np = (NODE *)sys_get_queue(WAN_NewbornNodes_Q)) != NULLNP )
```

```
        sys_add_queue( (QUE *)baby_np, WAN_ActiveNodes_Q, FIFO ) ;
    }
    sys_post( WAN_NODELIST_FREE_EVENT ) ;
}

/* [TASK] */
VOID WAN_link_manager(VOID)
{
    PLATFORM  *pp ;

/* start sending Syncs right away
       (after console has had time to come up) */
    sys_pend(0,100) ;
    MaybeSendSync( 0L ) ;

while(TRUE)
    {
        if( sys_pend( WAN_MGR_EVENT, WAN_schedule_and_sweep()) )
        {
            if( WAN_FailedNode )       ( process_wan_doomed_nodes() ; )

if( (NODE *)sys_next_queue (WAN_NewbornNodes_Q, WAN_NewbornNodes_Q) !=
NULLNP )
            {
                process_wan_newborn_nodes() ;
            }

/* this is a higher priority TASK than the tasks feeding this
               queue, so the queue will be emptied here */
            while( (pp = (PLATFORM *)sys_get_queue(WAN_Tx_Q)) != NULLPP )
            {
                Tx_Q_to_WAN_data_to_go_Q(pp) ;

/* start the WAN sending engine */
                GetMclockTimer( &send_alarm ) ;
            }
        }
    }
}
```

```
while( (pp = (PLATFORM *)sys_get_queue(WAN_DeferredRx_Q)) != NULLPP )
{
    /* only look at SYNCs that are NOT for US */
    if( L2Protocol(pp) == L2_PROTOCOL_SYNC )
    {
        AddToRouterQueue(pp) ;
    }
    else
    {
        FreePlatform(pp) ;
    }
}
} /* end of 'while(TRUE)' */
}
```

I claim:

1. In a packet communication network having a plurality of communication nodes, each node having a terminal node controller which includes processing means and memory means, a method for frequency sharing within said network comprising the steps of:

at each node, changing, according to a known pattern, a slot for transmission and reception of signals to a current slot, a slot being a frequency channel during a preselected time period, a current slot being the frequency channel for a current time period, said known pattern being known to each other node in said network, said step of changing at one node being independent of the changing for each other node;

at a source node, identifying a first receiver node and the frequency channel of the current slot of said first receiver node;

checking the frequency channel of said first receiver node to determine if available for a transmission;

when said frequency channel of said first receiver node is unavailable, repeating the steps of identifying and checking until an available frequency channel is found, the receiver node which has an available frequency channel being a selected receiver node; and transmitting an information packet from said source node to the selected receiver node during the current slot of said selected receiver node, the source node tracking the changing frequency of the selected receiver node.

2. The method of claim 1 in which transmission to an identified receiver node is delayed to a later slot when the frequency channel of the current slot of said identified receiver node is unavailable.

3. In a packet communication network having a plurality of communication nodes, each node having a terminal node controller which includes processing means and memory means and employing a clock, a method for maintaining frequency and time synchronization within said network comprising the steps of:

generating at each node an age value by means of the clock of said node, said age value being representative of the age of said node;

at each node, supplying a representation of the age value to any other node as part of transmission of a packet;

at each node, collecting said representation of the age value for other nodes within said network;

at each node, changing, according to a known pattern, a slot for transmission and reception of signals to a current slot, a slot being a frequency channel during a preselected time period, a current slot being the frequency channel for a current time period, said known pattern being known to each other node in said network, said step of changing at one node being independent of the changing for each other node;

at a source node, identifying a receiver node and frequency channel of the current slot of said receiver node which is available to receive a packet of information; and transmitting said information packet from said source node to said identified receiver node on the frequency channel defined by the current slot of said identified receiver node during said current slot of said identified receiver node, the source node tracking the changing frequency of the identified receiver node.

4. The method of claim 3, in which said step of identifying comprises the steps of testing said frequency channel of said current slot to determine whether said channel is currently available; and, when said frequency channel of said current slot is unavailable, delaying said step of transmitting until a later slot.

5. The method of claim 3, in which said step of identifying comprises the steps of testing said frequency channel of said current slot to determine whether said channel is currently available, said tested frequency channel being a first frequency channel, and of testing a frequency channel of the current slot of another receiver node when said first current frequency channel is unavailable, said another receiver node being said identified receiver node when said first frequency channel is unavailable and the frequency channel of said another receiver node is available.

* * * * *

UNITED STATES PATENT AND TRADEMARK OFFICE
CERTIFICATE OF CORRECTION

PATENT NO. : 5,079,768
DATED : January 7, 1992
INVENTOR(S) : George H. Flammer

It is certified that error appears in the above-indentified patent and that said Letters Patent is hereby corrected as shown below:

Col. 4, line 6, insert the following after invention.
--Fig. 5 is a timing diagram of a typical exchange between two nodes in a network according to the invention.--

Col. 4, line 7, change "5" to --6--
Col. 7, line 11, change '5" to --6--
Add the following drawing sheet as per attached.

Signed and Sealed this

Twenty-fourth Day of May, 1994

Attest:

BRUCE LEHMAN

*Attesting Officer*  *Commissioner of Patents and Trademarks*